United States Patent
Sato et al.

(10) Patent No.: US 6,622,747 B2
(45) Date of Patent: Sep. 23, 2003

(54) CUTTING, VALVE INSERTION AND CORROSION-RESISTANT WORKS WITHOUT FLUID SUPPLY INTERRUPTION

(75) Inventors: Toshiyuki Sato, Shiga (JP); Tamotsu Yamashita, Shiga (JP)

(73) Assignee: Suiken Co., Ltd., Shiga (JP)

(*) Notice: Subject to any disclaimer, the term of this patent is extended or adjusted under 35 U.S.C. 154(b) by 251 days.

(21) Appl. No.: 09/758,283

(22) Filed: Jan. 11, 2001

(65) Prior Publication Data
US 2001/0017159 A1 Aug. 30, 2001

(30) Foreign Application Priority Data

Jan. 11, 2000 (JP) .................................... 2000-006172
May 23, 2000 (JP) .................................... 2000-151721

(51) Int. Cl.⁷ ............................................. F16L 55/00
(52) U.S. Cl. ............................. 137/15.09; 137/15.12; 137/318; 138/94
(58) Field of Search ..................... 137/15.08, 15.12, 137/15.13, 15.14, 318, 15.09; 138/94, 94.3, 97

(56) References Cited

U.S. PATENT DOCUMENTS

| 3,948,282 A | 4/1976 | Yano |
| 4,141,378 A | 2/1979 | Wegner et al. |
| 5,660,199 A | 8/1997 | Maichel |
| 5,732,728 A | 3/1998 | Maichel |
| 5,896,885 A | * 4/1999 | Svetlik ................... 137/318 X |
| 5,924,436 A | * 7/1999 | Kitani et al. ............. 137/15.09 |
| 6,470,907 B1 | * 10/2002 | Sato et al. ................... 137/318 |

FOREIGN PATENT DOCUMENTS

| JP | 11-287385 | 10/1999 |
| JP | 2000-179779 | 6/2000 |

* cited by examiner

*Primary Examiner*—Kevin Lee
(74) *Attorney, Agent, or Firm*—Jordan and Hamburg LLP

(57) ABSTRACT

A fluid supply interruption free cutting apparatus of the present invention comprises a seal-up housing and a drill. The drill has a milling cutting tool turned by a motor. The seal-up housing is of a structure suited to turn in the circumferential direction of an existing pipe. A first housing part of the seal-up housing is formed with a cutting tool insertion aperture through which the cutting tool is inserted and with a gate passage aperture through which a gate passes that is inserted for cutting off the flow of a fluid through the interior of the existing pipe after cutting of the existing pipe. The first housing part is provided with a first operation valve to open or close the gate passage aperture and with a second operation valve to open or close the cutting tool insertion aperture. An anticorrosive member is fitted in the opening formed in the cutting of the existing pipe. The anticorrosive member include a pressure contact portion made of elastomer coming into pressure contact with a cut surface of the opening over substantially the entire periphery and a rigid portion integrally formed with the pressure contact portion.—has been inserted therein.

1 Claim, 46 Drawing Sheets

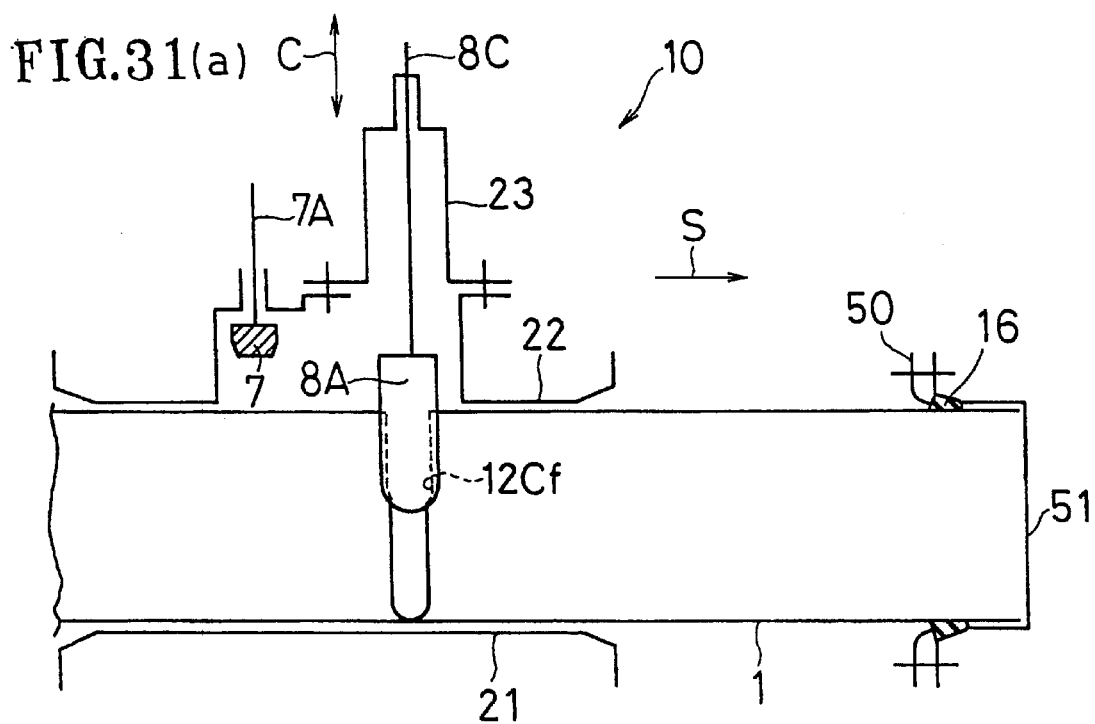
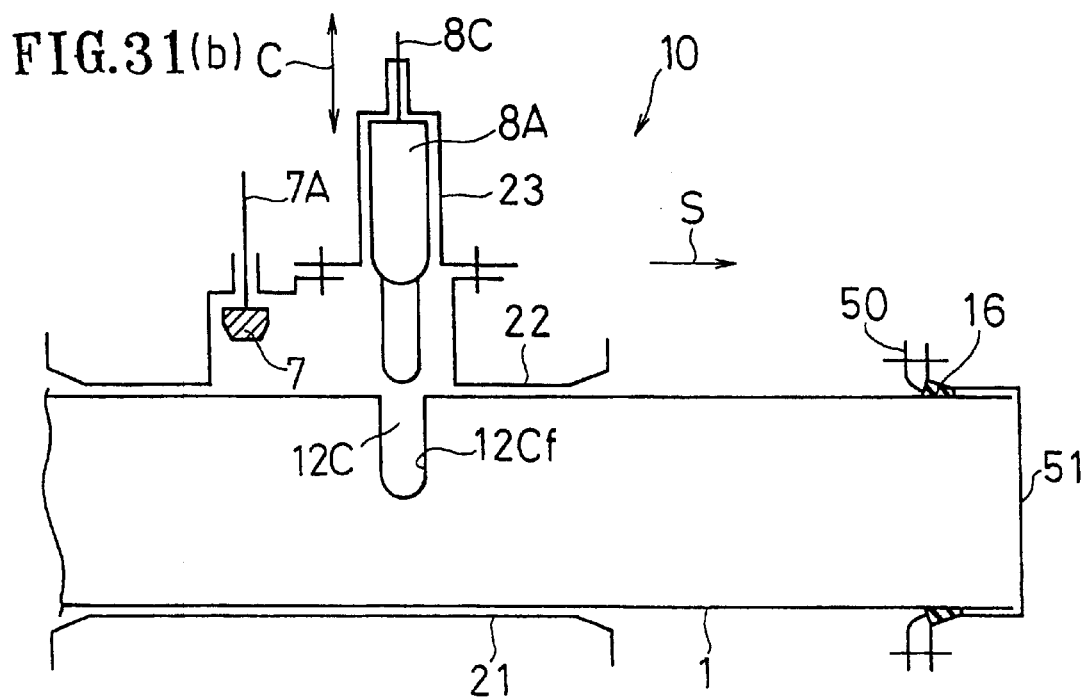

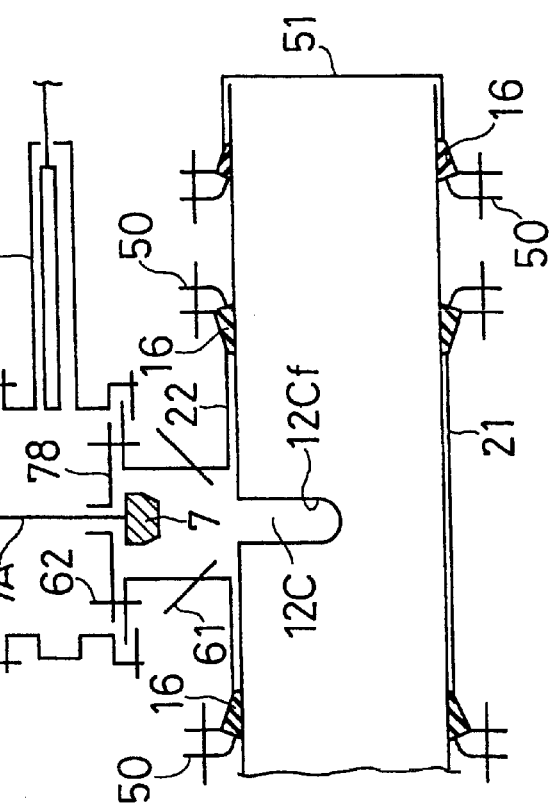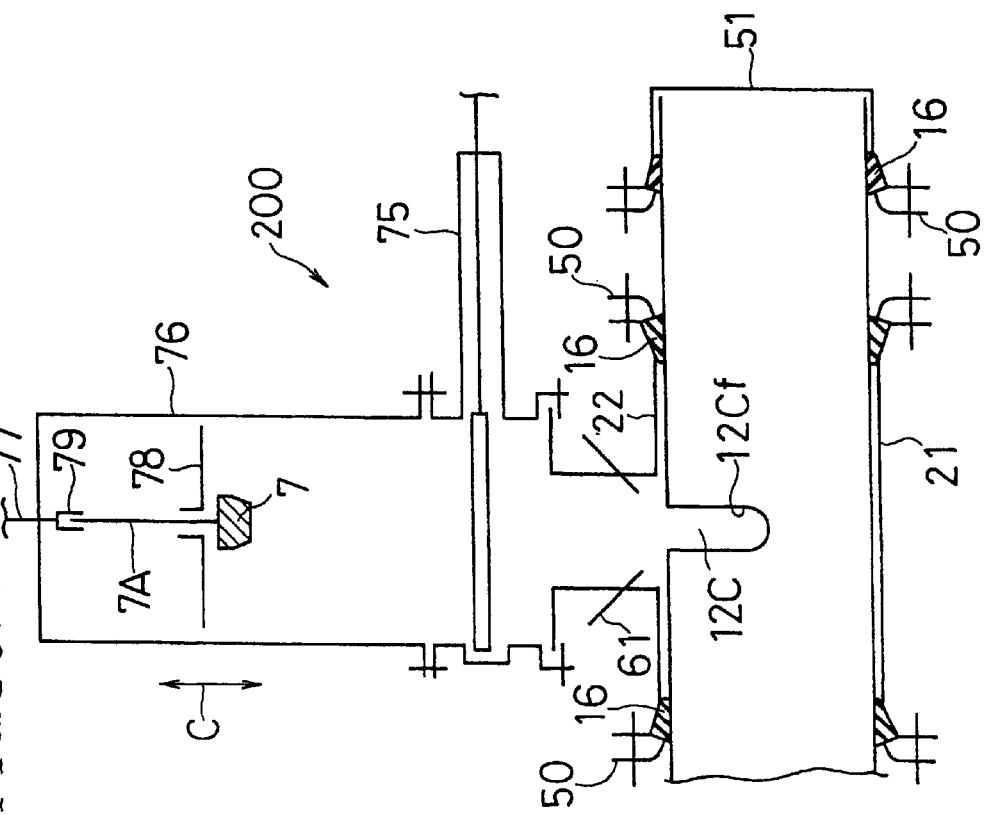

CUTTING, VALVE INSERTION AND CORROSION-RESISTANT WORKS WITHOUT FLUID SUPPLY INTERRUPTION

BACKGROUND OF THE INVENTION

1. Field of the Invention

The present invention relates to an apparatus and a method for effecting cutting, valve insertion and anticorrosive works on an existing pipe without a need to interrupt the supply of a fluid therethrough.

2. Description of the Related Arts

Up until now, a fluid supply interruption free valve insertion method is widely known in which a water flow through a pipeline can be stopped by forming an opening in an existing pipe without interruption of the water supply and inserting a gate through the opening to thereby allow a stopping of the water flow through the pipeline (U.S. Pat. Nos. 3,948,282, 4,516,598, 5,611,365 and 5,732,728, U.S. patent application Ser. No. 09/195,601 (Japan Patent Laid-open Pub. Nos. Hei11-287385 and 2000-179779)).

In such a method, the water flow is stopped by a gate after the valve insertion in order to perform the objective work such as a modification of piping.

The method disclosed in U.S. Pat. No. 5,732,728 includes enabling a gate passage aperture for inserting the gate therethrough to be opened or closed by sealing means and inserting a cutting tool through the gate passage aperture to cut the existing pipe. After the completion of the cutting, the massive sealing means are opened or closed to withdraw the cutting tool and thereafter insert the gate.

In this conventional method, the cutting tool is not to be withdrawn unless the massive sealing means are opened and closed. It is also required to deeply dig the earth beneath the existing pipe due to the necessity to cut the existing pipe over the entire circumference.

FIG. 44 is a transverse sectional view of an apparatus for use in the method disclosed in Japan Patent Laid-open Pub. No. Hei11-287385.

As shown, a seal-up housing 500 consists of a lower housing part 501 and an upper housing part 502. The lower housing part 501 is mounted with a drill 505 having a cutting tool 504. The upper housing part 502 is blocked off by a block-off plate. In this conventional method, a cut groove is first formed over the entire circumference of the existing pipe 1 by means of the cutting tool 504. Then, after the completion of the cutting, the block-off plate 503 is withdrawn and thereafter a gate not shown is mounted on the upper housing part 502.

This conventional method needs a deep dig of the earth beneath the existing pipe 1 due to the attachment of the drill 505 to the lower housing part 501.

FIG. 45 is a transverse sectional view showing the state where the valve insertion is complete by use of the method disclosed in Japan Patent Laid-open Pub. No. 2000-179779.

As shown, a seal-up housing 600 consists of a first housing part 601 and a second housing part 602. The first housing part 601 is provided with an aperture 603 for inserting a cutting tool not shown therethrough and with an operation valve 604. The first housing part 601 is further provided with a gate passage aperture 606 through which a gate 605 passes upon the opening or closing thereof.

In this conventional method, the seal-up housing 600 is turned through substantially half the circumference so as to allow the cutting tool to form a cut groove 607 in the existing pipe 1 by a half round. Then, after the withdrawal of the cutting tool, the operation valve 604 is closed.

This conventional method posed quite a few problems from the above description.

Due to the necessity to turn the massive gate 605 and the seal-up housing 600, the increased nominal diameter (bore) of the existing pipe 1 results in a larger-scale unit for turning the seal-up housing 600 around the existing pipe 1.

After the completion of the objective work such as the modification of piping, it may possibly be difficult to withdraw the gate 605 or it may take a lot of time and labor for the withdrawal. For this reason, this method is not suited for the case where the existing pipe 1 is buried at a shallow depth.

Due to its formation by drilling or cutting, the cut groove (opening) of the above conventional methods has not undergone sufficient corrosion-resistant measures.

In case of less than 25 mm diameter piping water supply work, a hollow copper bush is caulked and inserted into such an opening to thereby take corrosion-resistant measures.

Due to the need for the step of spreading and caulking the bush, however, such corrosion resistant measures could not be applied to the case of larger bore as in the water distribution work (more than 50 mm diameter). Furthermore, the method may become complicated since the opening is not hermetically closed.

SUMMARY OF THE INVENTION

In order to solve the above problems, the anti corrosive member of the present invention is one for use in a fluid supply interruption free work hermetically closing a circular or grooved opening formed in an existing pipe through about 180 degrees or through the angular range slightly smaller than 180 degrees in the circumferential direction of the existing pipe. The anticorrosive member has a shape corresponding to the opening but is incapable of impeding the flow of water through the interior of the existing pipe (i.e., the anti corrosive member does not act as a valve body). The anticorrosive member comprises a pressure contact portion made of elastomer coming into pressure contact with a cut surface of the opening over substantially the entire periphery; and a rigid portion integrally formed with the pressure contact portion and having a rigidity enough to resist the water pressure acting on the opening.

The circular opening may be formed by means of a known hole saw. The grooved opening may be formed by an end mill or a fraise.

In the present invention, the "rigid portion" is typically made of ductile cast iron, steel, stainless steel, etc.

Such an anticorrosive member is enclosed in the seal-up housing together with the following gate to make up an anticorrosive member inserting apparatus.

In this case, the gate enters the interior of the existing pipe by way of the opening to cut off the flow of water through the interior of the existing pipe. On the other hand, the seal-up housing comprises a plurality of housing parts segmented in the circumferential direction of the existing pipe and encloses the anticorrosive member and the gate.

The fluid supply interruption free method of the present invention uses the anticorrosive member inserting apparatus, etc., and comprises an enclosing step, an opening formation step, a water stop step, a removal step and a hermetically closing step which will be described hereinbelow.

The enclosing step includes hermetically enclosing a part of an existing pipe by the seal-up housing.

The opening formation step includes forming a circular or grooved opening in the existing pipe within the seal-up housing, the opening extending through about 180 degrees or through the angular range slightly smaller than 180 degrees.

The water stop step includes stopping the flow of water through the interior of the existing pipe by allowing a gate for stopping the flow of water through the interior of the existing pipe to enter the interior of the existing pipe through the opening.

The removal step includes removing the gate from the opening.

The hermetically closing step includes fitting the anticorrosive member into the opening, the anticorrosive member including a pressure contact portion made of elastomer coming into pressure contact with a cut surface of the opening over substantially the entire periphery, and a rigid portion integrally formed with the pressure contact portion and having a rigidity enough to resist the water pressure acting on the opening.

By use of such a fluid supply interruption free method, a piping structure of the present invention is obtained.

More specifically, the piping structure of the present invention comprises an existing pipe and an anticorrosive member. The existing pipe has an outer peripheral surface formed with a cut opening, the opening extending through about 180 degrees or through the angular range slightly less than 180 degrees in the circumferential direction of the existing pipe. The anticorrosive member has a shape corresponding to the opening and is incapable of impeding the flow of water through the interior of the existing pipe. The anticorrosive member includes a pressure contact portion made of elastomer coming into pressure contact with a cut surface of the opening over substantially the entire periphery, and a rigid portion integrally formed with the pressure contact portion and having a rigidity enough to resist the water pressure acting on the opening.

The anticorrosive member may remain stored in the seal-up housing in such a manner that it is fixedly placed therein, but instead the seal-up housing may be removed if the anticorrosive member is fastened to the existing pipe by means of a band.

As used herein, "elastomer" can be gel, unbridged resin, resin sponge, etc., other than rubber.

According to the present invention, the copper bush need not be expanded, making it applicable to any large-diameter distribution work. Furthermore, by virtue of the anticorrosive member provided with the rigid portion to hermetically close the opening, it will become easy to mount the plate flange for example after the hermetic closing.

In order to solve the other problem, the fluid supply interruption free cutting apparatus of the present invention comprises a seal-up housing and a drill. The seal-up housing comprises a plurality of housing parts segmented in the circumferential direction of the existing pipe, the seal-up housing hermetically enclosing a part of the existing pipe and the anticorrosive member. The drill has a milling cutting tool that is revolved by a motor.

The seal-up housing has a structure suited to turn around the existing pipe in the circumferential direction thereof.

A first housing part which is one of the housing parts has integrally formed a cutting tool insertion aperture and a gate passage aperture. The cutting tool insertion aperture allows the insertion of the milling cutting tool. The gate passage aperture allows the passage of the gate that is inserted therein for the purpose of stopping the flow of a fluid through the interior of the existing pipe after cutting of the existing pipe.

The fluid supply interruption free cutting apparatus is provided with a first operation valve arranged to open or close the gate passage aperture and with a second operation valve arranged to open or close the cutting tool insertion aperture.

The fluid supply interruption free cutting method of the present invention is effected by use of the fluid supply interruption free cutting apparatus and comprises an assembling step, an infeed step, a feed step and a tool removal step which follow.

The assembling step includes hermetically enclosing a part of the existing pipe by means of the seal-up housing and allowing the cutting tool to enter the interior of the cutting tool insertion aperture with the second operation valve opened.

The infeed step includes feeding the cutting tool inwardly in the radial direction of the existing pipe while simultaneously revolving the cutting tool to impart thereto a cutting motion for cutting the existing pipe by revolutions of the cutting tool.

The feed step includes turning the seal-up housing around the existing pipe in the circumferential direction thereof while continuing the cutting motion. This turning causes a rotation of the cutting tool in the circumferential direction of the existing pipe and thus a feed motion of the cutting tool. This feed motion allows the cutting tool to cut the existing pipe over the range of substantially the half circumference in the circumferential direction without creating any cut-off sections. This cutting results in a formation of a cut groove that extends over the range of substantially the half circumference in the circumferential direction of the existing pipe.

The tool removal step includes removing the cutting tool from the seal-up housing after the completion of the cutting and thereafter closing the second operation valve.

On the other hand, the fluid supply interruption free valve inserting apparatus of the present invention comprises a seal-up housing and a gate.

The seal-up housing comprises a plurality of housing parts segmented in the circumferential direction of an existing pipe, the seal-up housing hermetically encloses a part of the existing pipe. The gate is arranged to be inserted for cutting off the flow of a fluid through the interior of the existing pipe after cutting of the existing pipe.

A first housing part of the seal-up housing has integrally formed a cutting tool insertion aperture through which the milling cutting tool is inserted and a gate passage aperture through which the gate passes.

In this inserting apparatus, the inserting apparatus is provided with a first operation valve arranged to open or close the gate passage aperture and with a storage casing which stores the gate while the gate is opened.

The storage casing and the seal-up housing are each provided with a flange adapted to join the storage casing storing the gate to the seal-up housing with the first operation valve closed.

The fluid supply interruption free valve inserting method is effected by using the fluid supply interruption free valve inserting apparatus and comprises an assembling step, an infeed step, a feed step, a tool removal step and a gate mounting step which follow.

The assembling step includes hermetically enclosing a part of the existing pipe by means of the seal-up housing and allowing the cutting tool to enter the interior of the cutting tool insertion aperture with a second operation valve opened, the second operation valve arranged to open or close the cutting tool insertion aperture.

The infeed step includes feeding the cutting tool inwardly in the radial direction of the existing pipe while simultaneously revolving the cutting tool to impart thereto a cutting motion for cutting the existing pipe by revolutions of the cutting tool.

The feed step includes turning the seal-up housing around the existing pipe in the circumferential direction thereof while continuing the cutting motion. This turning causes a rotation of the cutting tool in the circumferential direction of the existing pipe and thus a feed motion of the cutting tool. This feed motion allows the cutting tool to cut the existing pipe over the range of substantially the half circumference in the circumferential direction without creating any cut-off sections. This cutting results in a formation of a cut groove that extends over the range of substantially the half circumference in the circumferential direction of the existing pipe.

The tool removal step includes removing the cutting tool from the seal-up housing after the completion of the cutting and thereafter closing the second operation valve.

The gate mounting step including joining the storage casing storing the gate therein to the seal-up housing with the first operation valve closed after the formation of the cut groove.

According to the apparatus and method of the present invention, a desired cut groove can be formed by allowing the seal-up housing to turn through a half-round around the existing pipe. Attachment of the cutting tool and the gate to the first housing part will eliminate the necessity to dig the earth beneath the existing pipe to a large extent.

Provision of the first and second operation valves facilitates the removal of the cutting tool.

During the cutting, the seal-up housing is turned around the existing pipe without any massive gate so that the seal-up housing can turn with a small magnitude force.

After the stopping the water flow in the existing pipeline by the gate inserted through release of the first operation valve, the gate is retracted in the storage casing. Then, after the closing of the first operation valve, the gate and the storage casing is withdrawn. This eliminates any elements that project to a large extent above the existing pipe, enabling the work to be effected on the existing pipe which has been buried at a shallow depth.

In the present invention, "existing pipe" refers to a pipe through which flows a liquid such as water or oil, and is typically often buried in the ground.

"Seal-up" does not mean perfectly hermetically sealing, but means that a watertightness is kept to such a degree as to allow a suspension-free work. Therefore, "seal-up housing" refers to a housing which has pressure resistance properties capable of resisting the pressure of liquid flowing through the interior of the existing pipe and which has certain water stop properties.

"Hermetically enclose" means sealing something to such an extent as not to cause any inconvenience to cut or other works. For example, the seal-up housing may be provided with a drain opening arranged to be opened during the cut to drain cutting chips together with water therethrough.

"Cutting tool" for use in this method is preferably a milling tool having a plurality of cutting edges at its tip surface and peripheral surfaces.

In case of cutting an existing pipe having a mortar lining formed along its inner surfaces, it is preferred to use a cutting tool provided with a multiplicity of chips made of a hard metal or a cutting tool having cutting edges made of diamond particles.

As used herein, "cut" means cutting a part of the pipe wall by turning the cutting edges. "Cutting motion" means turning the cutting edges, whereas "feed motion" means moving the cutting tool to positions allowing fresh portions of the pipe wall to be cut in succession by the cutting tool.

BRIEF DESCRIPTION OF THE DRAWINGS

The present invention will be understood more apparently from the following description of the preferred embodiments with reference to the accompanying drawings. However, the embodiments and the drawings are merely presented for illustrative and explanative purposes and are not to be utilized for defining the scope of the present invention, which is to be defined only by the appended claims. In the accompanying drawings, like reference numerals denote same or corresponding parts throughout several views.

FIG. 31(a) is a schematic longitudinal sectional view showing the water stop step, and FIG. 31(b) is a schematic longitudinal sectional view showing a removal step;

FIGS. 36(a) and 36(b) are schematic longitudinal sectional views each showing an anticorrosive member mounting step;

DESCRIPTION OF THE PREFERRED EMBODIMENTS

The present invention will now be described with reference to the accompanying drawings which illustrate presently preferred embodiments thereof in a non-limitative manner.

First Embodiment

FIGS. 1 to 13 show a first embodiment of the present invention.

Valve Insertion Unit (Cutting Unit) 100

Figure 1:
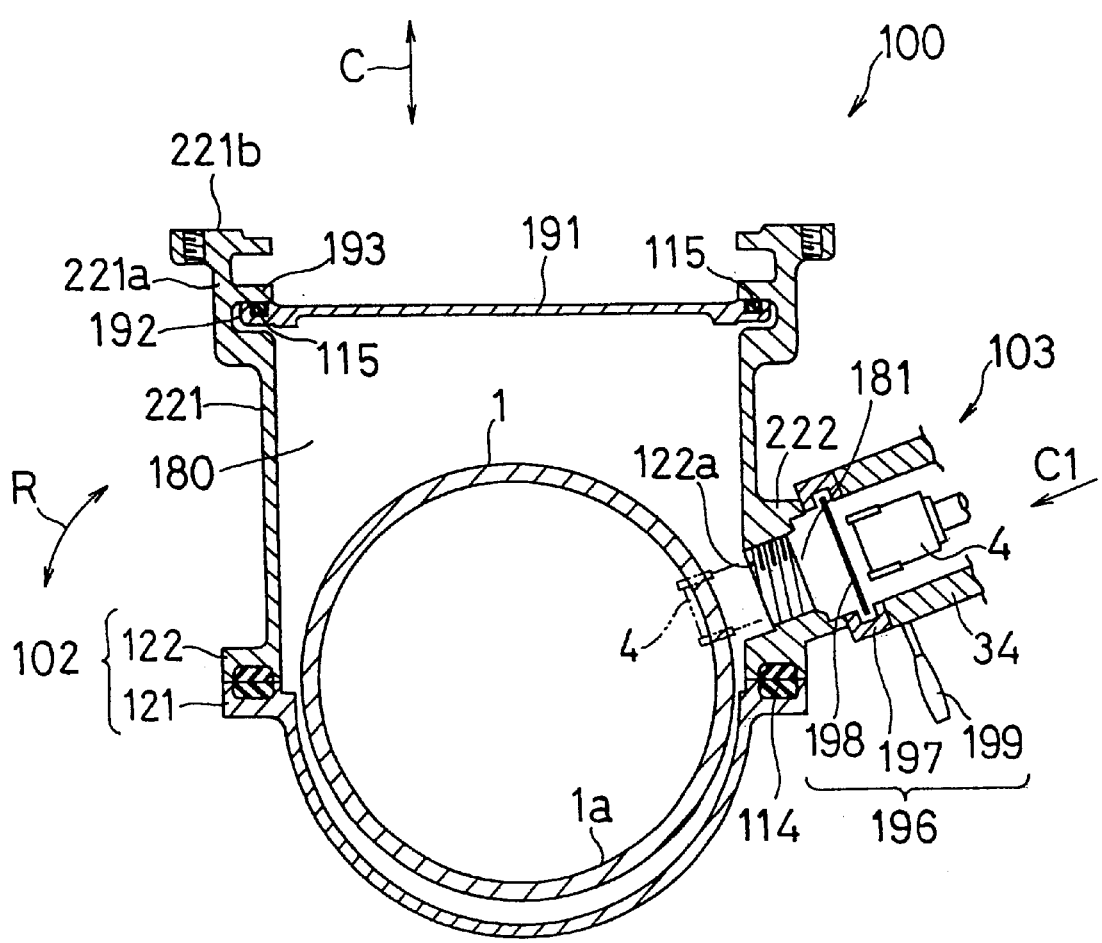
FIG. 1 is a transverse sectional view showing an assembling step of a method in accordance with a first embodiment of the present invention.
Figure 2:
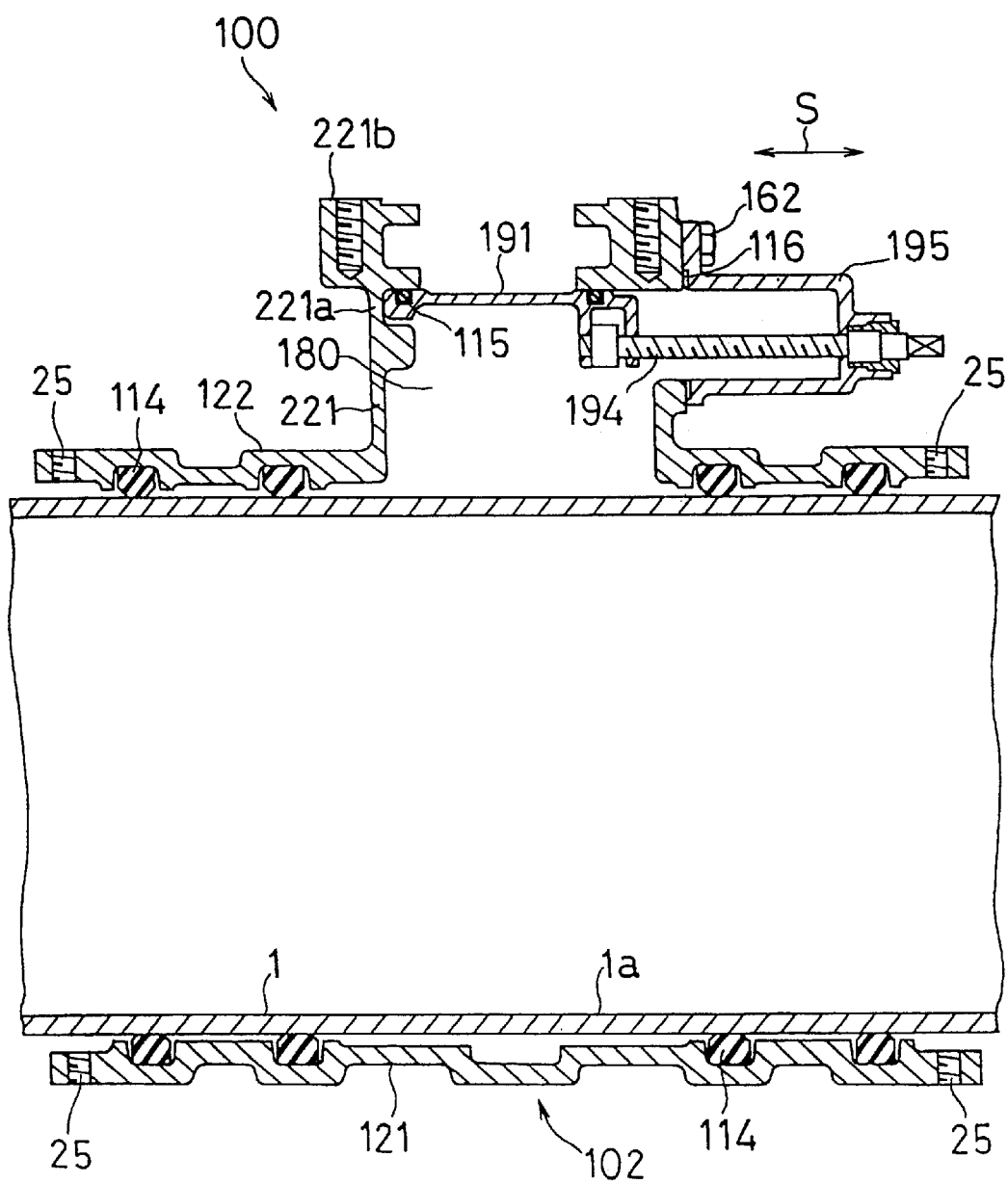
FIG. 2 is a longitudinal sectional view showing the assembling step.

Referring first to FIGS. 1 and 2, a valve insertion unit is generally designated at 100 and comprises a seal-up housing 102 and a drill 103. The seal-up housing 102 comprises first 122 and second 121 housing parts halved in the circumferential direction R of an existing pipe 1. The seal-up housing 102 has a structure suited to turn around the existing pipe 1 in its circumferential direction R. A rubber packing 114 is disposed to provide a hermetic seal between the first housing part 122 and the second housing part 121 as seen in FIG. 1 and between the seal-up housing 102 and the existing pipe 1 as seen FIG. 2. A plurality of internally threaded portions 25 are formed at opposite ends in the axial direction S of the seal-up housing 102.

A first branched portion 221 and a second branched portion 222 which protrude in a branched manner in the radial direction C of the existing pipe 1 are formed with the first housing part 122 of FIG. 1. The second branched portion 222 is formed diagonally relative to the first branched portion 221 so as to diverge from the first branched portion 221.

The first branched portion 221 is provided with a gate passage aperture 180 through which passes a gate 8A (FIG. 5) which will be described later. The first branched portion 221 has a flange 221b formed at the upper end thereof. An storage casing 124 (FIG. 5) or a flange cover 155 (FIG. 13) which will be described later is firmly secured via assembling bolts 162 to the flange 221b.

A valve casing is formed integrally with an upper portion 221a of the first branched portion 221 and encases a first operation valve (hereinafter referred to simply as a first valve) 191 arranged to open or close the gate passage aperture 180, upon the closing of the first valve 191. The upper portion 221a is provided with a path 192 through which the first valve 191 advances or retreats upon the opening or closing thereof and with a guide 193 arranged to guide the first valve 191. A rubber ring 115 is disposed to provide a hermetic seal between the first valve 191 and the guide 193.

The first valve 191 shown in FIG. 2 comprises a valve spindle 194 and a valve bonnet 195. The valve spindle 194 serves to open or close the first valve 191 in the axial direction S of the existing pipe 1. The valve bonnet 195 encases the first valve 191 upon the valve release. The valve bonnet 195 is securely fastened via the assembling bolts 162 to the right-hand sidewall of the first branched portion 221 in FIG. 2. A rubber packing 116 is disposed to provide hermetic seal between the valve bonnet 195 and the first branched portion 221.

The second branched portion 222 shown in FIG. 1 is open toward the center of the existing pipe 1 to form a cutting tool insertion aperture 181 through which is inserted a milling cutting tool 4. An attachment 34 of the drill 103 is fixedly secured via a valve assembly 196 to the second branched portion 222. The valve assembly 196 includes a valve casing 197, a second operation valve (hereinafter referred to simply as a second valve) 198 and an operation lever 199. The second valve 198 serves to open or close the cutting tool insertion aperture 181 by operating the operation lever 199. A rubber ring not shown provides a hermetic seal between the second branched portion 222 and the valve assembly 196 and between the valve assembly 196 and the attachment 34. The second branched portion 222 has an internally threaded portion 122a into which is screwed a plug 160 of FIG. 5.
Drill 103

Figure 3:
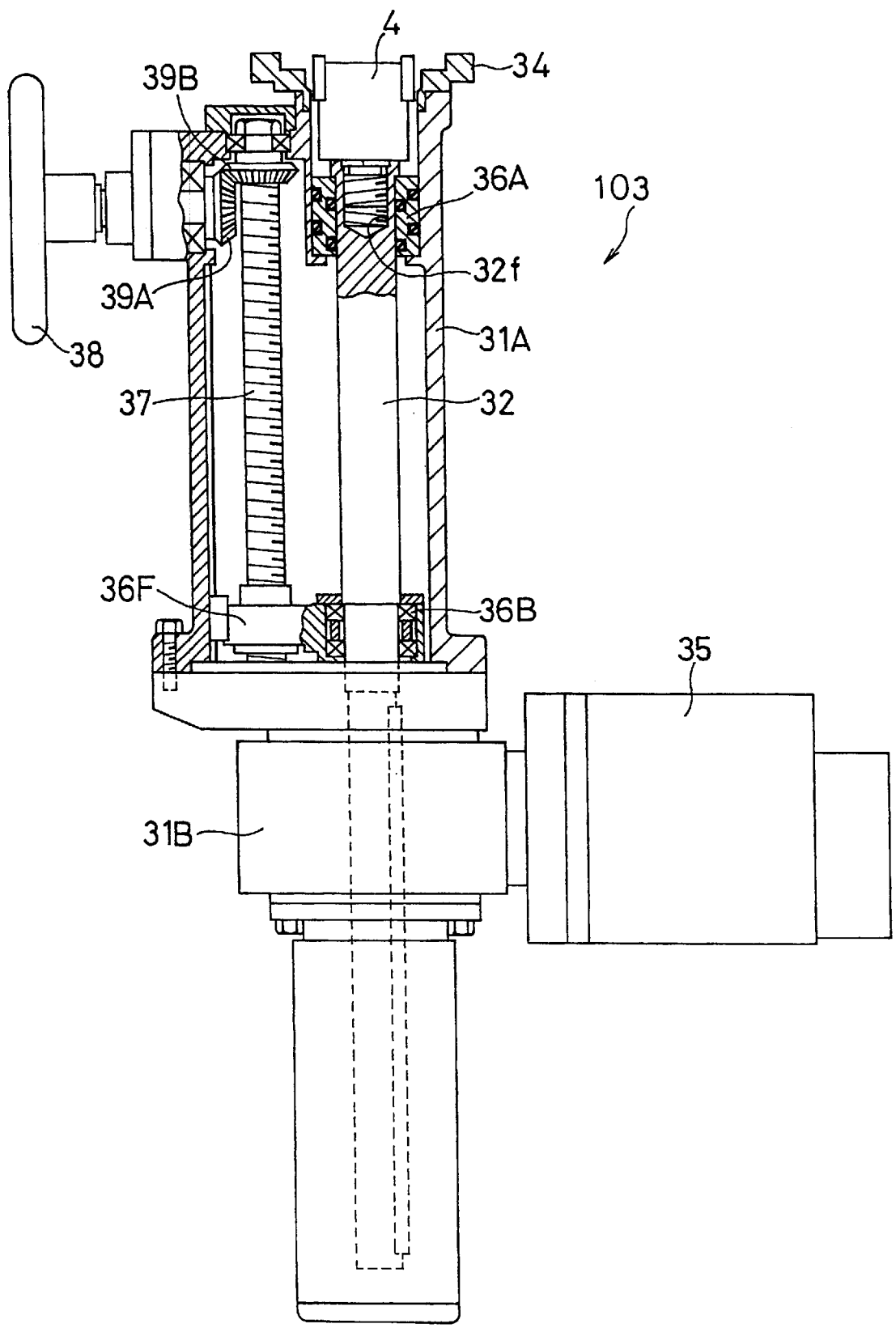
FIG. 3 is a partly cut-away side elevational view showing a drill.

The drill 103 shown in FIG. 3 includes a cutter box 31A which is fixedly secured via the attachment 34 to the valve assembly 196 (FIG. 1). An elongated cutter shaft 32 extends through the interiors of the cutter box 31A and of a gear box 31B. The cutter shaft 32 is rotatably supported by a first bearing 36A and another bearing not shown within the cutter box 31A and the gear box 31B. The cutter shaft 32 has an internally threaded portion 32f formed at its extremity for firmly receiving the milling cutting tool 4. The cutter shaft 32 is rotated via a reduction gear or a bevel gear not shown by a motive power from an electric motor (one typical example of a motor) 35. Thus, the cutting tool 4 rotates around the cutter shaft 32 by the power from the electric motor 35.

An infeed screw 37 extends parallel to the cutter shaft 32 within the interior of the cutter box 31A. The infeed screw 37 rotates forward or reverse via bevel gears 39A and 39B by turning a handle 38. The infeed screw 37 threadedly engages with an internally threaded portion formed in a hold 36F. The hold 36F is arranged to hold the cutter shaft 32 by way of a second bearing 36B. Thus, rotations of the infeed screw 37 by turning the handle 38 cause a forward or reverse motion of the hold 36F allowing the cutter shaft 32 to move forward or reverse.

Figure 4A:
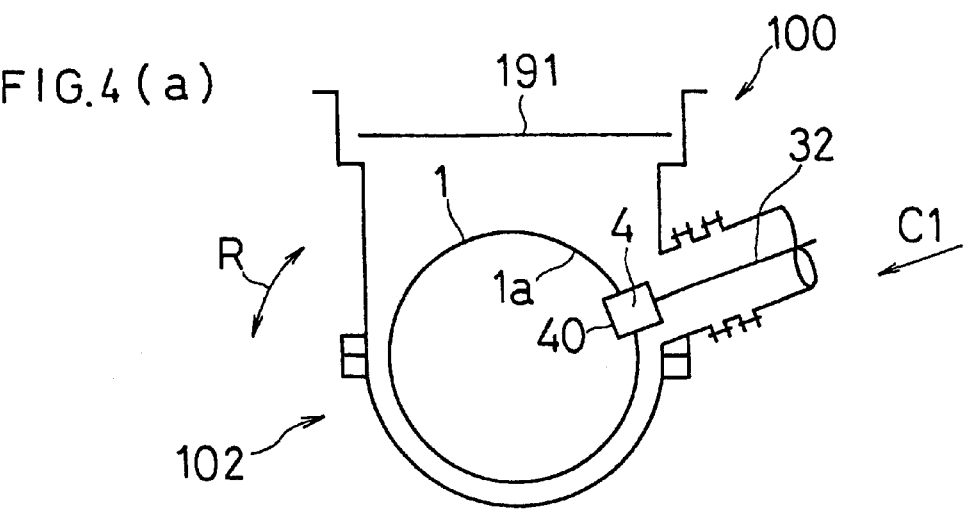
FIG. 4(*a*) is a schematic transverse sectional view showing an infeed step, and FIGS. 4(*b*) and 4(*c*) are schematic transverse sectional views each showing a feed step.
Figure 4B:
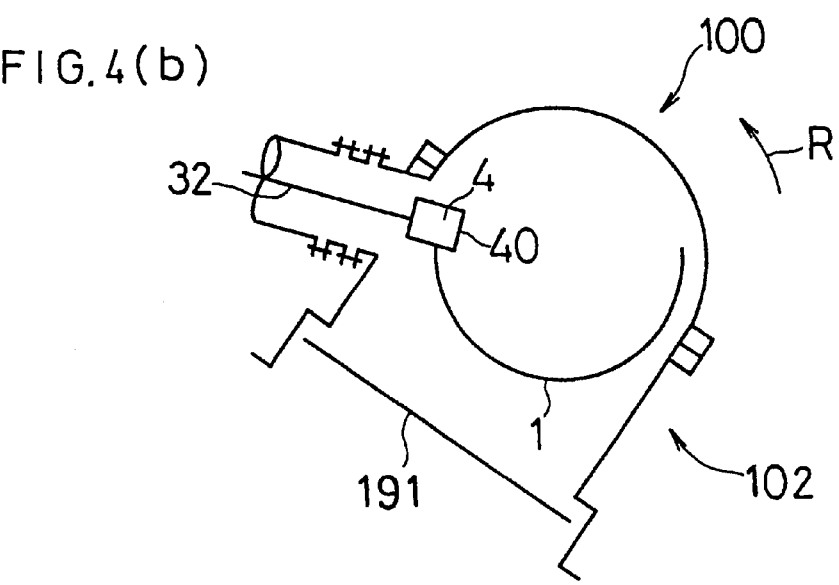
Figure 4C:
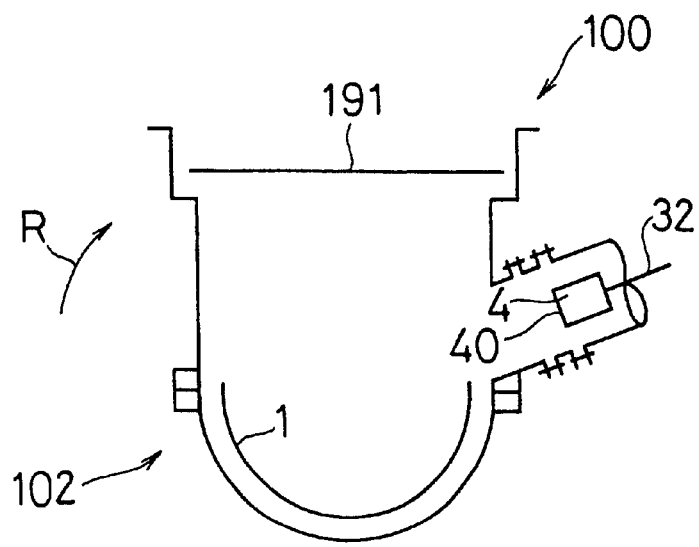
Figure 5:
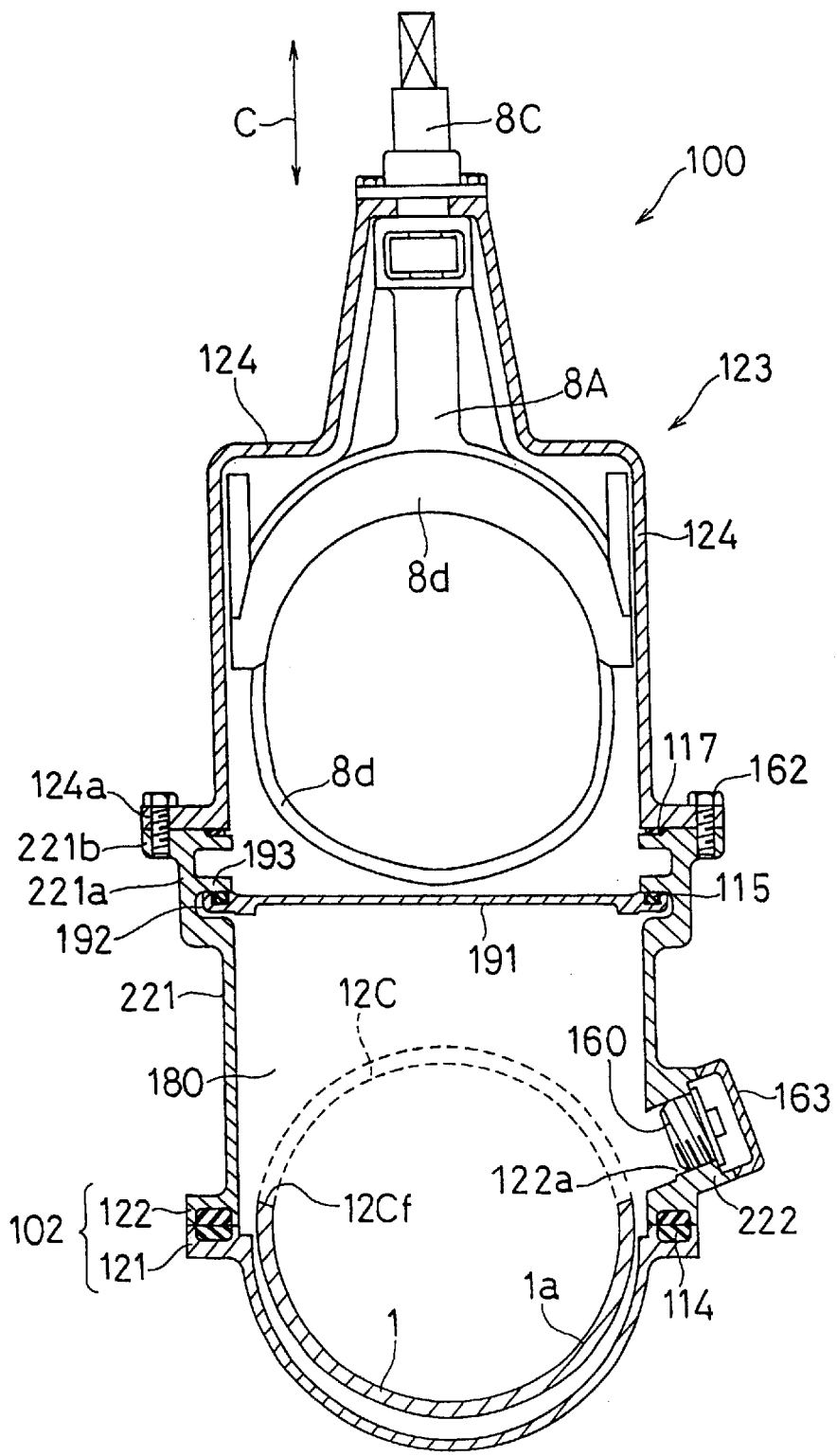
FIG. 5 is a transverse sectional view showing a gate mounting step.
Figure 6:
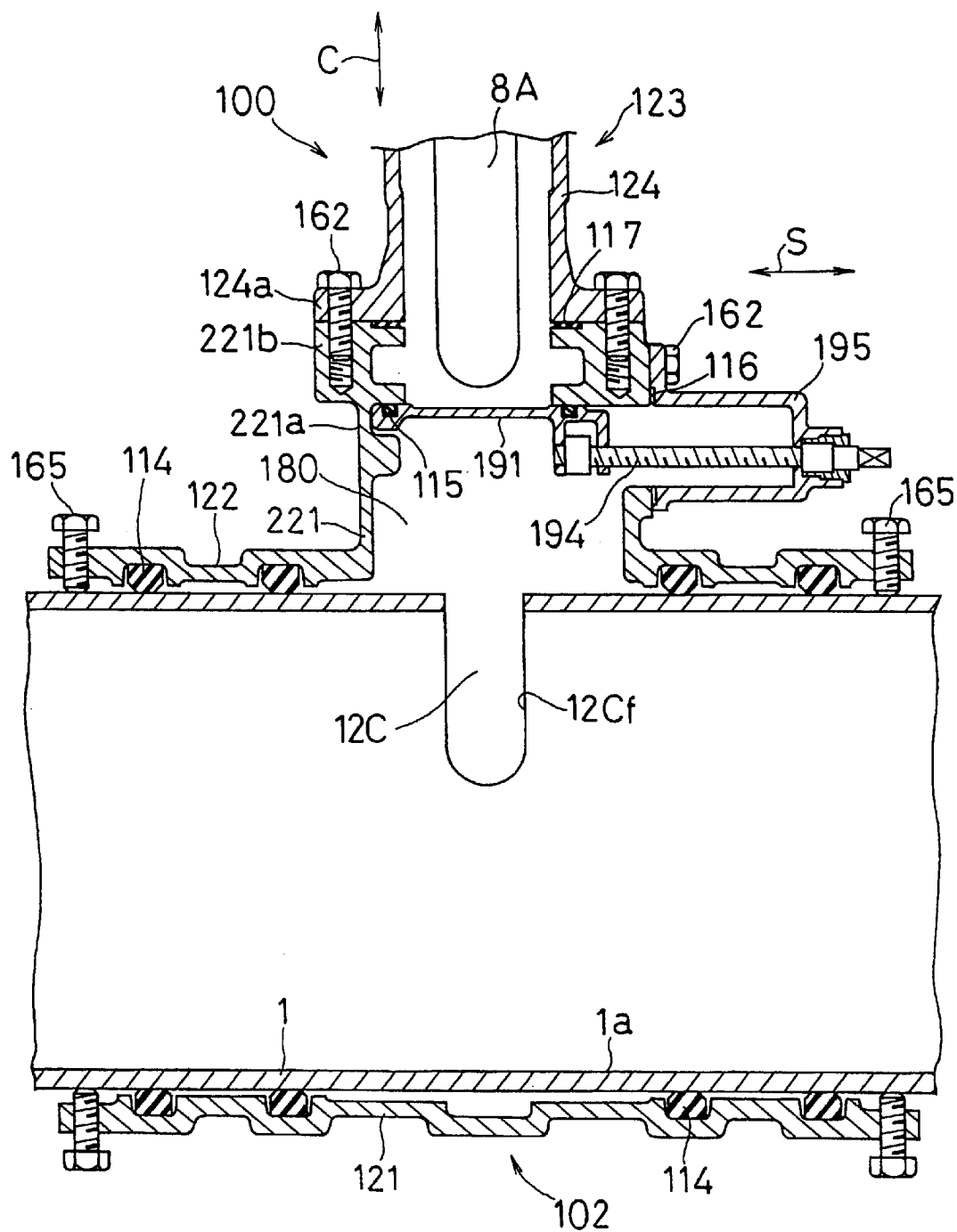
FIG. 6 is a longitudinal sectional view showing the gate mounting step.

This drill 103 could be of any structure similar to that of the known drill so long as the cutting tool 4 is an end mill.
Assembling Step The first valve 191 is previously mounted on the first branched portion 221 whilst the valve assembly 196 is in advance mounted on the second branched portion 222. First, with a liquid (water) flowing through the interior of the existing pipe 1 of FIG. 1, the operator mounts the seal-up housing 102 on the existing pipe 1 at a cut site thereof and puts the first 122 and second 121 housing parts together by means of assembling bolts not shown. The second branched portion 222 is then mounted with the drill 103. At that time, the operator closes the first valve 191 so as to shut off the gate passage aperture 180 of the seal-up housing 102 while allowing the cutting tool 4 to enter the cutting tool insertion aperture 181 with the second valve 198 opened. A part of the existing pipe 1 is thus enclosed by the seal-up housing 102 in a hermetically sealed fashion.
Infeed Step After the assembling step, the operator operates the drill 103 to drive the electric motor 35 (FIG. 3) so that the cutting tool 4 rotates together With the cutter shaft 32. When the operator operates the drill 103 in this state to feed the cutting tool 4 toward the infeed direction C1, the cutting tool 4 starts its cutting motion for cutting the existing pipe 1, with the result that a tip surface 40 of the cutting tool 4 eventually penetrates a part of a pipe wall 1a of the existing pipe 1 as shown in FIG. 4(a). The infeed by the cutting tool 4 is thus complete.
Feed Step With the cutting tool 4 in the cutting motion after the infeed step, the operator turns the seal-up housing 102 around the existing pipe 1 in the circumferential direction R thereof as shown in FIG. 4(b) by use of a rotary drive unit which will be described later. More specifically, the cutting tool 4 makes a feed motion turning together with the seal-up housing 102 in the circumferential direction R while simultaneously turning around the cutter shaft 32, to cut the existing pipe 1 through substantially the half round (approx. 180 degrees or angles slightly smaller than 180 degrees) in the circumferential direction. Afterward, the operator retreats the cutting tool 4 and restores it to its initial position by turning the seal-up housing 102 in the opposite direction as shown in FIG. 4(c). Subsequently, the operator screws setscrews 165 of FIG. 6 into the internally threaded portions 25 of the seal-up housing 102 to firmly fasten the seal-up housing 102 to the existing pipe 1. The existing pipe 1 is thus cut through substantially the half round in the circumferential direction R without creating any cut-off sections so that a cut groove 12C extending over the range of substantially the half round in the circumferential direction R as shown in FIGS. 5 and 6 is formed with the existing pipe 1 (opening formation step).
Tool Removal Step After the completion of the feed step, the operator acts on the operation lever 199 of FIG. 1 to close the second valve 198 and remove the drill 103. After this removal, the operator attaches a known plug insert tool not shown to the valve assembly 196 to open the second valve 198. After this valve release, the operator acts on the plug insert tool to screw the plug of FIG. 5 into the internally threaded portion 122a of the second branched portion 222. After this screwing, the operator removes the valve assembly 196 (FIG. 1) and the plug inserter and attaches a block-off cover 163 to the second branched portion 222.
Gate Assembly 123

Description will then be made of the structure of a gate assembly inserted into the pipeline.

Figure 7:
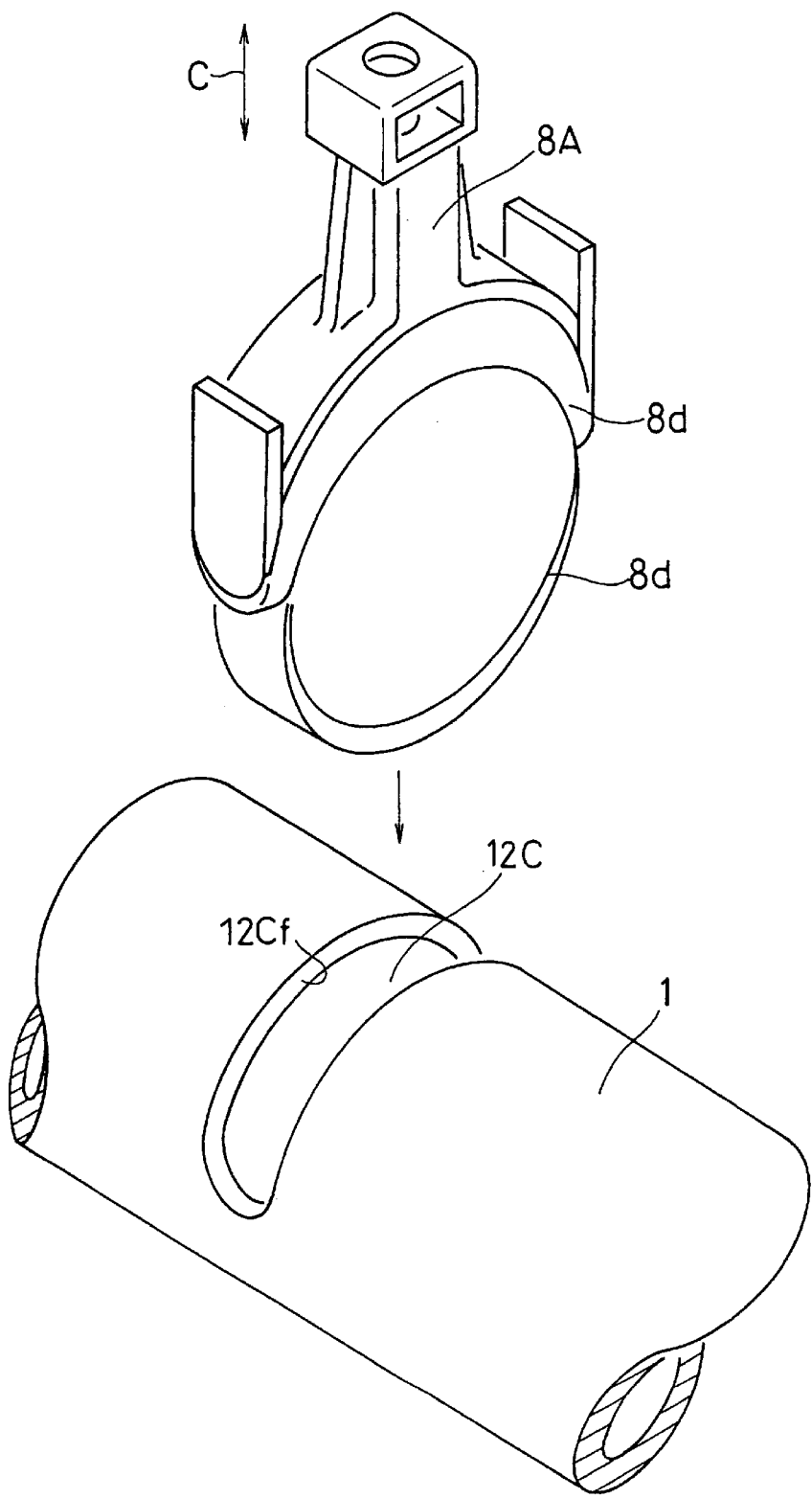
FIG. 7 is a perspective view showing a gate and a cut groove.
Figure 8A:
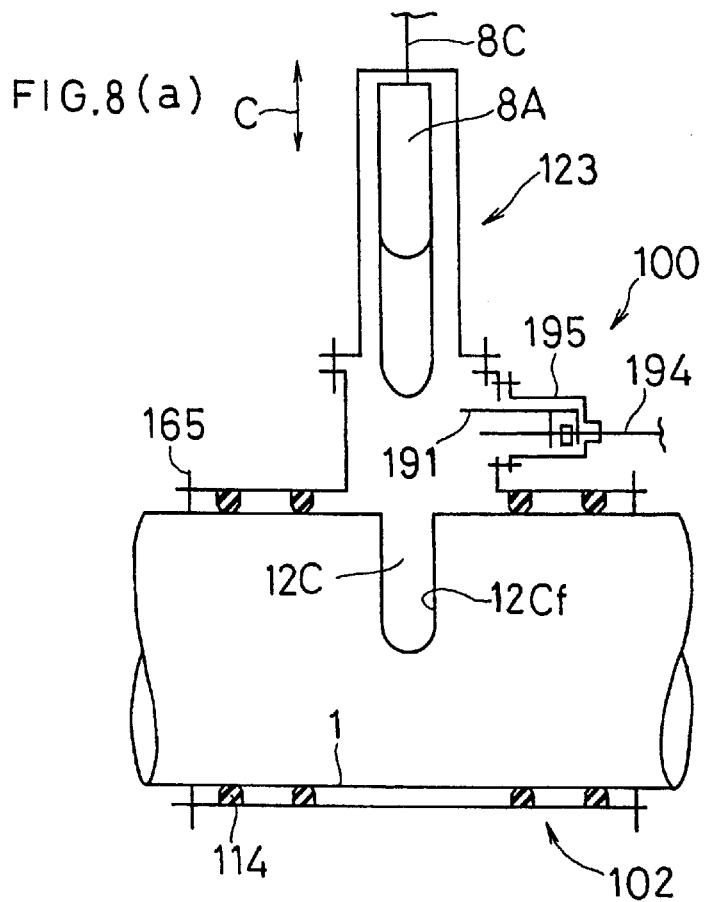
FIGS. 8(*a*) and 8(*b*) are schematic longitudinal sectional views each showing a gate insertion step.
Figure 8B:
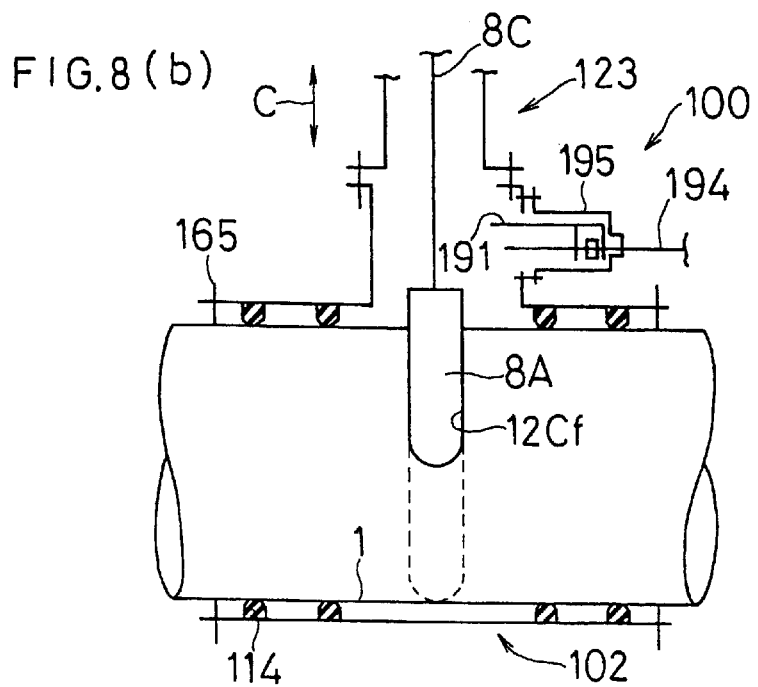

Referring to FIGS. 5 and 6, the gate assembly is generally designated at 123 and comprises the storage casing 124 and the gate BA. The storage casing 124 stores the gate 8A while the gate is opened. The storage casing 124 is provided with a flange 124a joined to the flange 221b of the first branched portion 221 . A rubber packing 117 is disposed to provide a hermetic seal between the storage casing 124 and the first branched portion 221. A valve spindle 8C is rotated in the forward or reverse direction so that the gate BA can slide in the radial direction C of the existing pipe 1. The gate 8A is provided with a rubber packing 8d. As seen in FIG. 7, when the gate BA enters the interior of the existing pipe 1 through the cut groove 12C, the rubber packing 8d blocks off the cut groove 12C and comes into pressure contact with the inner surface of the existing pipe 1 to stop the flow of water through the interior of the existing pipe 1.
Gate Mounting Step After the tool removal step, with the first valve 191 closed as shown in FIGS. 5 and 6, the operator fixedly secures the flange 124a of the storage casing 124 storing the gate 8A to the flange 221b of the first branched portion 221 by means of the assembling bolts 162. Subsequently, as shown in FIG. 8(a), the operator opens the first valve 191. After this valve release, the operator rotates the valve spindle 8C in the forward direction so that the gate 8A can enter the interior of the existing pipe 1 through the cut groove 12C and stop the flow of water through the interior of the existing pipe as shown in FIG. 8(b) (water stop step). With the existing pipe 1 blocked off, a change of piping or other work is carried out.
Gate Removal Step After the completion of the work such as the change of piping, the operator removes the gate 8A from the cut groove 12C in the reverse procedure to that of the gate mounting step and closes the first valve 191 for the subsequent removal of the gate assembly 123.

Description will then be made of an anticorrosive process of the cut groove 12C.

Anticorrosive Member Assembly 107

Figure 9:
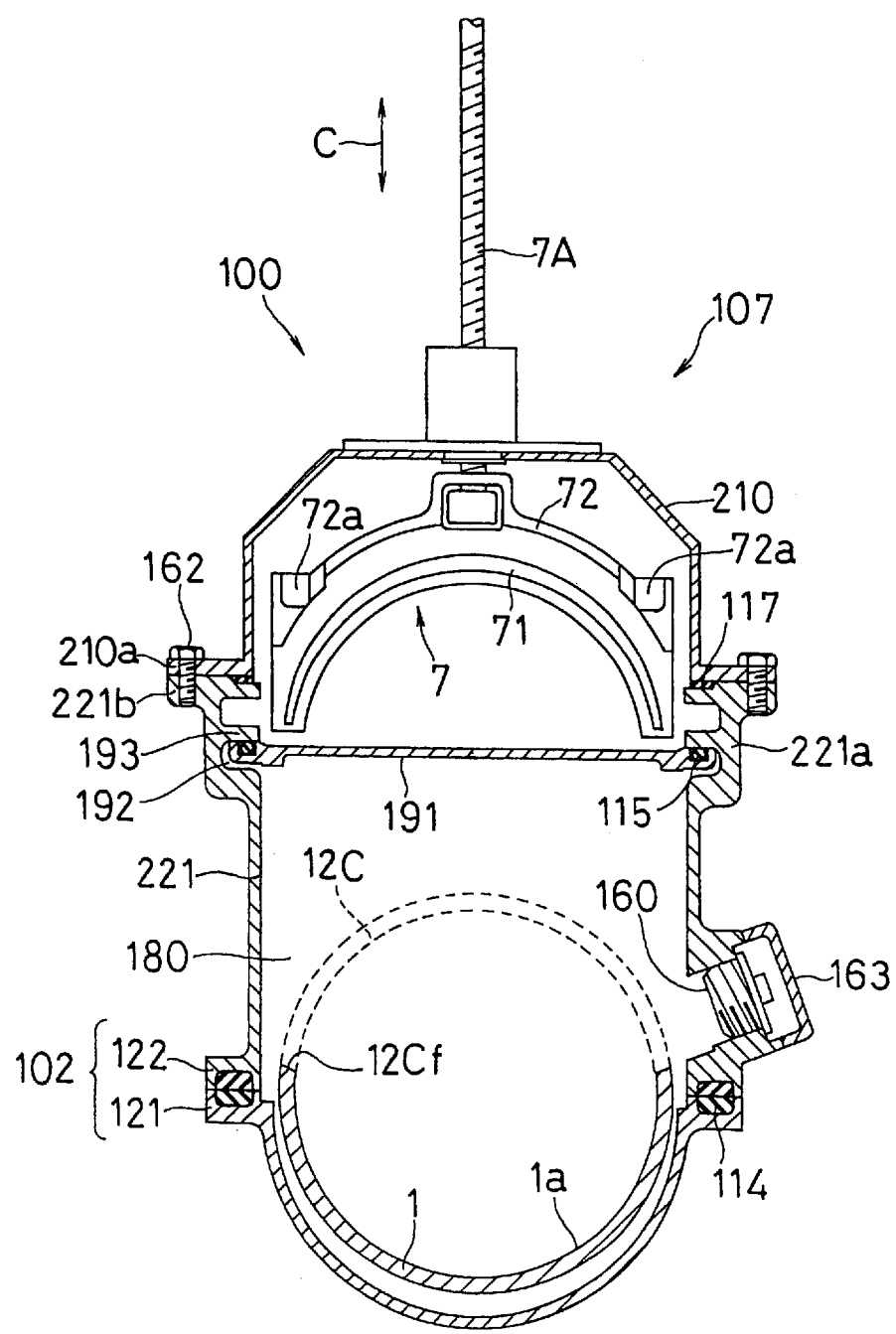
FIG. 9 is a transverse sectional view showing an anticorrosive member mounting step.
Figure 10:
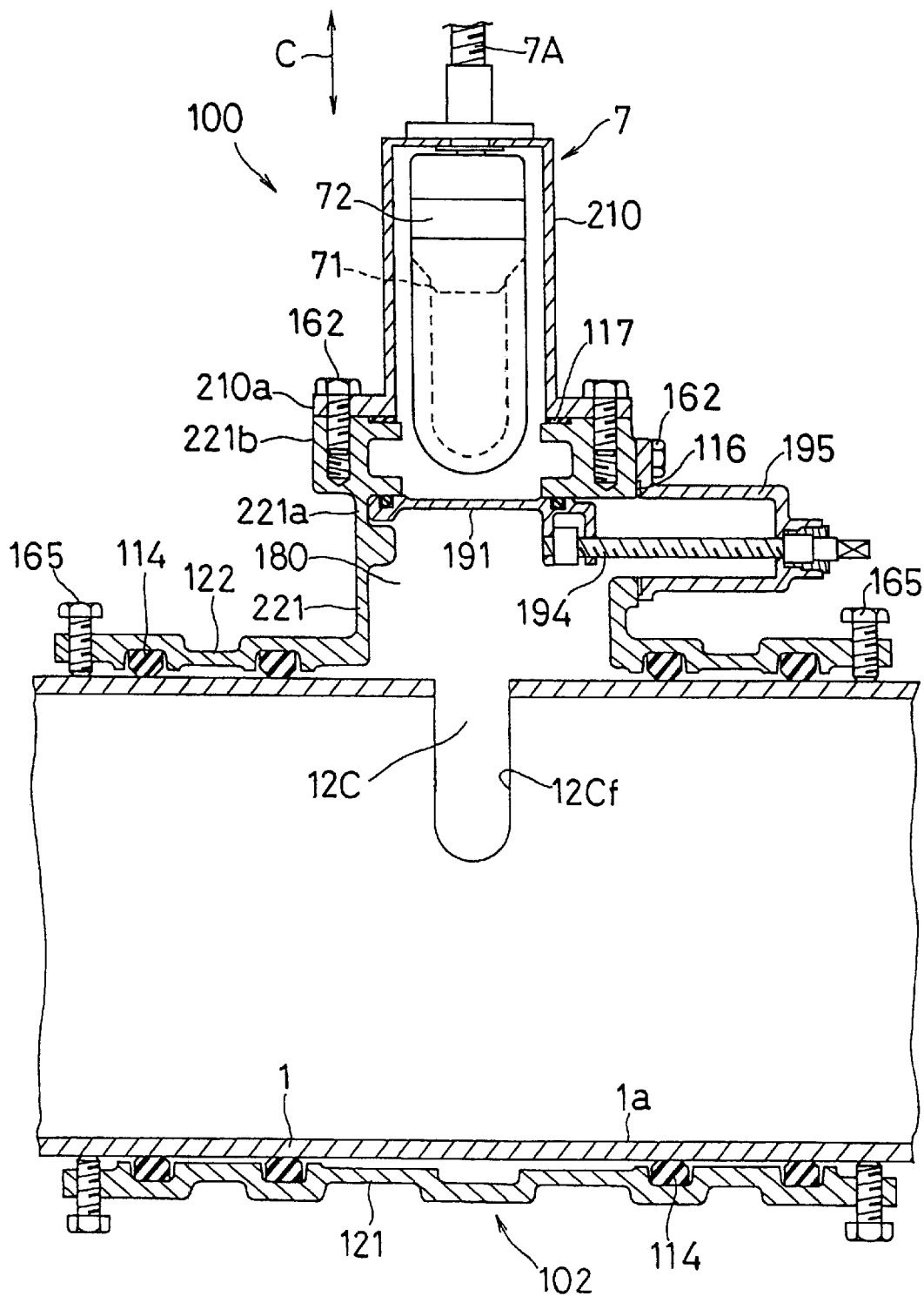
FIG. 10 is a longitudinal sectional view showing the anticorrosive member mounting step.

Referring to FIGS. 9 and 10, the anticorrosive member assembly is generally designated at 107 and comprises an anticorrosive member storage casing 210, an anticorrosive member 7 and a thrust shaft 7A for thrusting the anticorrosive member 7 into the existing pipe 1. The anticorrosive member storage casing 210 is provided with a flange 210a joined to the flange 221b of the first branched portion 221. A rubber packing 117 is disposed to provide a hermetic seal between the anticorrosive member storage casing 210 and the first branched portion 221.

The anticorrosive member 7 has a shape conforming to the cut groove 12C. That is, the anticorrosive member 7 is shaped so as to curve semi-annularly along the contour of the existing pipe 1 and so as not to impede the water flow through the interior of the existing pipe 1 after thrust into the existing pipe 1 The anticorrosive member 7 comprises a pressure contact portion 71 made of elastomer and a core portion (rigid portion) 72 shown in FIG. 13. The pressure contact portion 71 comes into pressure contact with the cut surface 12Cf of the cut groove 12C over the entire circumference thereof. The core portion 72 has a rigidity enough to resist the water pressure acting on the cut groove 12C, with the pressure contact portion 71 being baked integrally on the core portion 72. That is, the pressure contact portion 71 is integrally provided with the surroundings or surface of the core portion 72. Thus the pressure contact portion 71 fills the gap between the core portion 72 and the cut surface 12Cf.

Figure 12A:
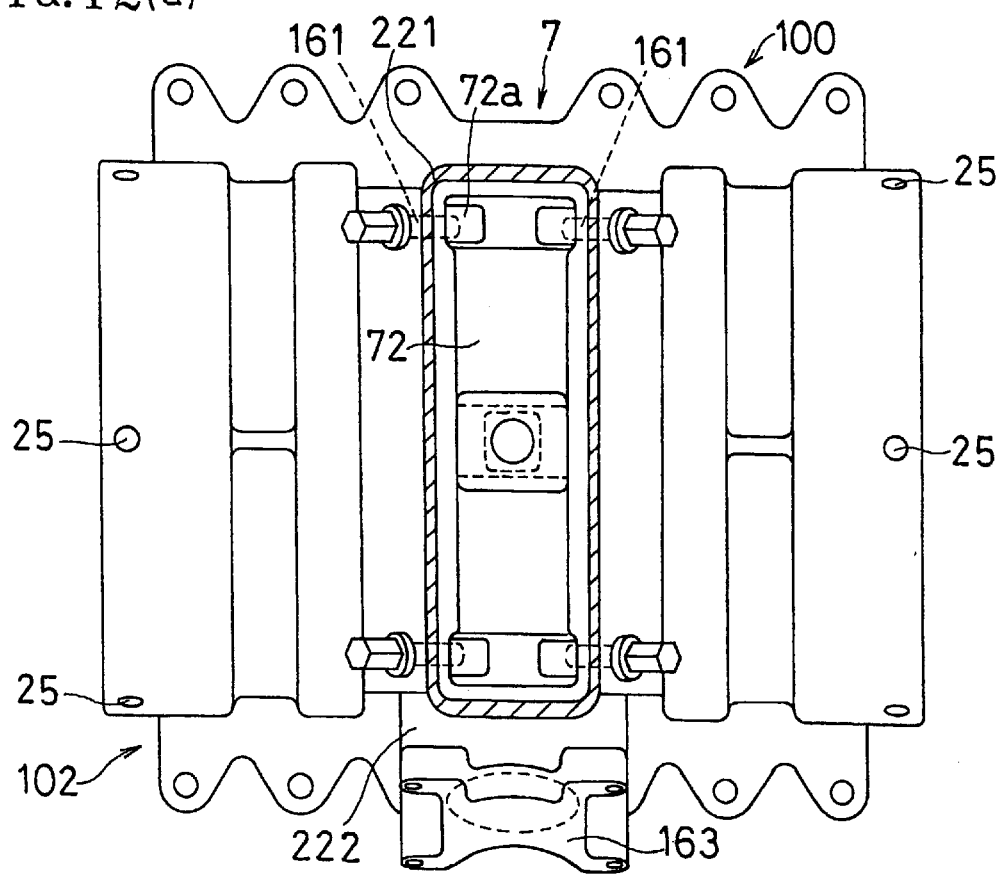
FIG. 12(*a*) is a top plan view partially in section showing a piping structure in accordance with the first embodiment, and FIG. 12(*b*) is a partly cut-way front elevational view showing the piping structure.
Figure 12B:
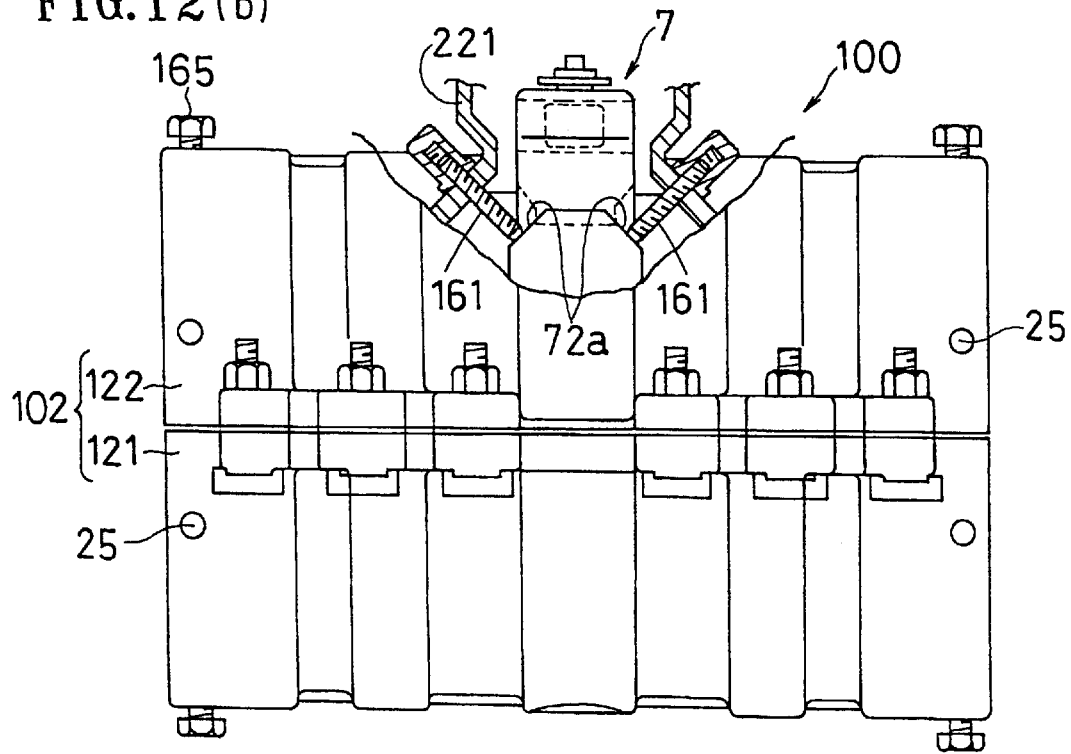
Figure 13:
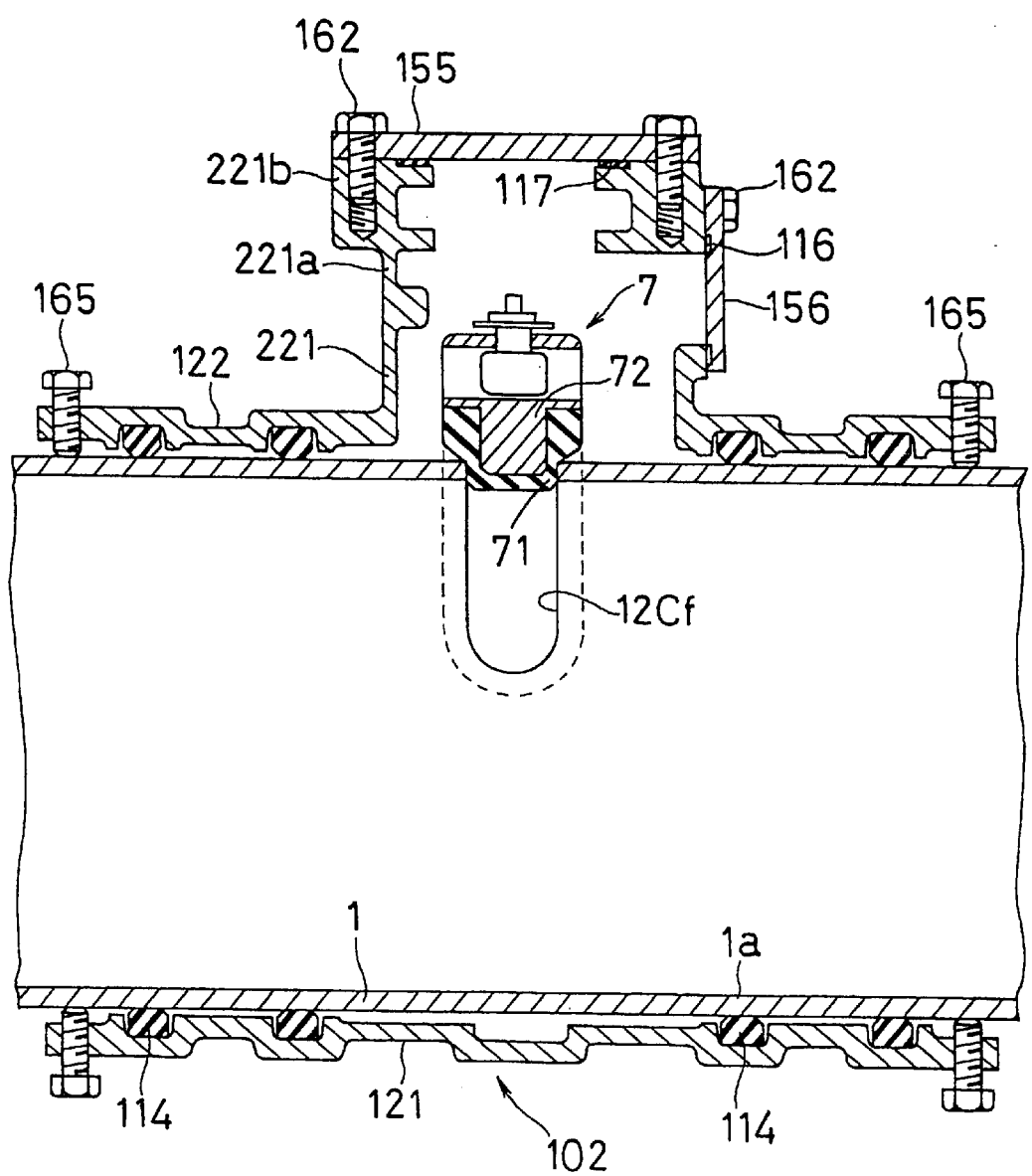
FIG. 13 is a longitudinal sectional view showing the piping structure in accordance with first embodiment.

As seen in FIG. 13, the core portion 72 is formed such that the width of portions other than the portion inserted into the existing pipe 1 is slightly larger than that of the cut groove 12C. As shown in FIGS. 12(a) and 12(b), the core portion 72 has at its opposite ends a screw abutment portion 72a against which abuts a fixing screw 161 pressing the core portion 72 toward the interior of the existing pipe 1. The thrust shaft 7A of FIG. 9 is rotated in the forward direction so that the anticorrosive member 7 can slide in the radial direction C of the existing pipe 1. After thrusting the anticorrosive member 7 into the existing pipe 1, the thrust shaft 7A is rotated in the reverse direction so that it can be disengaged from the anticorrosive member 7.

Anticorrosive Member Mounting Step

After the gate removal step, with the first valve 191 closed as shown in FIGS. 9 and 10, the operator securely fixes the flange 210a of the anticorrosive member storage casing 210 storing the anticorrosive member 7 therein, to the flange 221b of the first branched portion 221 by means of the assembling bolts 162.

Hermetically Closing Step

Figure 11A:
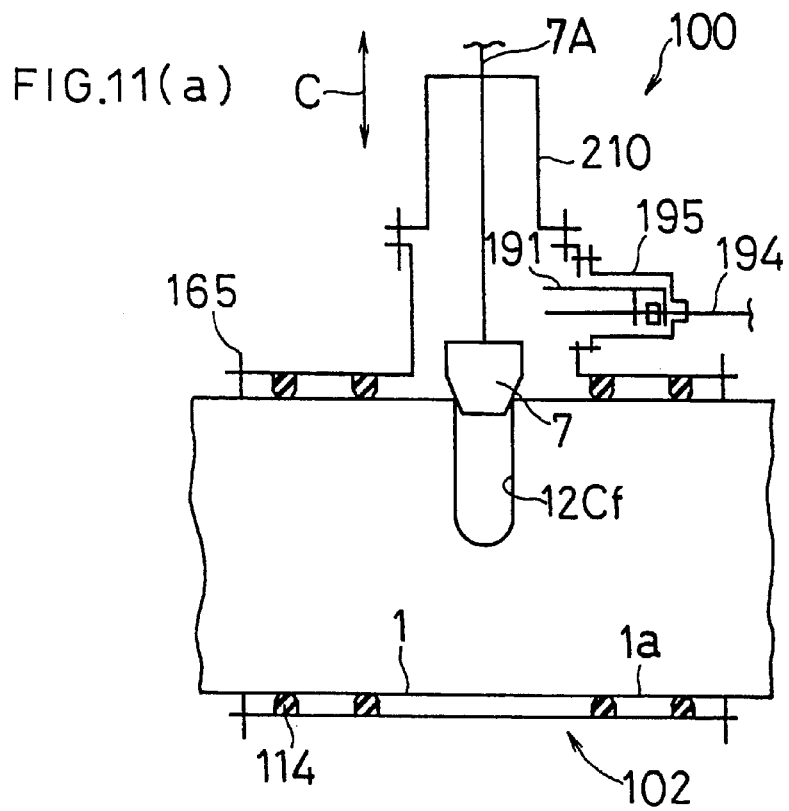
FIGS. 11(*a*) and 11(*b*) are schematic longitudinal sectional views each showing a hermetically closing step.

After the anticorrosive member mounting step, the operator releases the first valve 191. After this valve release, as shown in FIG. 11(a), the operator rotates the thrust shaft 7A in the forward direction so that the anticorrosive member 7 slides in the axial direction C of the pipe to fit into the cut groove 12C. After this fitting, the operator screws the fixing screw 161 of FIGS. 12(a) and 12(b).

Figure 11B:
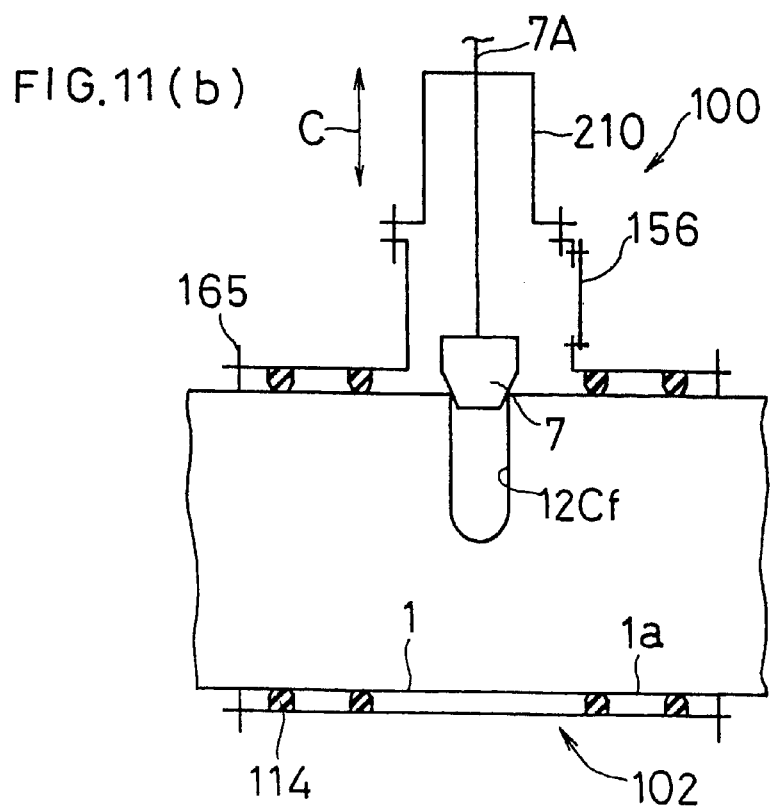

After the completion of the hermetically closing step, the operator removes the first valve 191, the valve spindle 194 and the valve bonnet 195 from the seal-up housing 102 of FIG. 11(a) and mounts a flange cover 156 shown in FIG. 11(b) in lieu of the valve bonnet 195. Afterward, the operator removes the anticorrosive member storage casing 210 and the thrust shaft 7A from the seal-up housing 102 and mounts the flange cover 155 of FIG. 13 therein in lieu of the anticorrosive member storage casing 210. A piping structure shown in FIG. 13 is thus acquired.

Second Embodiment

FIGS. 14 to 19 show a second embodiment of the present invention.

Valve Insertion Unit (Cutting Unit) 100

Figure 14:
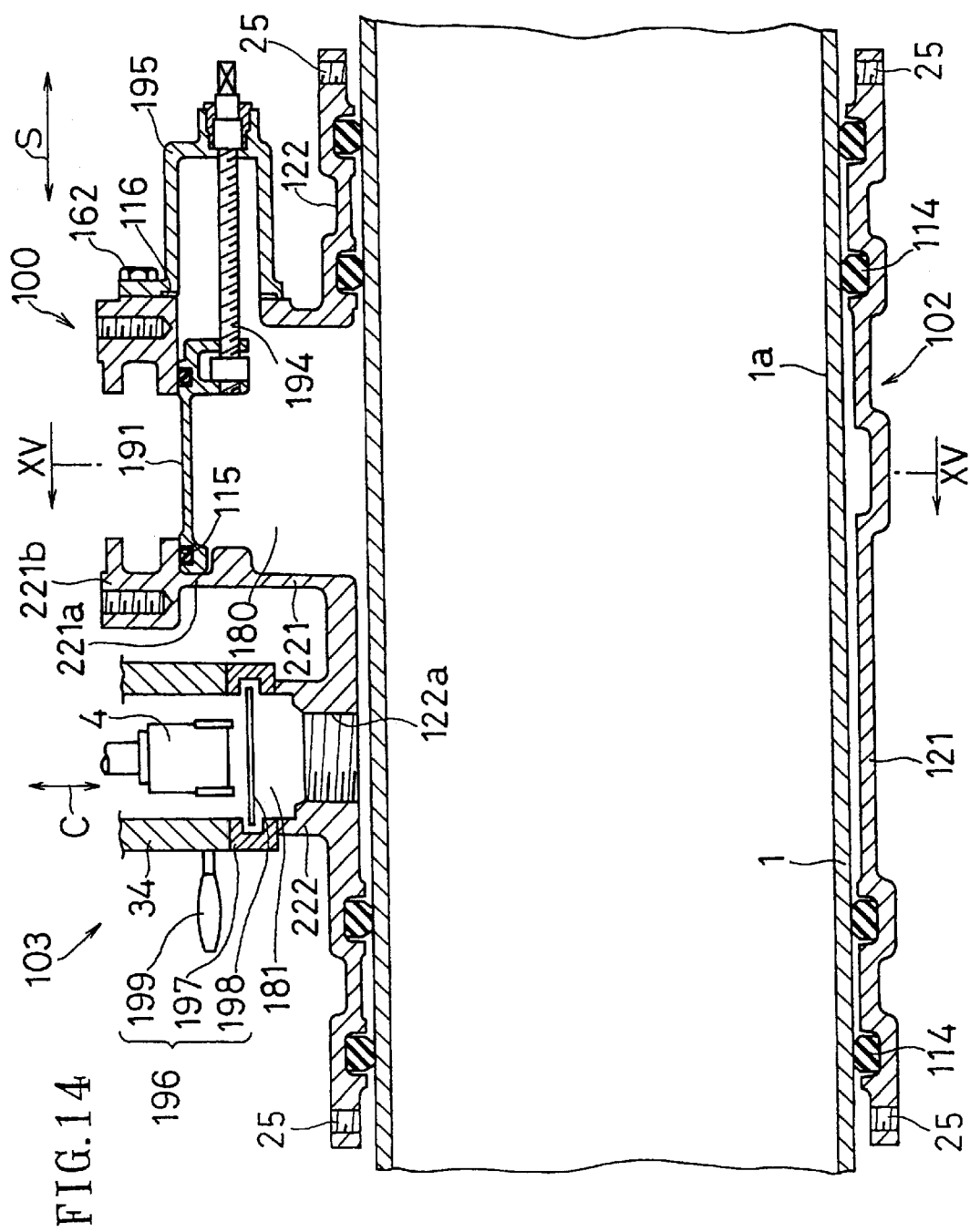
FIG. 14 is a longitudinal sectional view showing an assembling step of a method in accordance with a second embodiment of the present invention.
Figure 15:
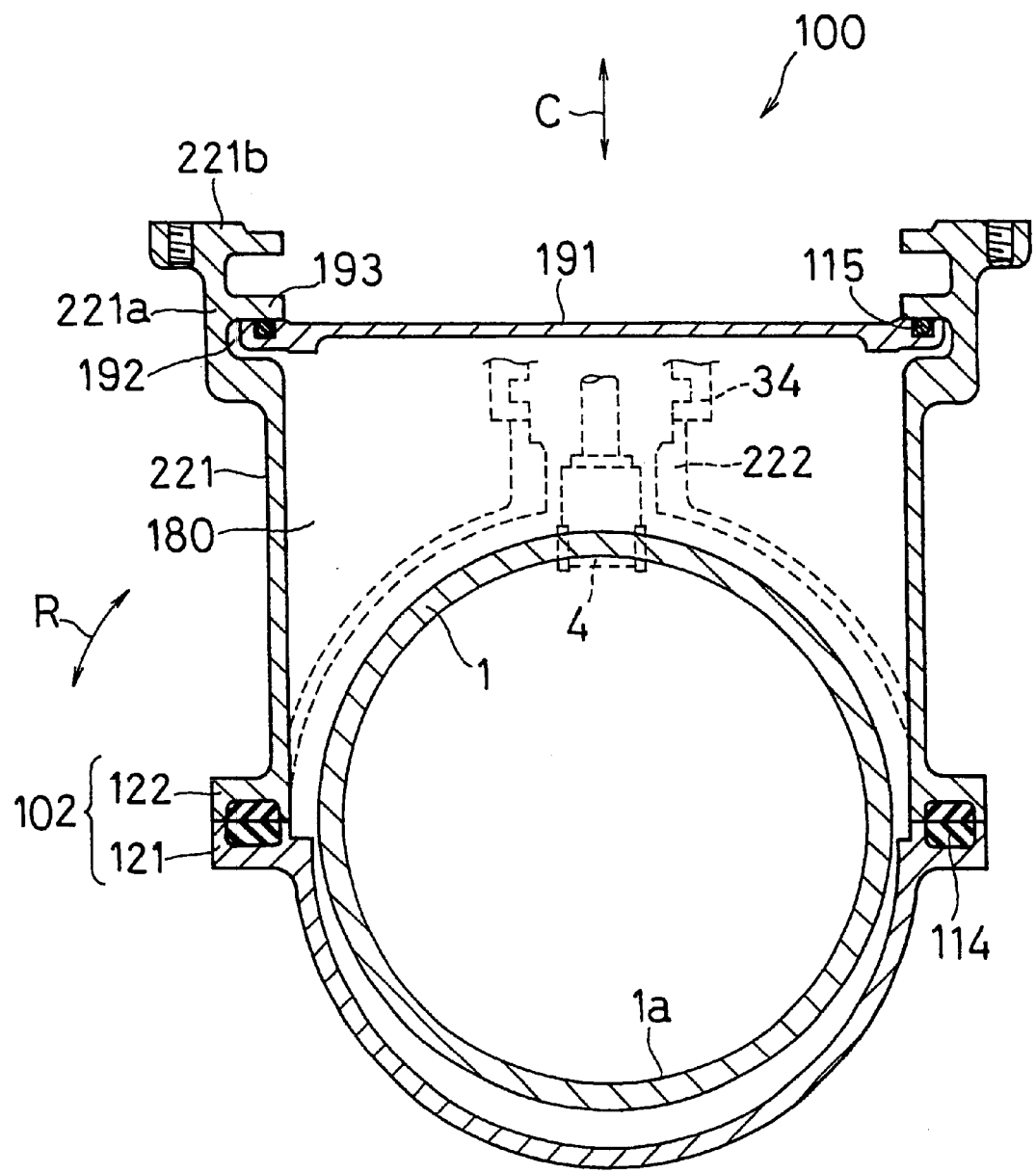
FIG. 15 is a cross-sectional view taken along a line XV—XV of FIG. 14.

Referring first to FIGS. 14 and 15, the valve insertion unit 100 comprises the seal-up housing 102 and the drill 103. The seal-up housing 102 comprises the first 122 and second 121 housing parts halved in the circumferential direction R of the existing pipe 1. The seal-up housing 102 has a structure suited to turn around the existing pipe 1 in its circumferential direction R. The first housing part 122 is provided with a first branched portion 221 and a second branched portion 222 which are formed integrally with each other and which extend outwardly in the radial direction C of the existing pipe 1 in a diverged fashion. The first branched portion 221 and the second branched portion 222 are spaced apart (positionally offset) from each other in the axial direction S of the existing pipe 1.

The arrangements of the valve insertion unit 100 and other elements are the same as those in the first embodiment, and hence the same or corresponding parts are designated by the same reference numerals and will not again be described in detail.

Assembling Step

The first valve 191 is previously mounted on the first branched portion 221 whilst the valve assembly 196 is in advance mounted on the second branched portion 222. First, with a liquid (water) flowing through the interior of the existing pipe 1 of FIG. 14, the operator mounts the seal-up housing 102 on the existing pipe 1 at a cut site thereof and puts the first 122 and second 121 housing parts together by means of assembling bolts not shown. The drill 103 is then mounted on the second branched portion 222. At that time, the operator closes the first valve 191 so as to shut off the gate passage aperture 180 of the seal-up housing 102 while allowing the cutting tool 4 to enter the cutting tool insertion aperture 181 with the second valve 198 opened. The existing pipe 1 is thus partially enclosed by the seal-up housing 102 in a hermetically sealed fashion.

Infeed Step

After the assembling step, the operator feeds the cutting tool 4 inwardly in the radial direction C of the existing pipe 1 while allowing the cutting tool 4 to perform a cutting motion for cutting the existing pipe in the same manner as the infeed step of the first embodiment. As a result, the cutting tool 4 advances to the position cutting through a part of the pipe wall 1a of the existing pipe 1 as indicated by a dotted line in FIG. 15.

Feed Step

After the infeed step, with the cutting tool 4 in the feed motion turning around the existing pipe 1 in the circumferential direction R thereof in the same manner as the feed step of the first embodiment, the operator turns the cutting tool 4 around the existing pipe 1 over the range of substantially the half circumference in the circumferential direction R thereof. A cut groove 12C (FIG. 16) is thus formed in the existing pipe 1, the cut groove 12C extending over the range of substantially the half circumference in the circumferential direction R.

Tool Removal Step

Figure 16:
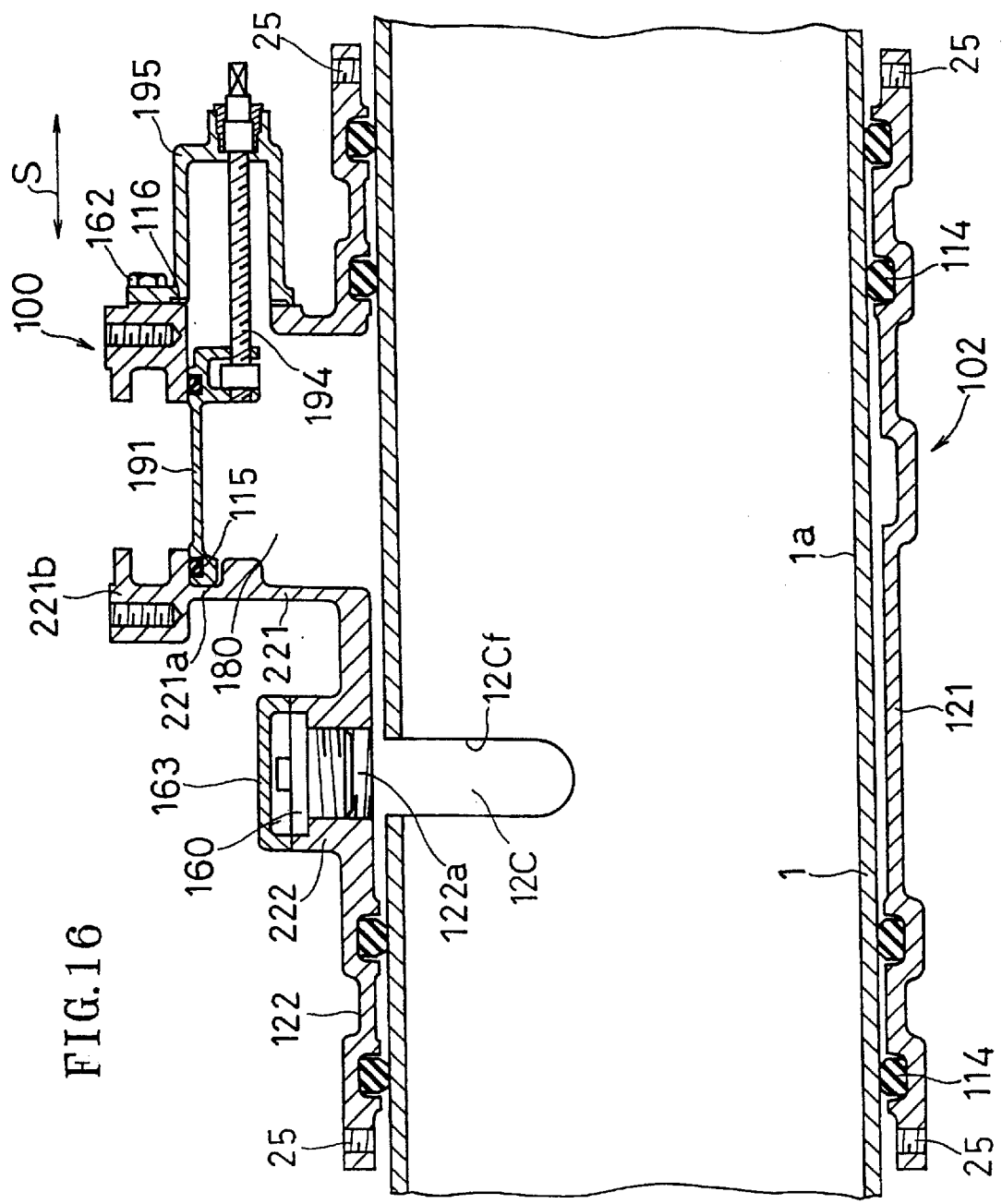
FIG. 16 is a longitudinal sectional view showing status after a tool removal step.

After the completion of the feed step, in the same manner as the tool removal step of the first embodiment the operator dismounts the drill 103 and the valve assembly 196 and screws the plug 160 into the internally threaded portion 122a of the second branched portion 222. Afterward, the block-off cover 163 is mounted on the second branched portion 222 as shown in FIG. 16.

Gate Mounting Step

Figure 17A:
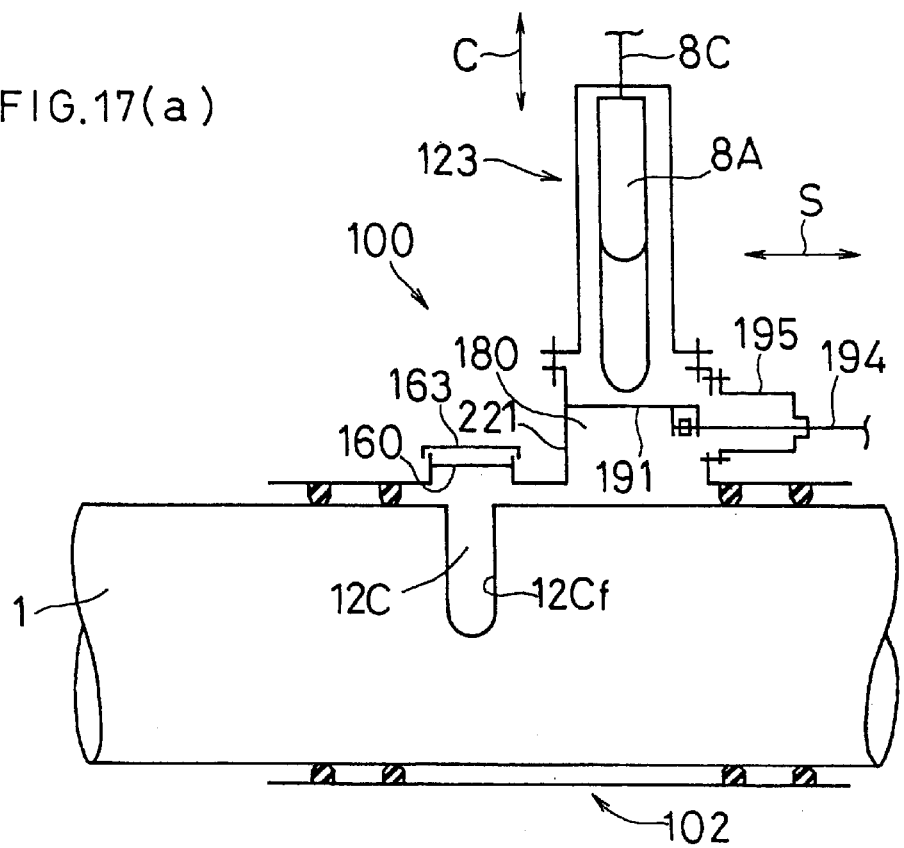
FIGS. 17(*a*) and 17(*b*) are schematic longitudinal sectional views each showing a moving step.

After the tool removal step, with the first valve 191 closed as shown in FIG. 17(a), the operator mounts the gate assembly 123 on the first branched portion 221.

Moving Step

Figure 17B:
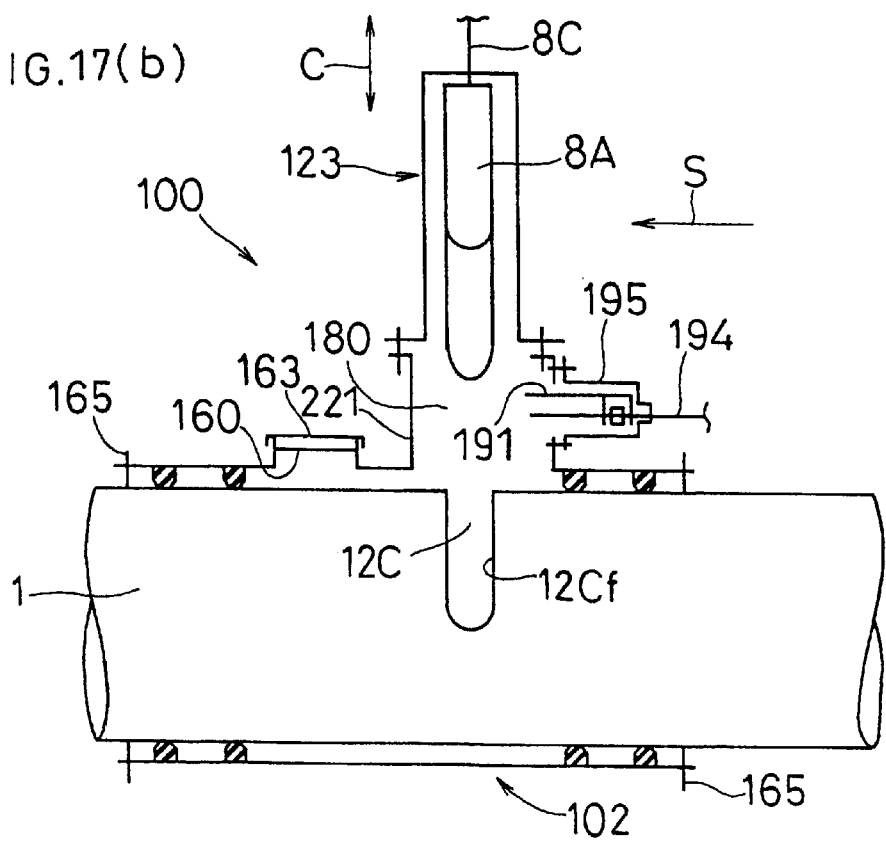
Figure 18:
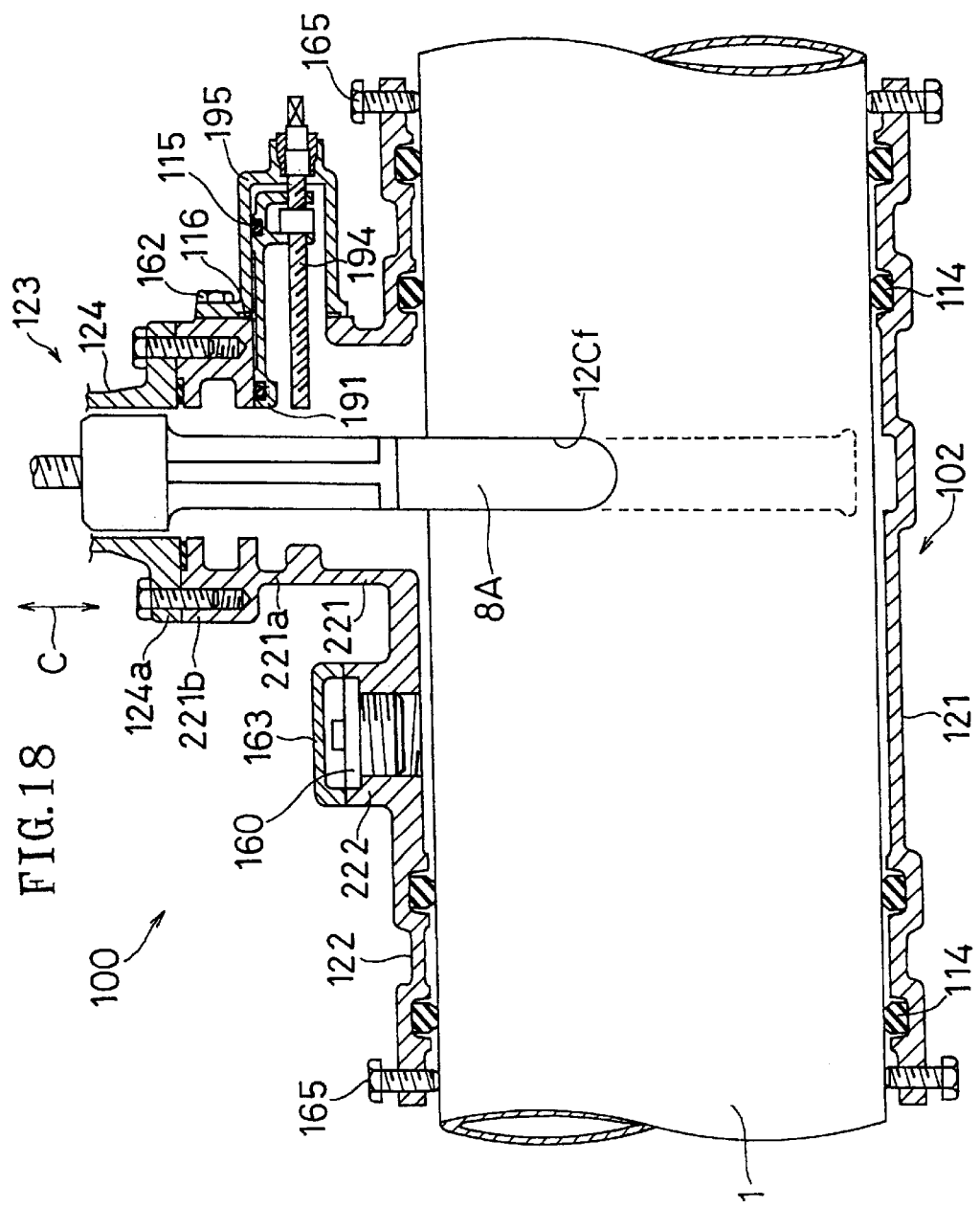
FIG. 18 is a longitudinal sectional view showing a gate insertion step.

After the gate mounting step, as shown in FIG. 17(b) the operator moves the seal-up housing 102 in the axial direction S of the existing pipe 1 so that the gate 8A moves to the position corresponding to the position of the cut groove 12C. Afterward, the operator fixedly secures the seal-up housing 102 to the existing pipe 1 by means of the setscrews 165. The operator then opens the first valve 191. After this valve release, as shown in FIG. 18 the operator allows the gate 8A to enter the interior of the existing pipe 1 through the cut groove 12C to stop the flow of water through the interior of the existing pipe 1. With the existing pipe 1 blocked off, a change of piping or other work is carried out.

Gate Removal Step

After the completion of the work such as the change of piping, the operator removes the gate 8A from the cut groove 12C and closes the first valve 191 for the subsequent removal of the gate assembly 123.

After the gate removal step, the anticorrosive process of the cut groove 12C is carried out using the anticorrosive member mounting step and the hermetically closing step in the same manner as the first embodiment.

Figure 19:
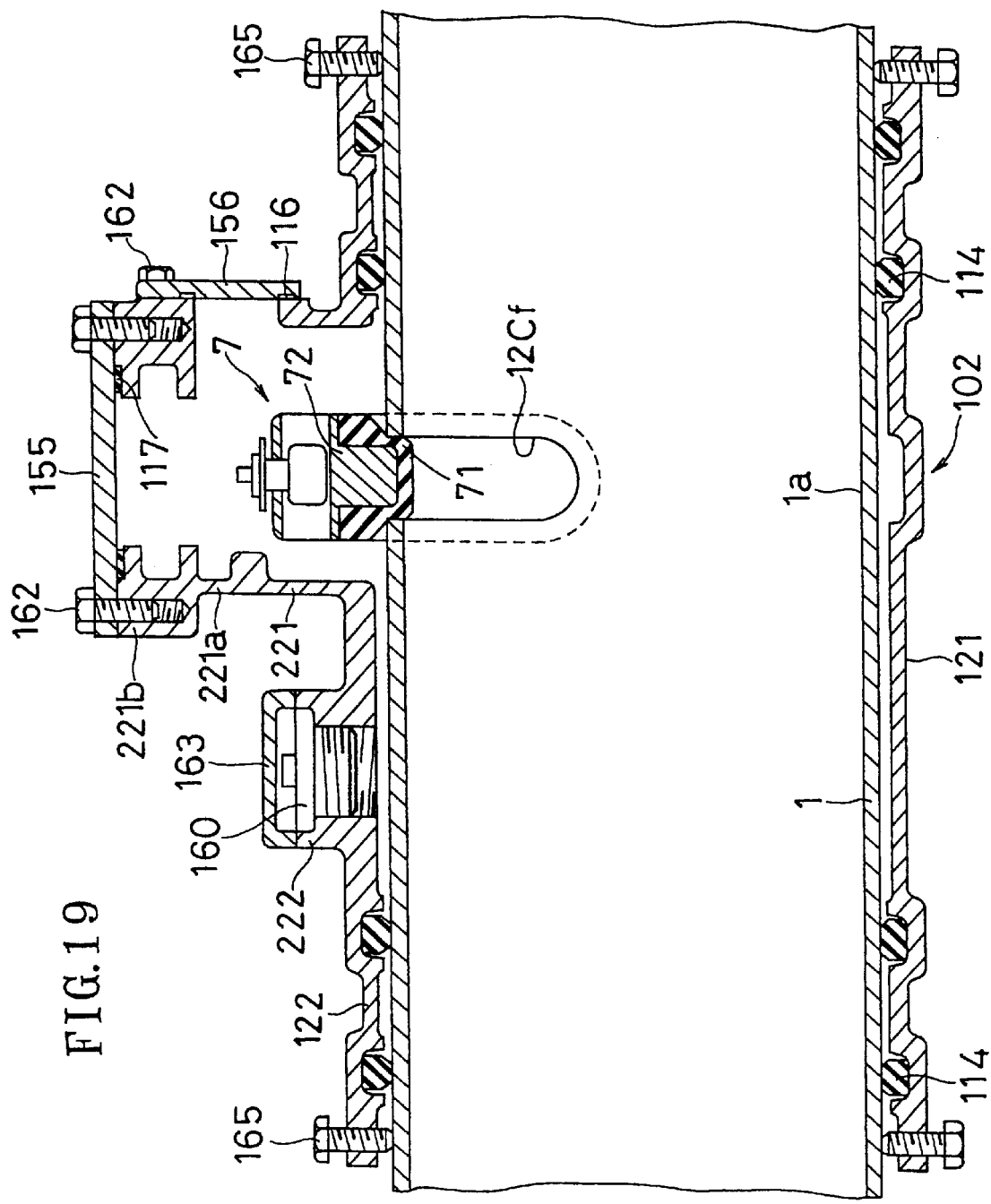
FIG. 19 is a longitudinal sectional view showing a piping structure in accordance with the second embodiment.

A piping structure shown in FIG. 19 is thereby acquired.

By the way, the gate passage aperture 180 has been opened or closed by sliding the first operation valve 191 in the above embodiments, although the first operation valve 191 in the present invention may be rotated around the horizontal axis so as to open or close the gate passage aperture.

In the present invention, the seal-up housing may slightly be moved in the axial direction of the existing pipe after the rotation of the seal-up housing through substantially the half circumference of the existing pipe and may further be rotated through substantially the half circumference, to thereby form a cut groove having a larger width than the diameter of the cutting tool. This allows a gate having a larger width to be inserted therein.

Third Embodiment

FIGS. 20 to 26 show a third embodiment of the present invention.

Anticorrosive Member Insertion Unit 10

Figure 20:
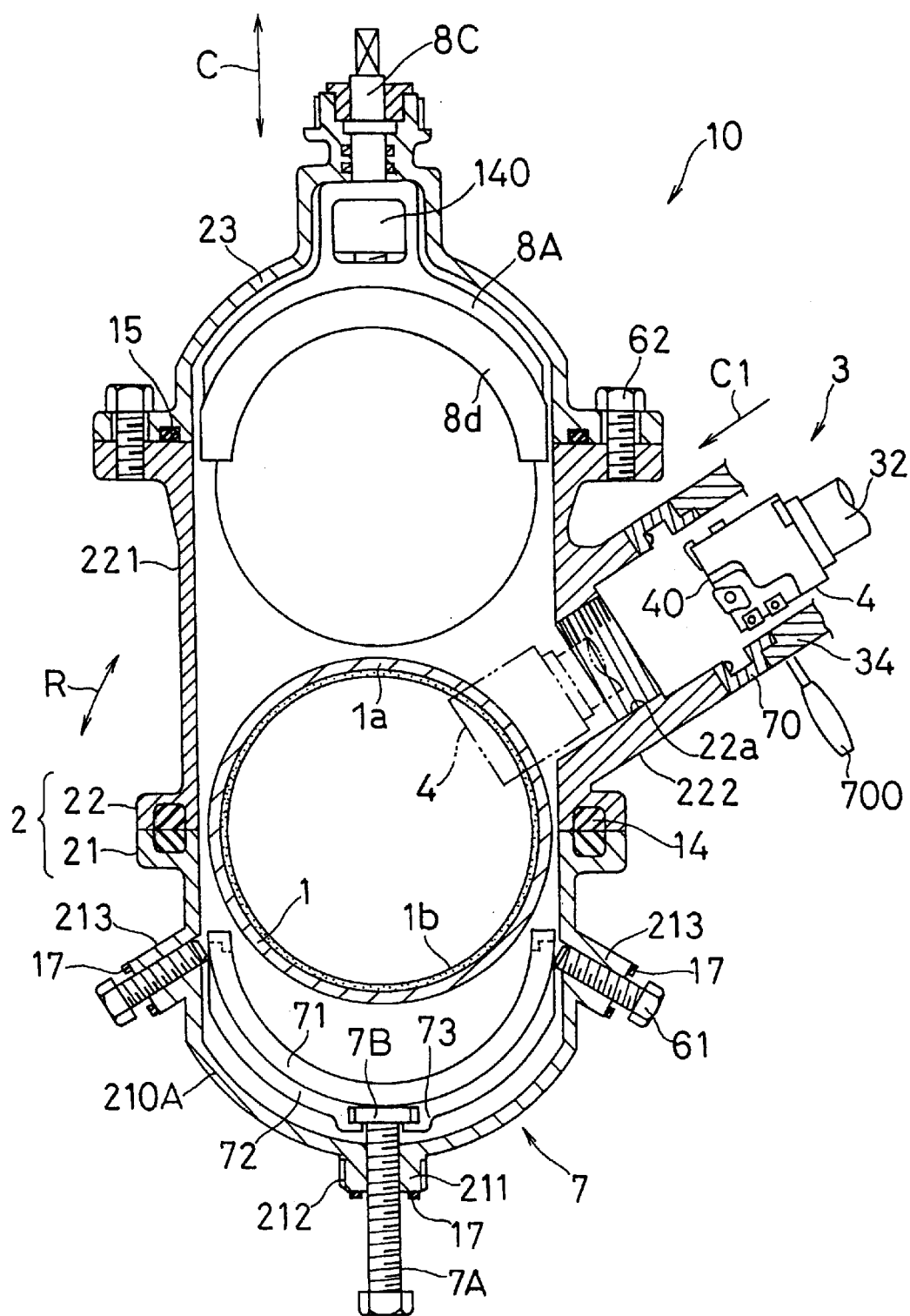
FIG. 20 is a transverse sectional view showing an assembling step of a method in accordance with a third embodiment of the present invention.
Figure 21:
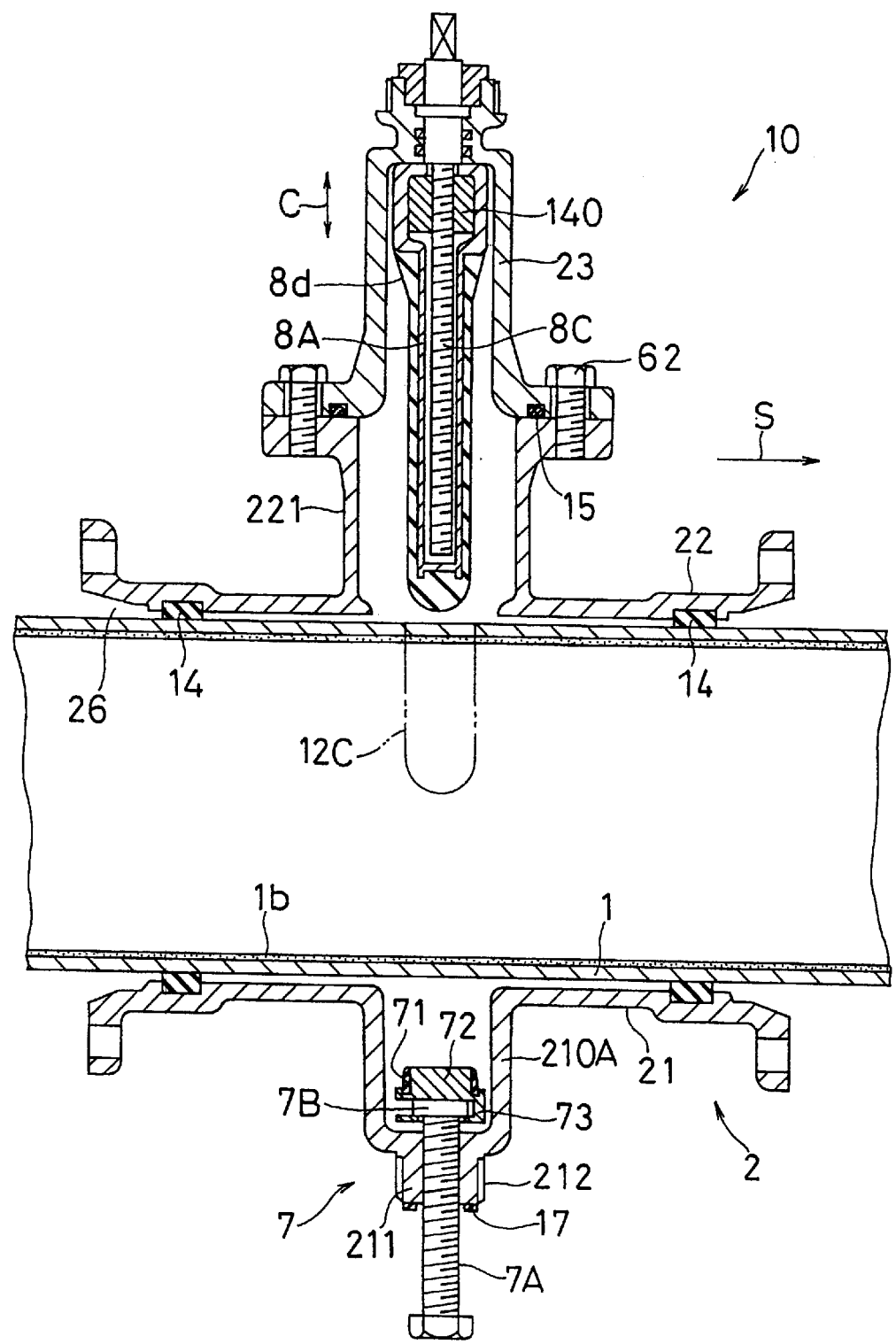
FIG. 21 is a longitudinal sectional view showing the assembling step.

Referring to FIGS. 20 and 21, an anticorrosive member insertion unit 10 comprises a seal-up housing 2, the gate 8A, the valve spindle 8C, the anticorrosive member 7 and an anticorrosive member insertion bolt 7A. The seal-up housing 2 houses the gate 8A and the anticorrosive member 7 and comprises first 22 and second 21 housing parts halved in the circumferential direction R of the existing pipe 1. A valve bonnet 23 makes up the seal-up housing 2 in conjunction with the first 22 and second 21 housing parts. The valve spindle BC and the anticorrosive member insertion bolt 7A serve to slide the gate 8A and the anticorrosive member 7 in the axial direction C of the existing pipe 1.

A rubber packing 14 is disposed to provide a hermetic seal between the first housing part 22 and the second housing part 21 and between the seal-up housing 2 and the existing pipe 1 shown in FIG. 21. A rubber ring 15 is disposed to provide a hermetic seal between the valve bonnet 23 and the first housing part 22. The opposite ends of the seal-up housing 2 are provided with packing insertion portions 26 in which a rubber ring 16 (FIG. 24) is fitted.

The second housing part 21 is provided with an anticorrosive member storage casing (portion) 210A for enclosing the anticorrosive member 7, the storage casing 210A projecting outwardly in the radial direction C of the existing pipe 1 in a diverged fashion. As shown in FIG. 20, the anticorrosive member storage casing 210A is formed with a bolt insertion portion 211 and a pair of fixing screw insertion portions 213, the portions 211 and 213 projecting outwardly in the radial direction C of the existing pipe 1. The anticorrosive member insertion bolt 7A is threadedly engaged with the bolt insertion portion 211. The bolt insertion portion 211 has at its outer peripheral surface an externally threaded portion 212 with which a cap 65 (FIG. 26) is threadedly engaged. The pair of fixing screw insertion portions 213 are formed substantially toward the center of the existing pipe 1 at positions in proximity to the opposite ends of the anticorrosive member 7 enclosed in the anticorrosive member storage casing 210A. Fixing screws 61 are threadedly engaged with the fixing screw insertion portions 213. Rubber rings 17 are fixedly disposed at the bolt insertion portion 211 and the pair of the fixing screw insertion portions 213 to provide hermetic seals between the insertion portions 211, 213 and the anticorrosive member insertion bolt 7A and the fixing screws 61, respectively, when the anticorrosive member insertion bolt 7A and the fixing screws 61 are threaded in.

The first housing part 22 is provided with the first branched portion 221 and the second branched portion 222 which extend outwardly in the radial direction C of the existing pipe 1 in a diverged manner. The second branched portion 222 is formed diagonally relative to the first branched portion 221 in such a manner as to diverge from the first branched portion 221.

The valve bonnet 23 is fastened via assembling bolts 62 to the first branched portion 221. The first branched portion 221 and the valve bonnet 23 accommodate the gate 8A upon the valve release.

Figure 23:
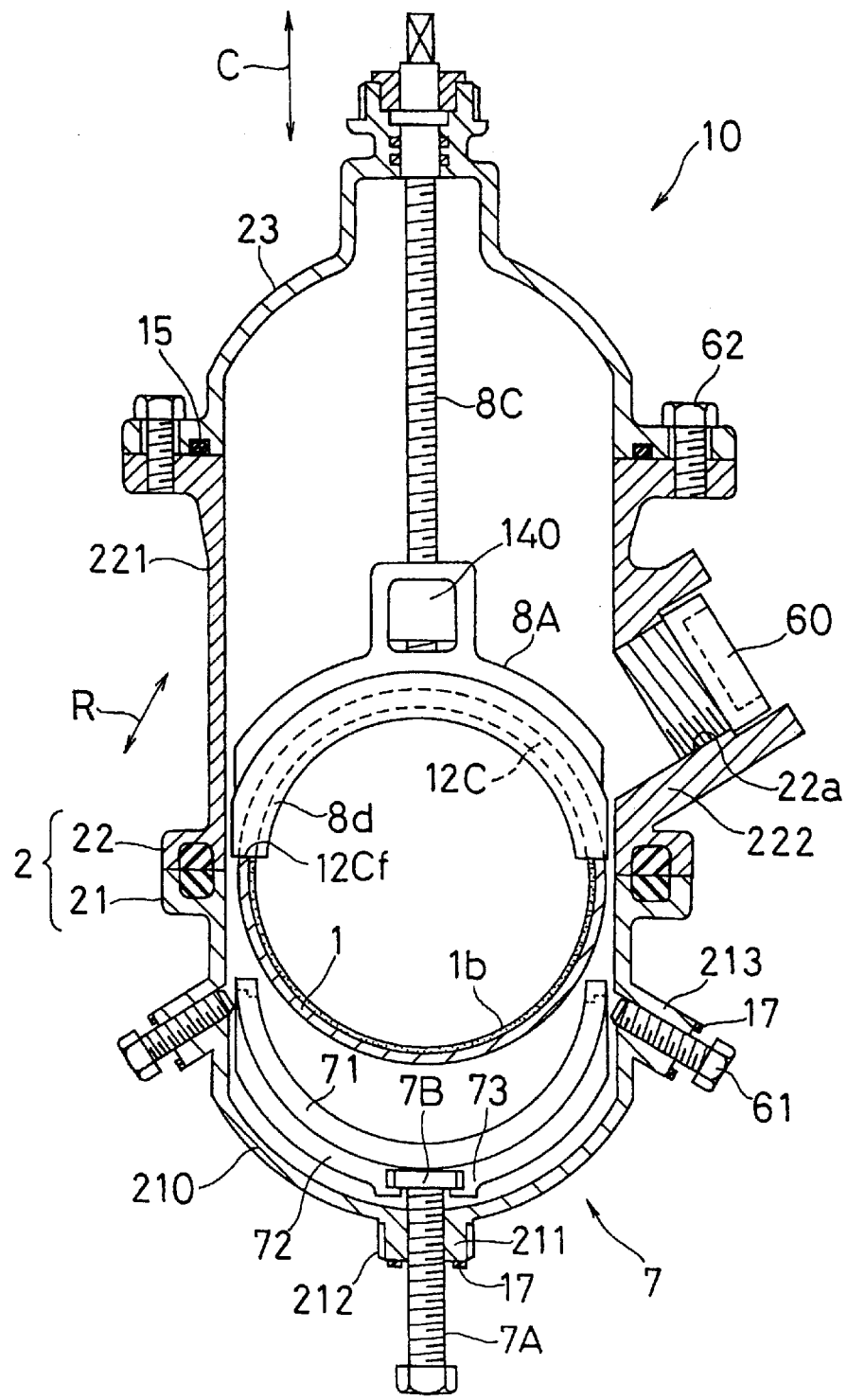
FIG. 23 is a transverse sectional view showing a water stop step.

The second branched portion 222 is opened toward the center of the existing pipe 1 so that the milling cutting tool 4 fitted to the second branched portion 222 cuts through the first branched portion 221. An attachment 34 of the drill 3 is firmly secured to the second branched portion 222 by way of an operation valve 70. A rubber ring not shown is disposed to provide a hermetic seal between the second branched portion 222 and the operation valve 70 and between the operation valve 70 and the attachment 34. The second branched portion 222 has an internally threaded portion 22a in which a plug 60 of FIG. 23 is screwed.

Gate 8A

The gate 8A slides in the axial direction C of the existing pipe 1 within the first housing part 22 by rotating the valve spindle 8C in the forward or reverse direction. A rubber packing 8d is fitted to the gate 8A. When the gate 8A enters the interior of the existing pipe 1 through the opening 12C (FIG. 21), the rubber packing 8d blocks up the opening 12C and comes into pressure contact with the inner peripheral surface 1b of the existing pipe 1 to thereby stop the flow of water through the interior of the existing pipe 1. A known top 140 is threadedly engaged with the valve spindle 8C.

Anticorrosive Member 7

Figure 22A:
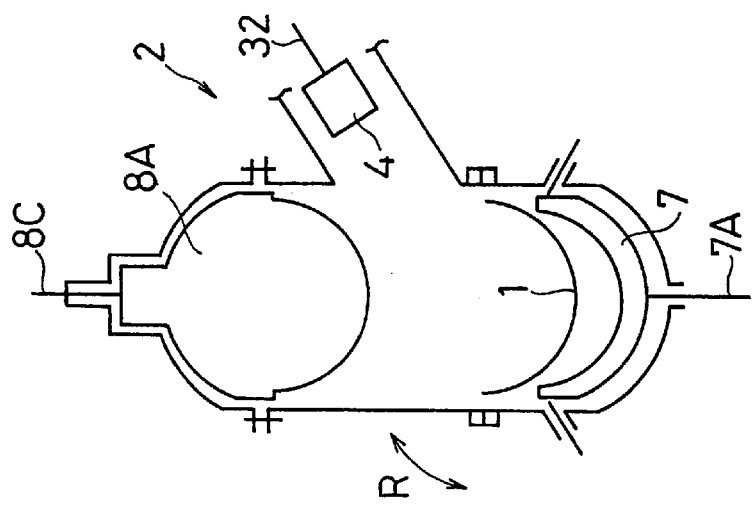
FIGS. 22(a), 22(b) and 22(c) are schematic transverse sectional views each showing an opening formation step.
Figure 22B:
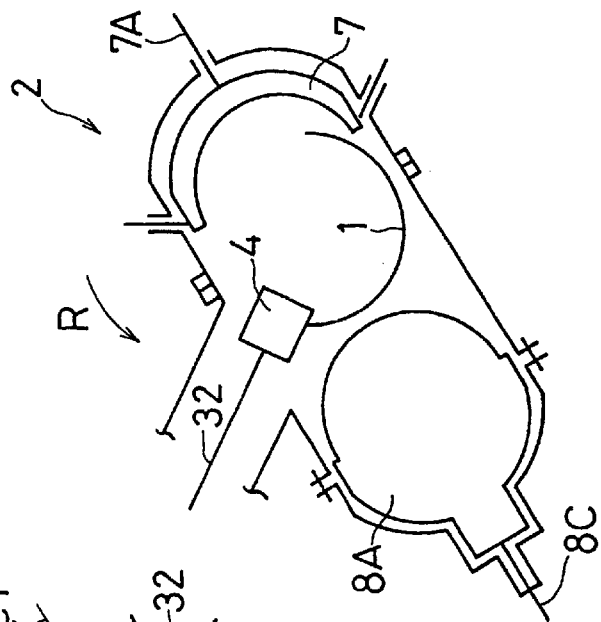
Figure 22C:
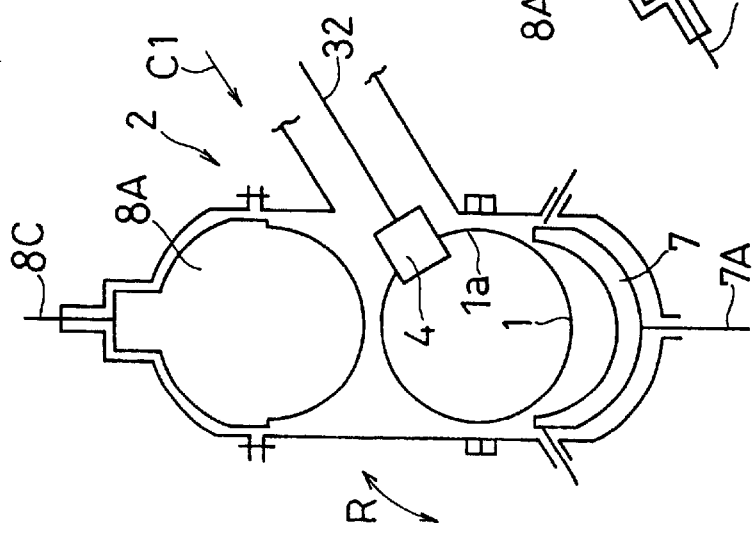

As shown in FIGS. 20 and 22, the anticorrosive member 7 is spaced about 180 degrees apart from the gate 8A in the circumferential direction R of the existing pipe 1. The anticorrosive member 7 has a shape conforming to the elliptical opening 12C extending over 180 degrees or the angular range slightly smaller than 180 degrees formed by the cutting tool 4. That is, the anticorrosive member 7 is shaped so as to curve semi-annularly along the existing pipe and so as not to impede the water flow through the interior of the existing pipe 1 after thrust into the existing pipe 1. The anticorrosive member 7 comprises a pressure contact portion 71 made of elastomer and a core portion (rigid portion) 72. The pressure contact portion 71 comes into pressure contact with the cut surface 12Cf of the opening 12C over substantially the entire circumference thereof. The core portion 72 has a rigidity against the water pressure acting on the opening 12C, with the pressure contact portion 71 being baked integrally on the core portion 72. The core portion 72 has an engaging portion 73 with which is engaged a thrust-in portion 7B integrally formed at the extremity of the anticorrosive member insertion bolt 7A. Furthermore, as shown in FIG. 21, the core portion 72 is formed such that the width of portions other than the portion inserted into the existing pipe 1 is slightly larger than that of the opening 12C.

Drill 3

Referring to FIG. 20, the drill 3 is attached via the operation valve 70 to the second branched portion 222. The drill 3 is provided to form the opening 12C (FIG. 21) and is equipped with the milling cutting tool 4. The cutting tool 4 is fixedly secured to the extremity of the cutter shaft 32 of the drill 3. The cutter shaft 32 is coupled to the motor such as an electric motor not shown so that the cuter shaft 32 turns by a motive power from the motor.

This drill 3 could be of any structure similar to that of the known drill so long as the cutting tool 4 is an end mill.

A method will then be described.

Enclosing Step

First, with a liquid (water) flowing through the interior of the existing pipe 1 of FIG. 20, the operator mounts the seal-up housing 2 on the existing pipe 1 at a cut site thereof and puts the second housing part 21 holding the anticorrosive member 7 and the first housing part 22 together by means of assembling bolts not shown. The drill 103 is then mounted on the second branched portion 222. The seal-up housing 2 thus encloses a part of the existing pipe 1 in a hermetically sealed fashion as shown in FIG. 20.

Opening Formation Step

After the assembling step, the operator operates the drill 3 to drive the motor not shown so that the cutting tool 4 turns together with the cutter shaft 32 to start the cutting motion for cutting the existing pipe 1. When the operator operates the drill 3 to feed the cutting tool 4 toward the infeed direction C1 while performing the cutting motion, an end face 40 of the cutting tool 4 finally reaches the position partially cutting through a pipe wall la of the existing pipe 1 as indicated by a chain double-dashed line and as shown in FIG. 22(*a*). The infeed by the cutting tool 4 is thus complete.

With the cutting tool 4 in the cutting motion after this infeed, the operator turns the seal-up housing 2 around the existing pipe 1 in the circumferential direction R thereof as shown in FIG. 22(*b*). More specifically, the cutting tool 4 makes a feed motion turning together with the seal-up housing 2 in the circumferential direction R while simultaneously turning about the cutter shaft 32. In this manner, with the cutting tool 4 in its feed motion, the operator turns the cutting tool 4 around the existing pipe 1 through approx. 180 degrees or angular range slightly smaller than 180 degrees in the circumferential direction R. Afterward, the operator retreats the cutting tool 4 and restores it to its initial position as shown in FIG. 22(*c*). The existing pipe 1 is thus notched to form an elliptical opening 12C extending over approx. 180 degrees or an angular range slightly smaller than 180 degrees in the circumferential direction R without creating any cut-off sections.

Water Stop Step

After the opening formation step, the operator operates an operation lever 700 of the operation valve 70 of FIG. 20 to close the operation valve 70. After this removal, the operator attaches a known plug insert tool not shown to the operation valve 70 to release the operation valve 70. After this valve release, the operator acts on the plug insert tool not shown to screw the plug 60 of FIG. 23 into the internally threaded portion 22a of the second branched portion 222. After this screwing, the operator removes the operation valve 70 (FIG. 20) and the plug inserter. Subsequently, as shown in FIG. 23, the operator turns the valve spindle BC in the forward direction to allow the gate 8A to enter the interior of the existing pipe 1 through the opening 12C, thereby stopping the flow of water through the interior of the existing pipe 1. With this existing pipe 1 blocked off, the existing pipe 1 is cut at the piping change site for example, after which a mechanical closure 51 (FIG. 26) is mounted thereon to perform the work such as the change of piping.

Removal Step

Figure 24A:
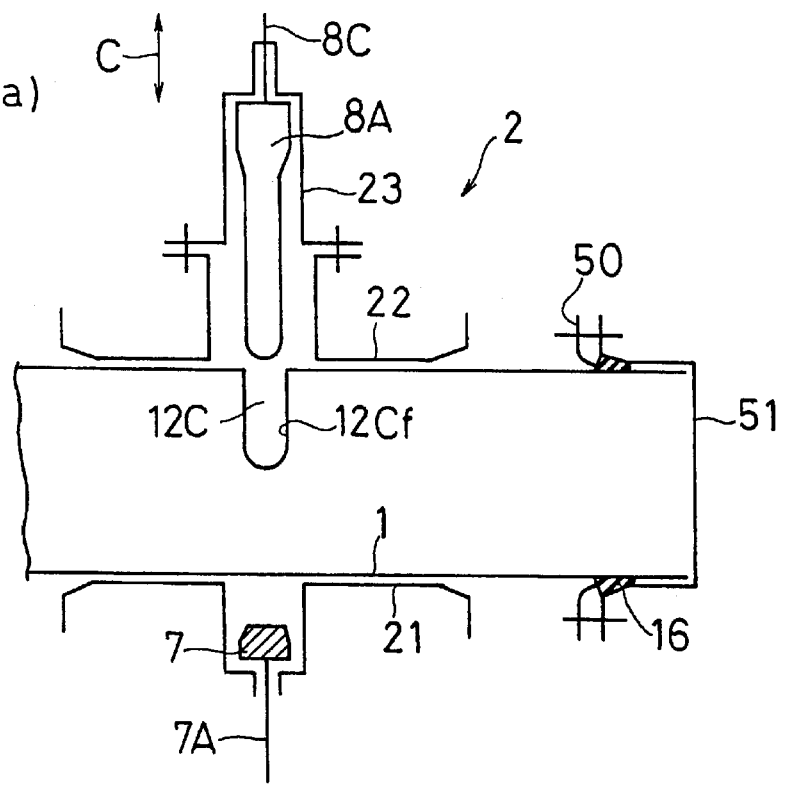
FIG. 24(a) is a schematic longitudinal view showing a removal step.
Figure 24B:
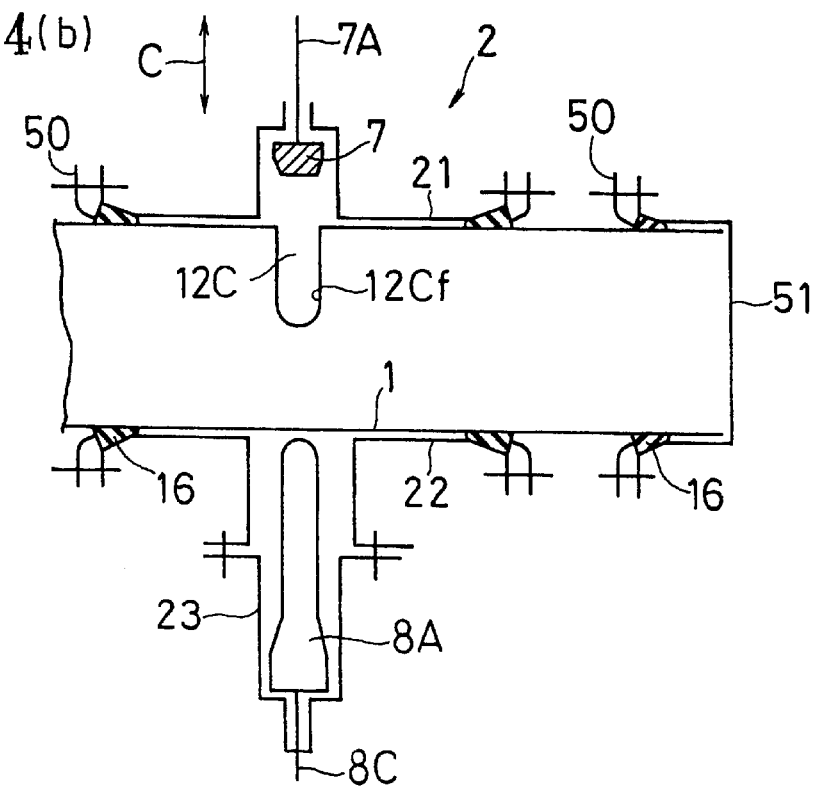
FIG. 24(b) is a schematic longitudinal sectional view showing the status before a hermetically closing step.
Figure 25:
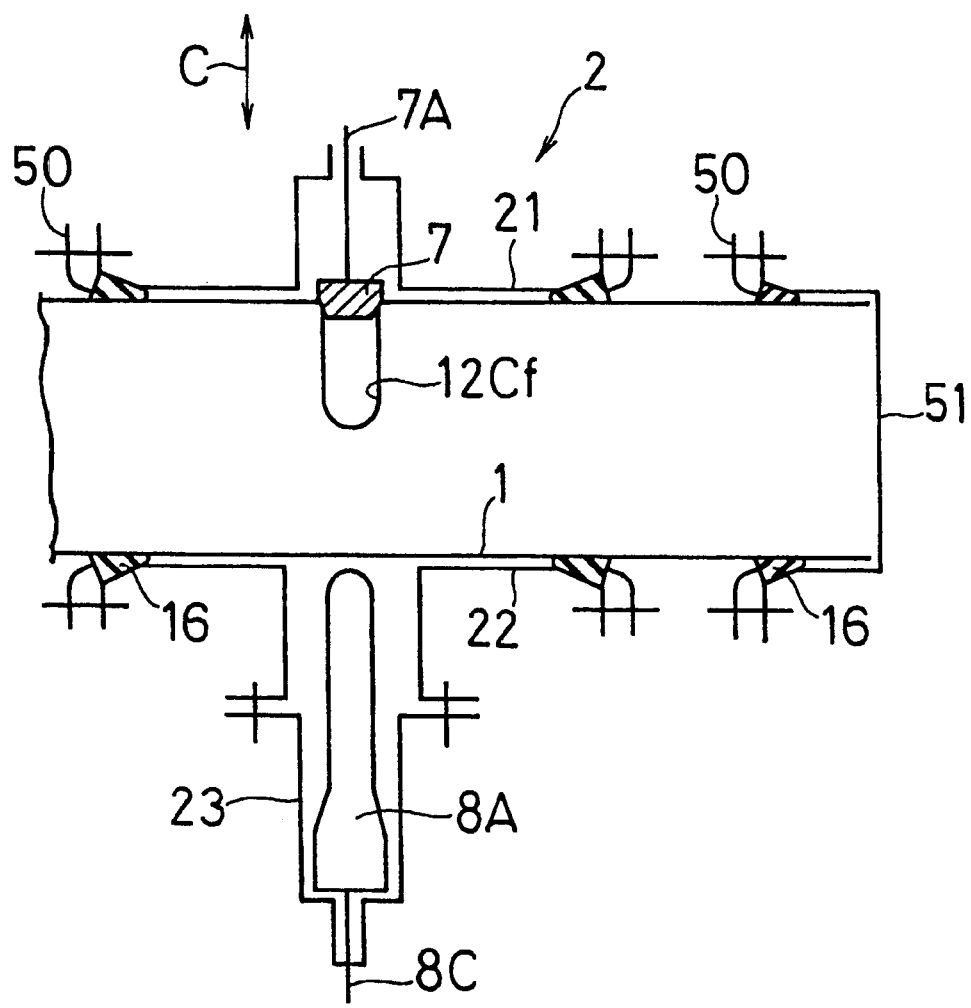
FIG. 25 is a schematic longitudinal sectional view showing the hermetically closing step.

After the completion of the work such as the change of piping, the operator turns the valve spindle BC in the reverse direction to remove the gate 8A from the opening 12C as shown in FIG. 24(*a*).

Hermetically Closing Step

After the removal step, as shown in FIG. 24(*b*), the operator turns the seal-up housing 2 through approx. 180 degrees in the circumferential direction R of the existing pipe 1 so that the anticorrosive member 7 coincides positionally with the opening 12C. Afterward, the operator places a rubber ring 16 and a split thrust ring 50 in the packing insertion portion 26 (FIG. 21). The operator then screws the anticorrosive member insertion bolt 7A of FIG. 25 therein to fit the anticorrosive member 7 into the opening 12C. After this fitting, the fixing screws 61 (FIG. 20) are threaded in which press the core portion 72 of the anticorrosive member 7 toward the interior of the existing pipe 1. Afterward, the operator screws a cap 65 (FIG. 26) into the internally threaded portion 212 of the bolt insertion portion 211.

Figure 26:
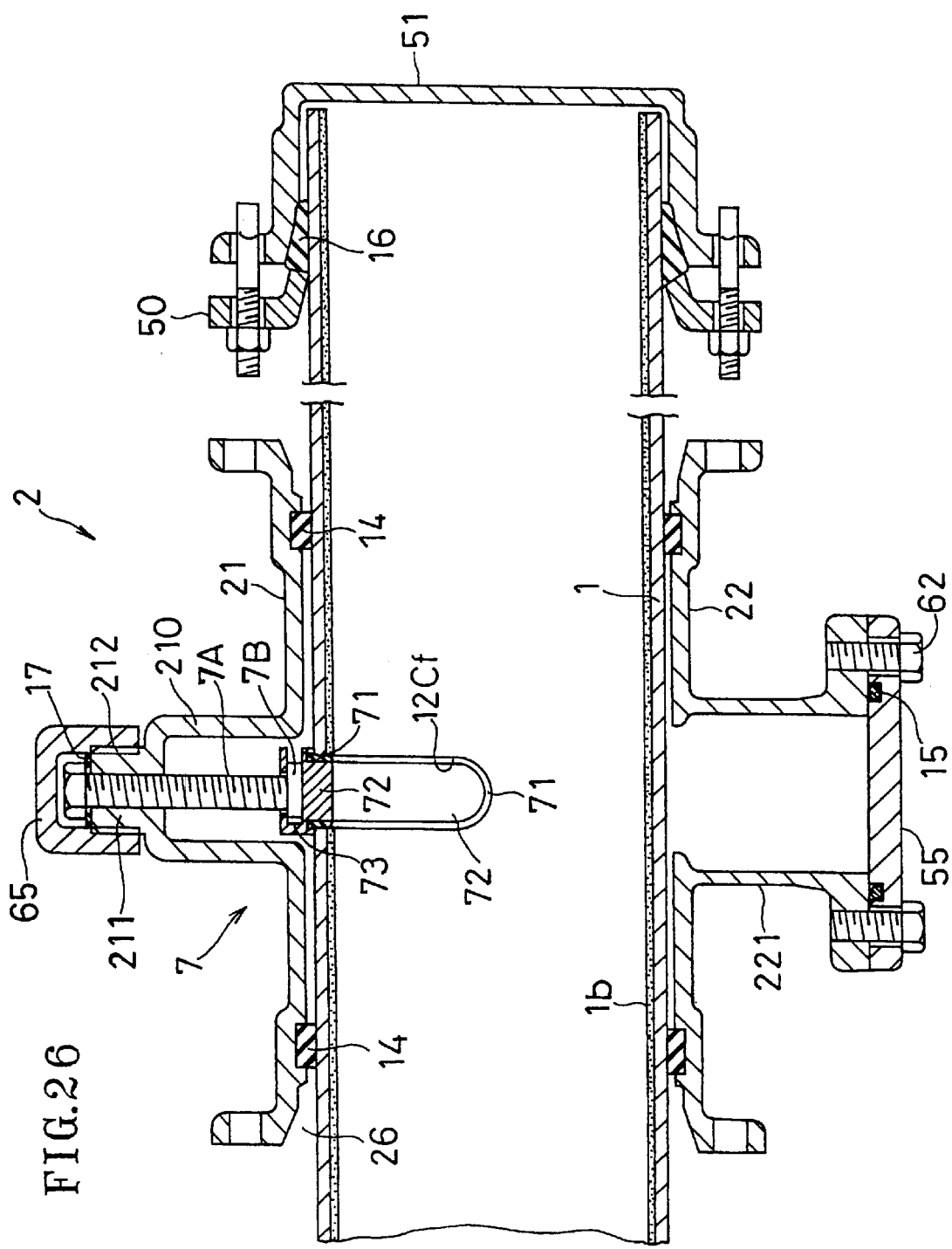
FIG. 26 is a longitudinal sectional view showing a piping structure in accordance with the third embodiment.

After the completion of the hermetically closing step, the operator removes the valve bonnet 23 storing the gate BA and mounts a flange cover 55 of FIG. 26 therein of the valve bonnet 23. A piping structure of FIG. 26 is thus acquired.

In the third embodiment, both the gate 8A and the anticorrosive member 7 are housed in the seal-up housing 2, and hence a good construction ability is achieved.

Furthermore, the seal-up housing 2 encloses the existing pipe 1 with the opening 12C closed, and hence the function as the valve can again be presented as will be described hereinbelow. More specifically, after the removal of the flange cover 55, the gate 8A and the valve bonnet 23 may again be mounted, and after again releasing the opening 12C the gate 8a may be moved to the position of the opening 12C, thereby enabling the function as the valve to again be presented.

Fourth Embodiment

FIGS. 27 to 33 show a fourth embodiment of the present invention.

Anticorrosive Member Insertion Unit 10

Figure 27:
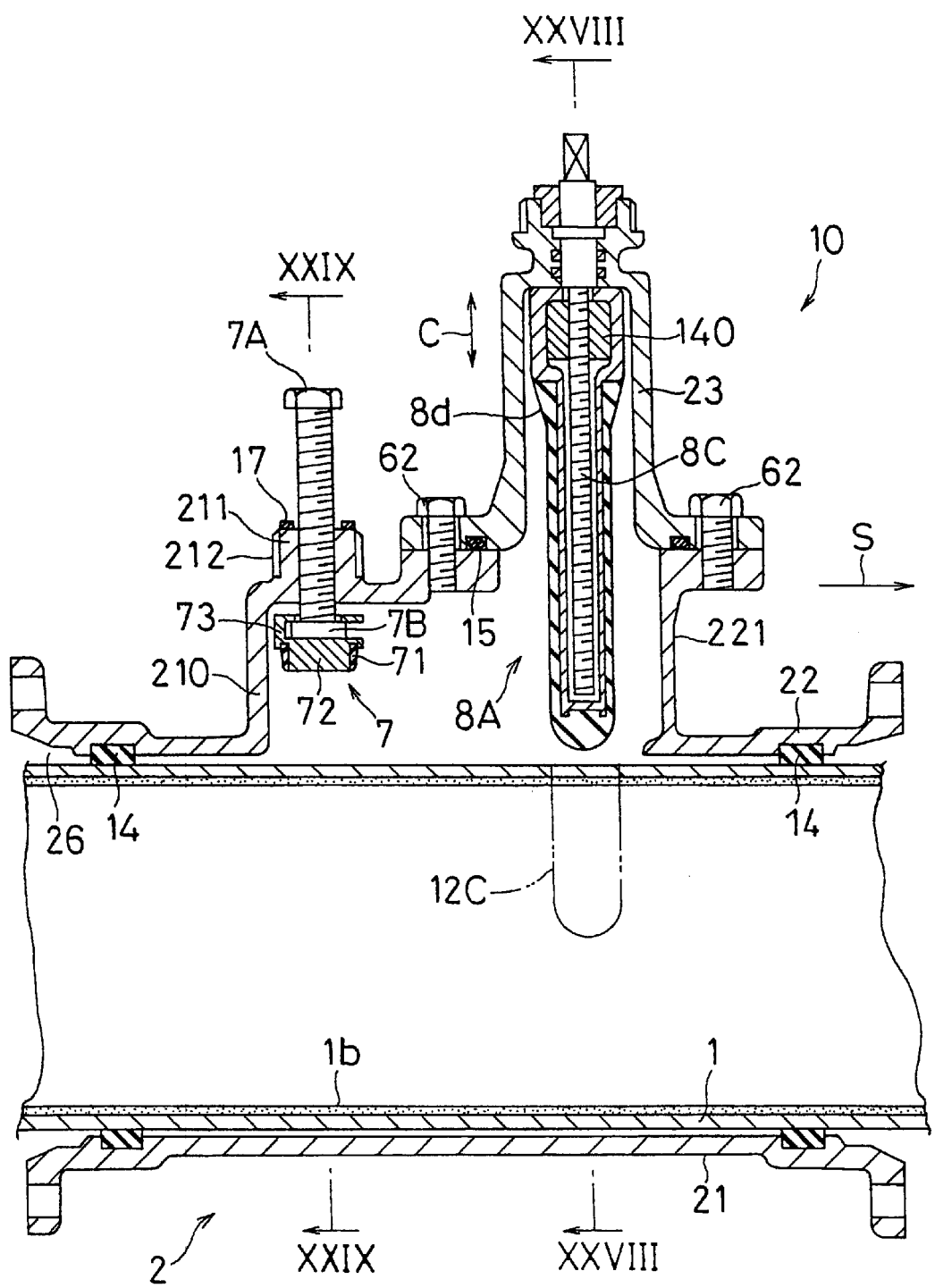
FIG. 27 is a longitudinal sectional view showing an assembling step of a method in accordance with a fourth embodiment of the present invention.
Figure 28:
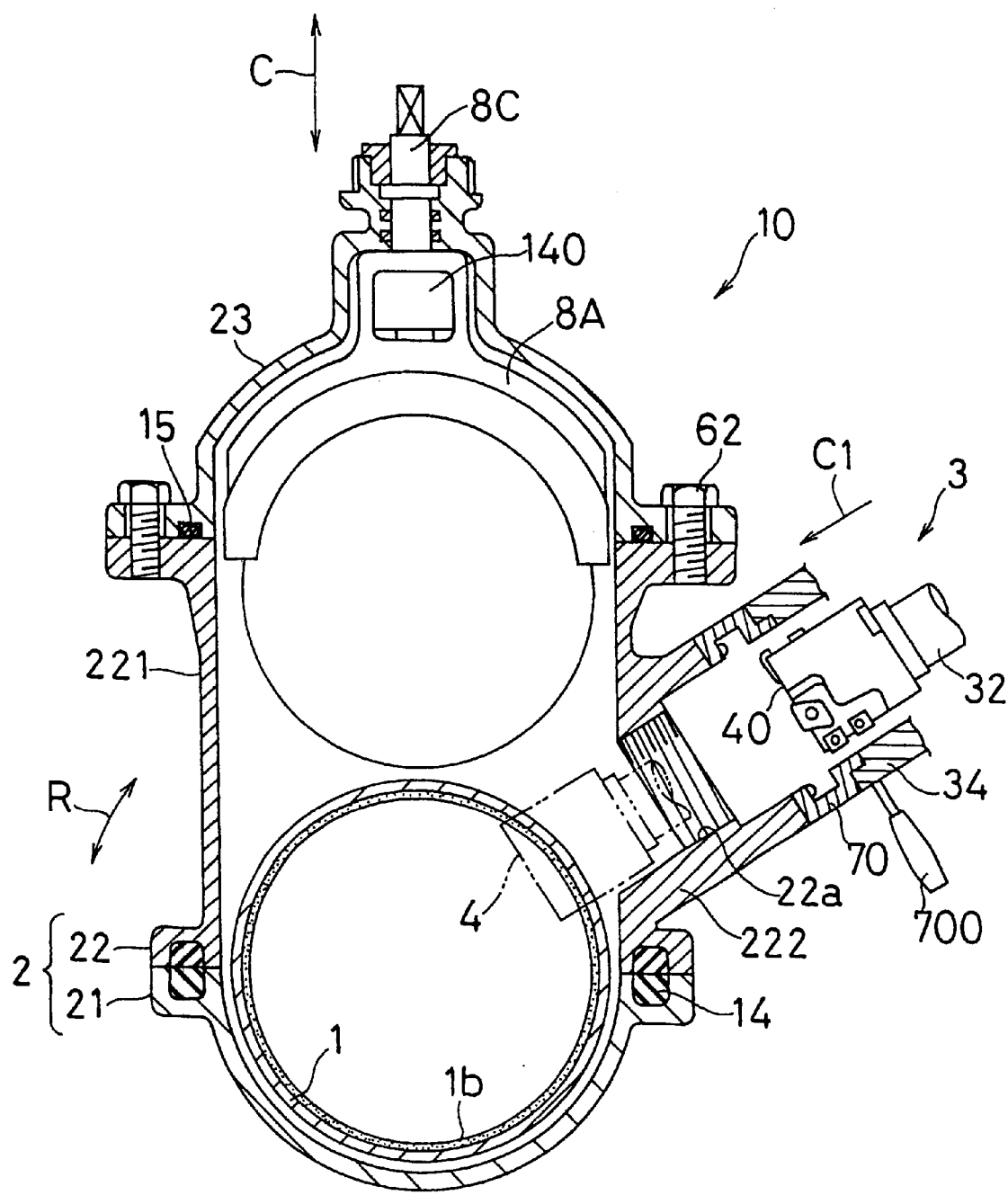
FIG. 28 is a cross-sectional view taken along a line XXVIII—XXVIII of FIG. 27.
Figure 29:
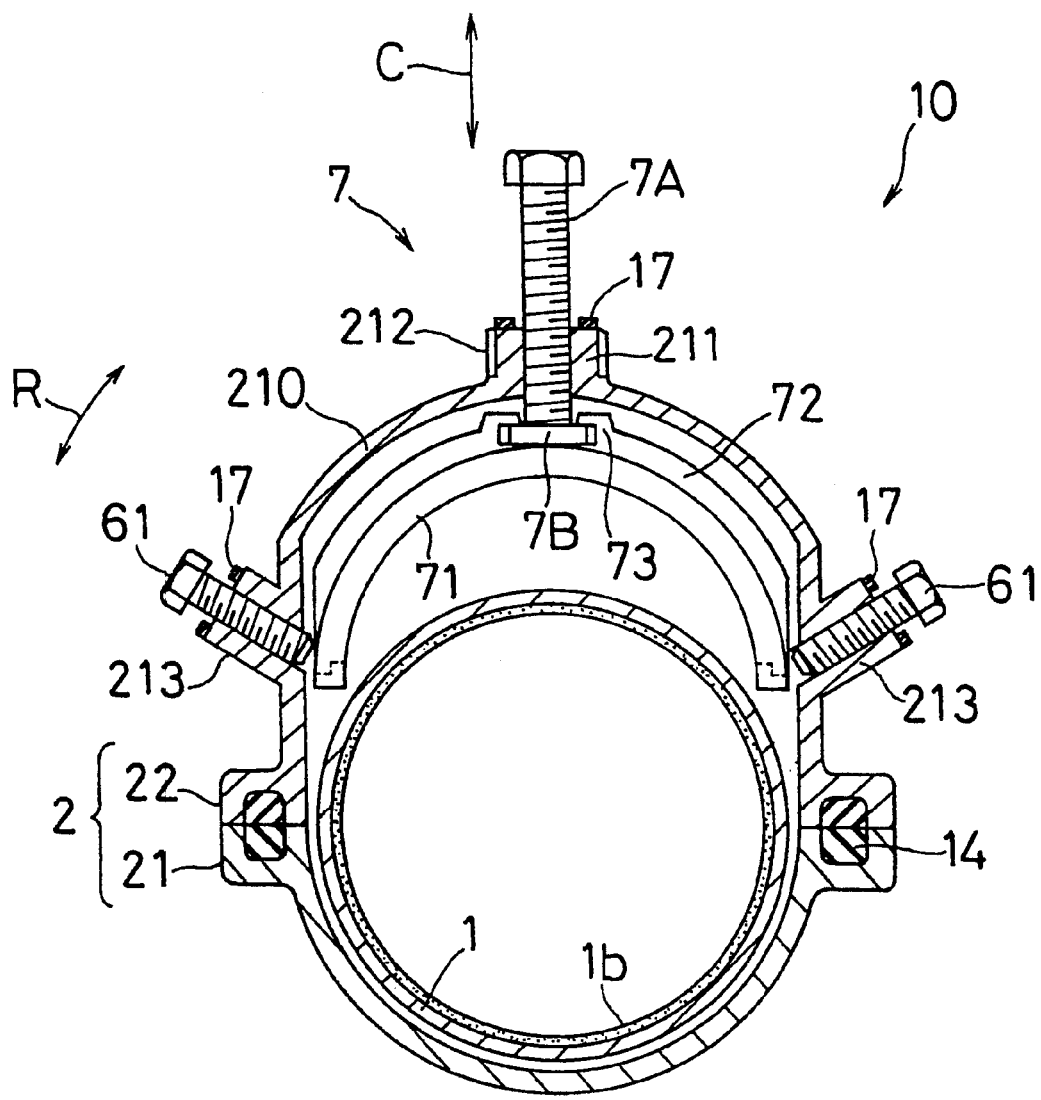
FIG. 29 is a cross-sectional view taken along a line XXIX—XXIX of FIG. 27.

Referring to FIGS. 27 to 29, the anticorrosive member insertion unit 10 comprises the seal-up housing 2, the gate 8A, the valve spindle 8C, the anticorrosive member 7 and the anticorrosive member insertion bolt 7A. The seal-up housing 2 houses the gate 8A and the anticorrosive member 7 and comprises the first 22 and second 21 housing parts halved in the circumferential direction R of the existing pipe 1. The first branched portion 221 of the first housing part 22 has the anticorrosive member storage casing (portion) 210A formed integrally therewith, with the anticorrosive member 7 and the gate 8A being spaced apart from each other.

The other arrangements of the anticorrosive member insertion unit 10 are the same as those of the third embodiment, and the same or corresponding parts are designated by the same reference numerals and will not again be described in detail.

A method will then be described.

Enclosing Step

First, with a liquid (water) flowing through the interior of the existing pipe 1 of FIG. 27, the operator mounts the seal-up housing 2 on the existing pipe 1 at a site to be cut and puts together the second housing part 21 and the first housing part 22 storing the anticorrosive member 7. Afterward, the operator mounts the drill 3 on the first branched portion 221. Thus, as shown in FIG. 27, a part of the existing pipe 1 is enclosed by the seal-up housing 2 in a hermetically sealed fashion.

Opening Formation Step

Figure 30A:
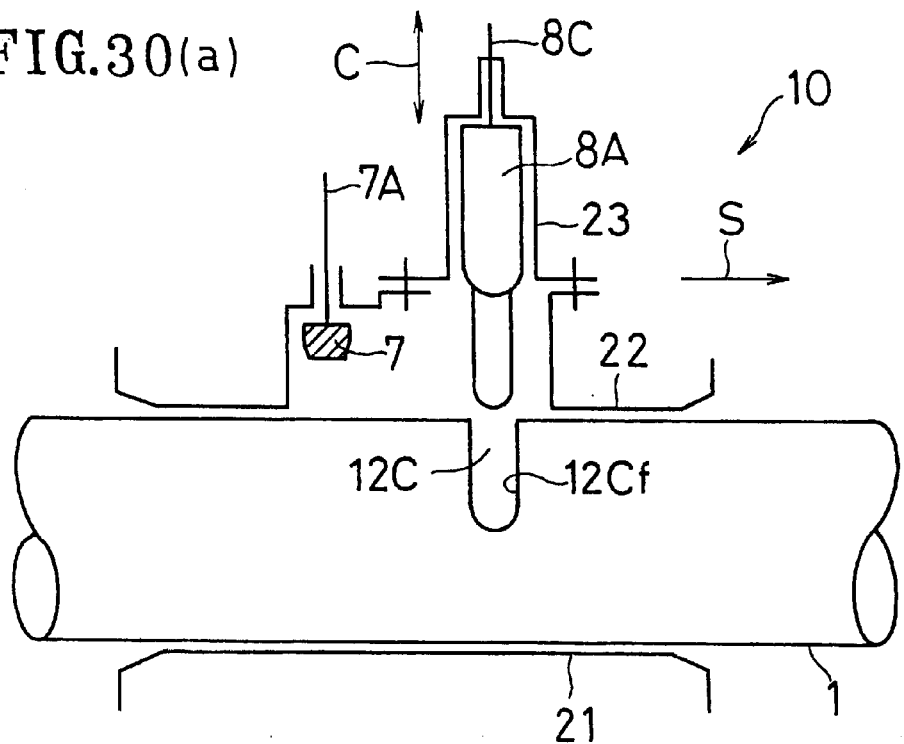
FIGS. 30(a) and 30(b) are schematic longitudinal sectional views each showing a water stop step.

After the completion of the assembling step, in the same manner as the opening formation step in the third embodiment, as shown in FIG. 30(a) an opening 12C is formed in the existing pipe 1 through approx. 180 degrees or the angular range slightly smaller than 180 degrees in the circumferential direction R thereof.

Water Stop Step

Figure 30B:
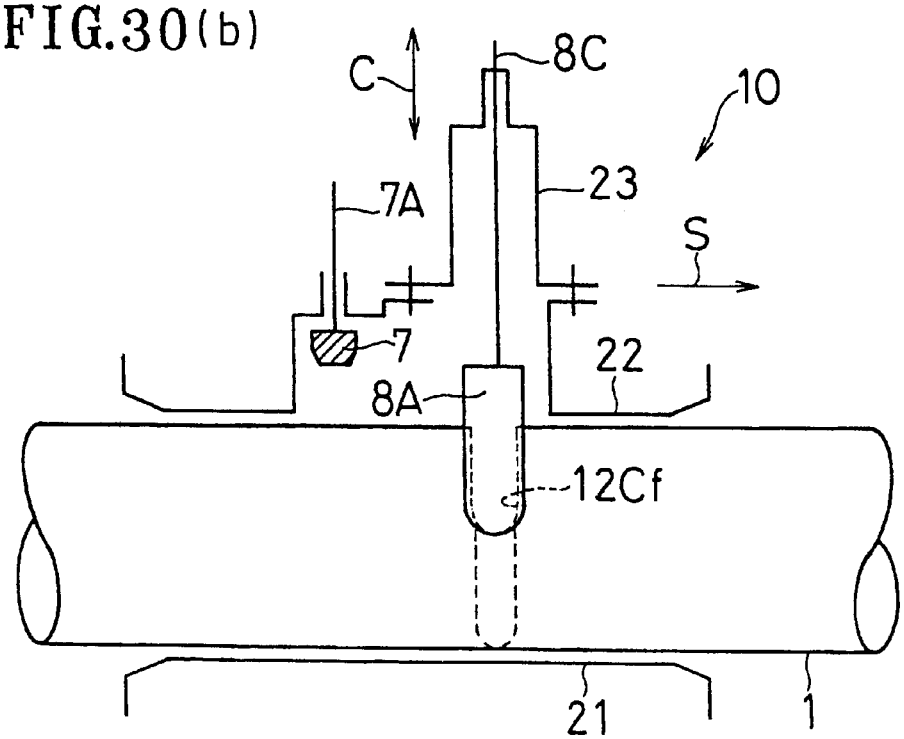

Subsequent to the opening formation step, in the same manner as the water stop step in the third embodiment, as shown in FIG. 30(b) the operator allows the gate 8A to enter the interior of the existing pipe 1 through the opening 12C to thereby stop the flow of water through the interior of the existing pipe 1. With this existing pipe 1 blocked off, the existing pipe 1 is cut at a site where the piping is changed for example, after which as shown in FIG. 31(a) the mechanical closure 51 is mounted on the existing pipe 1 previous to the work such as the change of piping.

Removal Step

Subsequent to the work such as the change of piping, in the same manner as the removal step in the third embodiment, as shown in FIG. 31(b) the operator removes the gate 8A from the opening 12C.

Moving Step

Figure 32A:
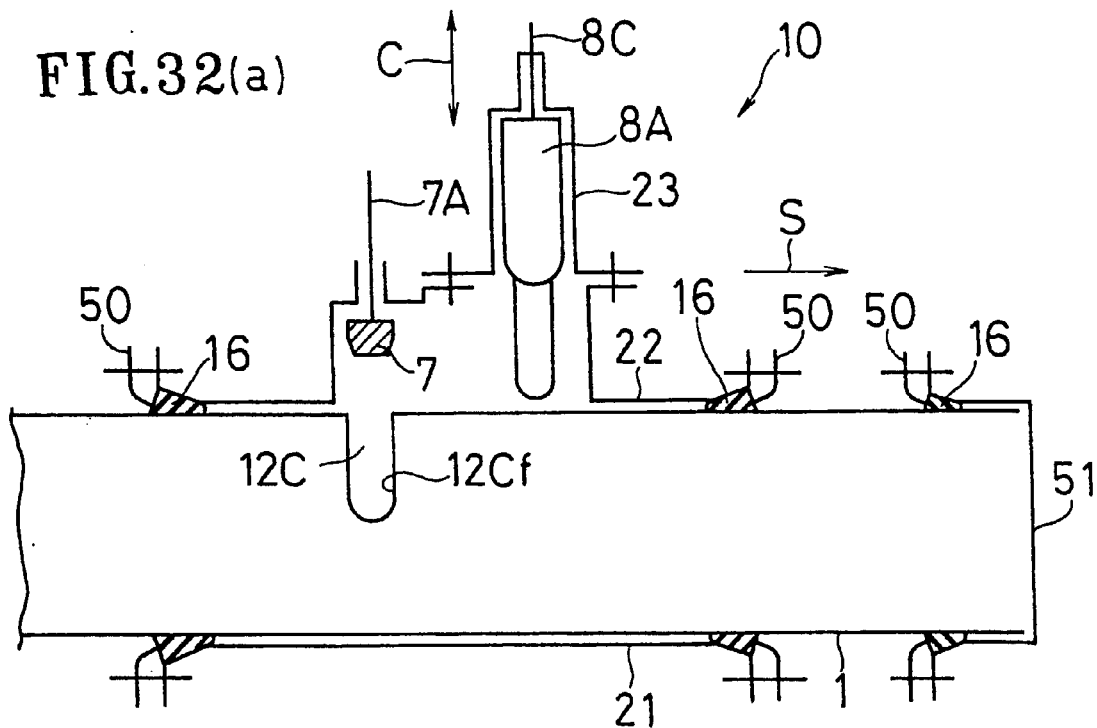
FIG. 32(a) is a schematic longitudinal sectional view showing a moving step.

Subsequent to the removal step, as shown in FIG. 32(a) the seal-up housing 2 is moved in the axial direction S of the existing pipe 1 so that the anticorrosive member 7 is moved to the position corresponding to the opening 12C.

Subsequently, the operator fits the rubber ring 16 and the split thrust ring 50 on the packing insertion portion 26 (FIG. 27).

Hermetically Closing Step

Figure 32B:
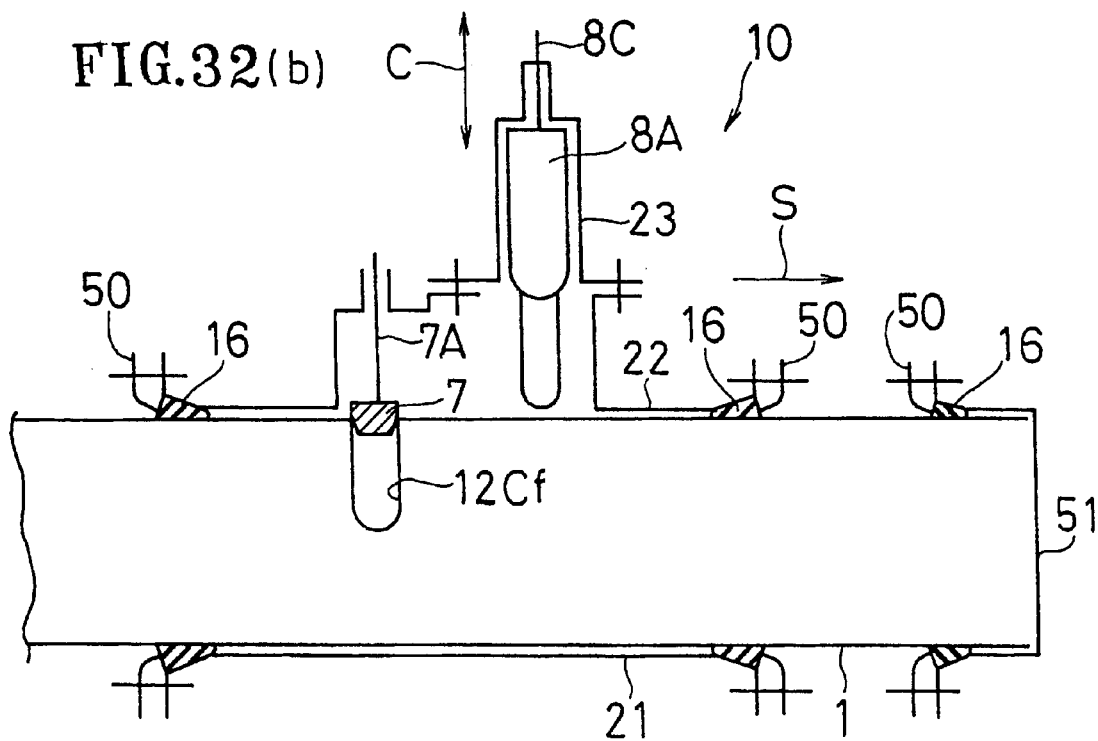
FIG. 32(b) is a schematic longitudinal sectional view showing a hermetically closing step.

Subsequent to the moving step, as shown in FIG. 32(b) the anticorrosive member insertion bolt 7A is screwed therein to fit the anticorrosive member 7 into the opening 12C. Posterior to this fitting, the fixing screws 61 of FIG. 29 are treaded therein which press the core portion 72 of the anticorrosive member 7 toward the interior of the existing pipe 1. Subsequently, the cap 65 of FIG. 33 is screwed into the internally threaded portion 212 of the bolt insertion portion 211.

Figure 33:
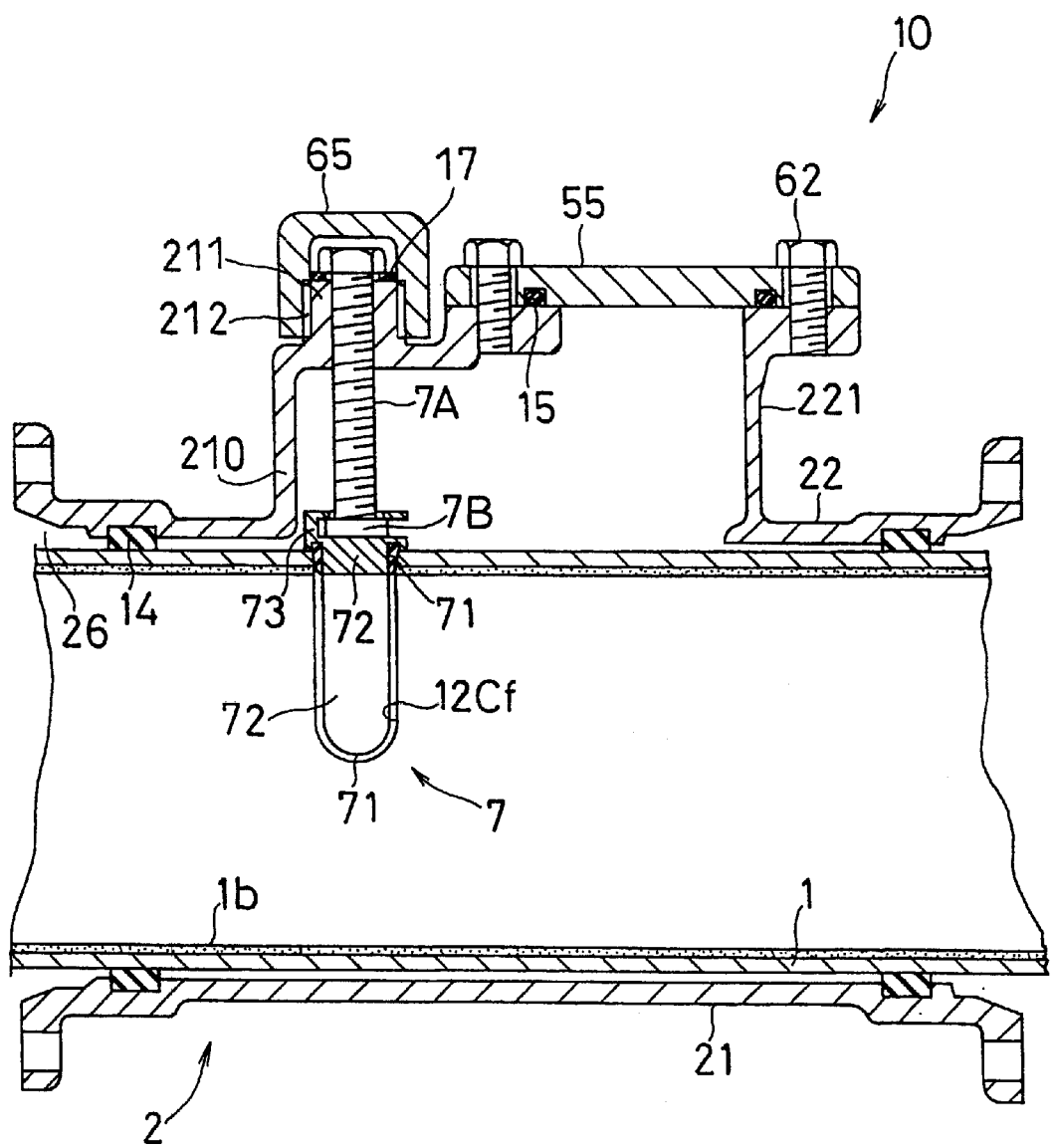
FIG. 33 is a longitudinal sectional view showing a piping structure in accordance with the fourth embodiment.

Posterior to the hermetically closing step, the operator removes the valve bonnet 23 storing the gate 8A and mounts the flange cover 55 of FIG. 33 in place of the valve bonnet 23. A piping structure shown in FIG. 33 is thus acquired.

The fourth embodiment allows a shallower digging beneath the pipe.

Fifth Embodiment

FIGS. 34 to 38 show a fifth embodiment of the present invention.

Anticorrosive Member Insertion Unit 200

Figure 34:
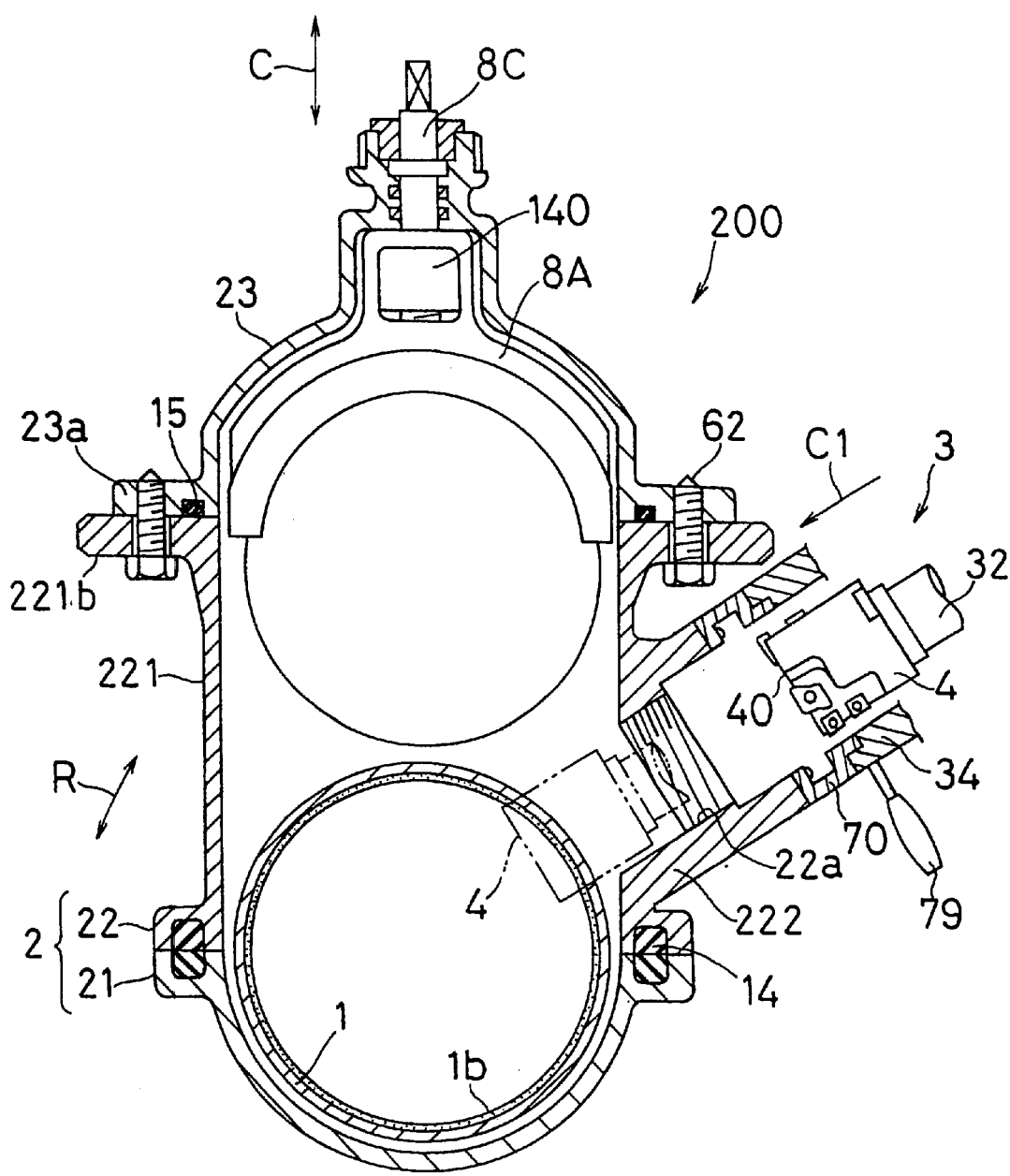
FIG. 34 is a longitudinal sectional view showing an assembling step of a method in accordance with a fifth embodiment of the present invention.

Referring to FIG. 34, an anticorrosive member insertion unit 200 comprises the seal-up housing 2, the gate 8A and the valve spindle 8C. The seal-up housing 2 comprises of the first 22 and second 21 housing parts halved in the circumferential direction R of the existing pipe 1. The valve bonnet 23 makes up the seal-up housing 2 in conjunction with the first 22 and second 21 housing parts.

The first housing part 22 is provided with the first branched portion 221 and the second branched portion 222 which extend outwardly in the radial direction C of the existing pipe 1 in a diverged fashion. The second branched portion 222 is formed diagonally relative to the first branched portion 221 in such a manner as to diverge from the first branched portion 221.

The valve bonnet 23 is firmly secured to the first branched portion 221 by means of the assembling bolts 62 from the first branched portion 221 side. The flange 221b of the first branched portion 221 is slightly larger than the flange 23a of the valve bonnet 23.

The other arrangements of the anticorrosive member insertion unit 200 are the same as those of the third embodiment. The same or corresponding parts are designated by the same reference numerals and will not again be described in detail.

A method will then be described.

Enclosing Step

First, with a liquid (water) flowing through the interior of the existing pipe 1 of FIG. 34, the seal-up housing 2 is mounted on the existing housing 1 at a site to be cut, and the first 22 and second 21 housing parts are put together by means of the assembling bolts not shown. Subsequently, the drill 3 is mounted on the second branched portion 222. Thus, as shown in FIG. 34, the seal-up housing 2 encloses a part of the existing pipe 1 in a hermetically sealed fashion.

Opening Formation Step

After the completion of the assembling step, in the same manner as the opening formation step of the third embodiment the existing pipe 1 is notched to form the opening 12C extending over approx. 180 degrees or the angular range slightly smaller than 180 degrees in the circumferential direction R of the existing pipe 1.

Water Stop Step

Figure 35A:
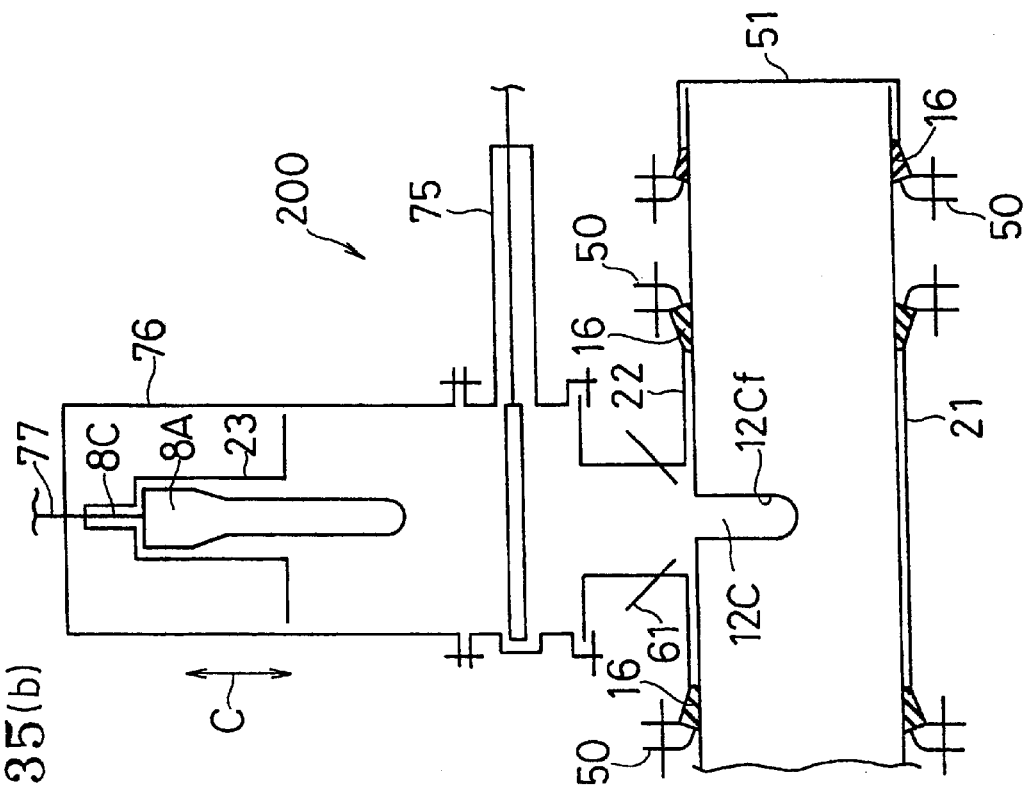
FIGS. 35(a) and 35(b) are schematic longitudinal sectional views each showing a gate removal step.

After the opening formation step, in the same manner as the water stop step of the third embodiment the gate 8A is caused to enter the interior of the existing pipe 1 through the opening 12C to stop the flow of water through the interior of the existing pipe 1. With the existing pipe 1 blocked off, for example the existing pipe 1 is cut at a site where the piping is changed, after which as shown in FIG. 35(a) the mechanical closure 51 is mounted to perform the work such as the change of piping.

Gate Removal Step

Figure 35B:
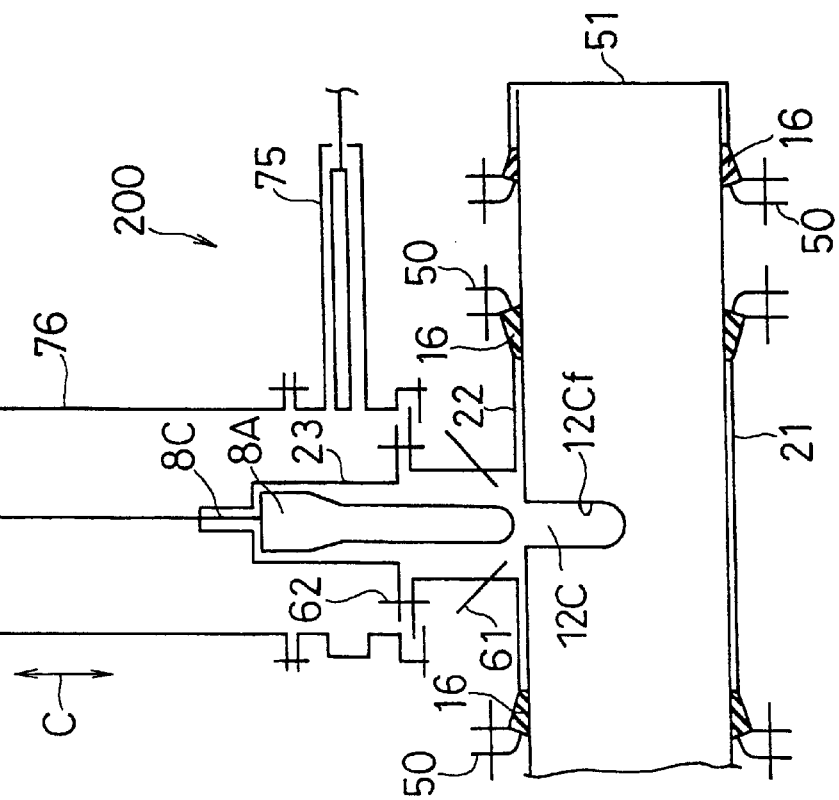

After the execution of the work such as the change of piping, the operator removes the gate 8A to the interior of the valve bonnet 23 of the seal-up housing 2. Subsequently, as shown in FIG. 35(a), the operator joins the operation valve 75 to the flange 221b of the first branched portion 221, and an operation upper tank 76 is further joined to the operation valve 75 in a superposed manner. Upon this joining, the valve bonnet 23 is joined to the extremity of a vertically movable shaft 77 which extends through the operation upper-tank 76. After this joining, the operator removes the assembling bolts 62. After the removal, as shown in FIG. 35(b) the operator lifts the vertically movable shaft 77 to remove the gate 8A together with the valve bonnet 23 from the seal-up housing 2 to the interior of the operation upper tank 76. Posterior to this removal, the operator closes the operation valve 75. After this closing, the operator isolates the operation upper tank 76 from the operation valve 75.

Anticorrosive Member Mounting Step

Figure 37A:
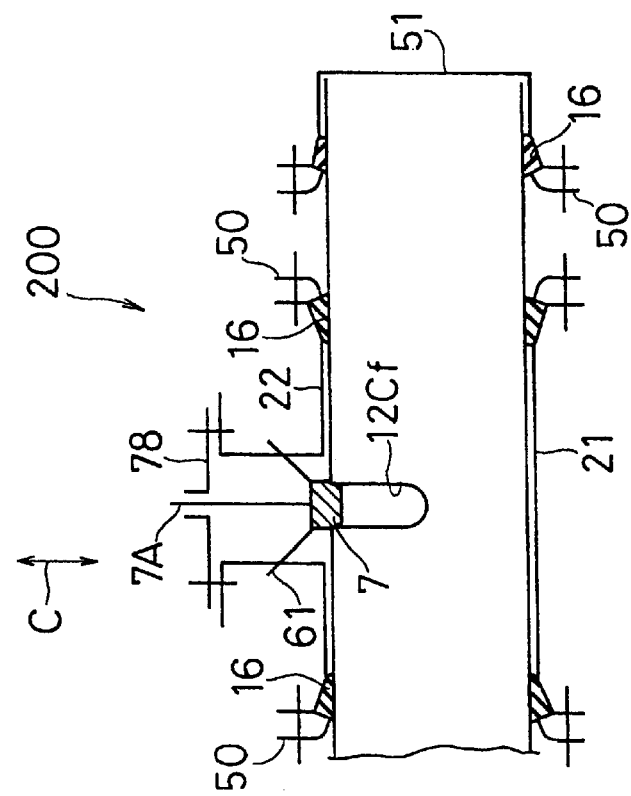
FIGS. 37(a) and 37(b) are schematic longitudinal sectional views each showing a hermetically closing step.

After the gate removal step, as shown in FIG. 36(a) the operator joins the operation upper tank 76 storing the anticorrosive member 7 and a flange cover 78, to the operation valve 75. The anticorrosive member thrust shaft 7A (FIG. 38) is coupled via an adapter 79 to the extremity of the vertically movable shaft 77 extending through the operation upper tank 76. After this joining, as shown in FIG. 36(b) the operator lowers the vertically movable shaft 77 and securely fixes the flange cover 78 by means of the assembling bolts 62. Afterward, as shown in FIG. 37(a) the operator removes the operation upper tank 76 and the operation valve 75 from the seal-up housing 2.

Hermetically Closing Step

Figure 37B:
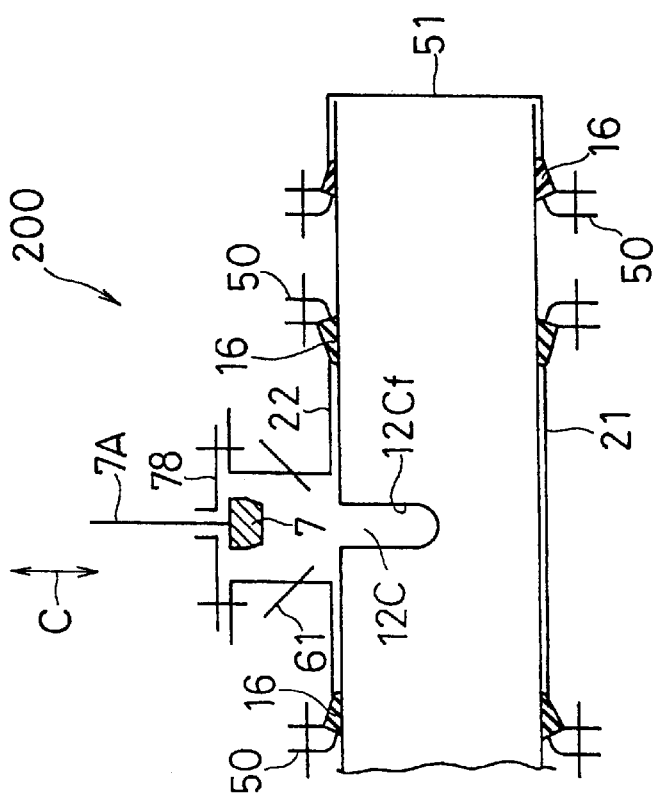
Figure 38:
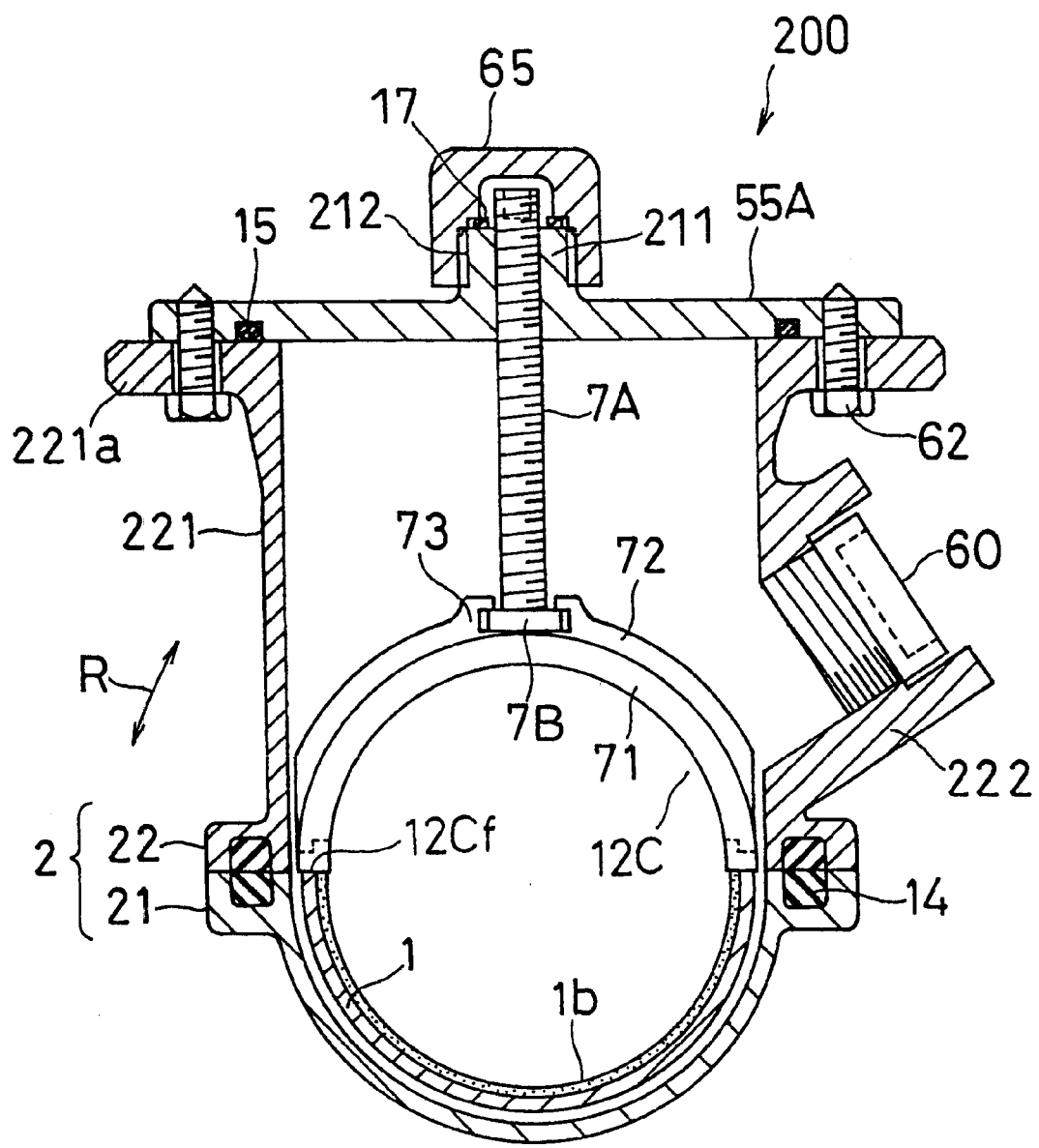
FIG. 38 is a transverse sectional view showing a piping structure in accordance with the fifth embodiment.

Posterior to the anticorrosive member mounting step, as shown in FIG. 37(b) the anticorrosive member thrust shaft 7A is threaded in so that the anticorrosive member 7 is fitted in the opening 12C. After this fitting, the fixing screws 61 are threaded in which press the core portion 72 of the anticorrosive member 7 toward the interior of the existing pipe 1. Afterward, as shown in FIG. 38 the cap 65 is screwed into the internally threaded portion 212 of the bolt insertion portion 211. A piping structure shown in FIG. 38 is acquired in this manner.

Figure 39A:
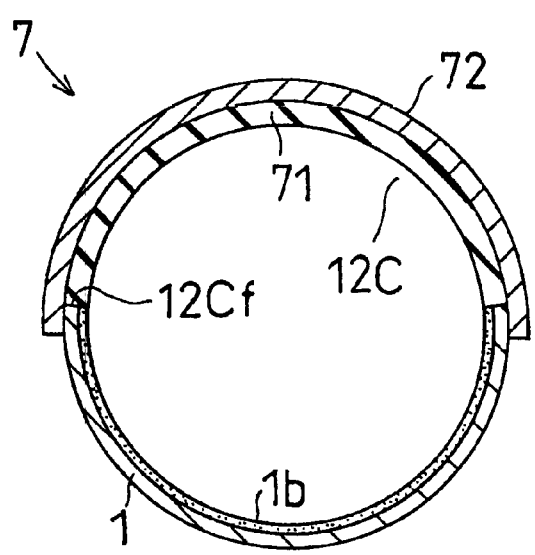
FIGS. 39(a), 39(b) and 39(c) are cross-sectional views each showing another example of the anticorrosive member.
Figure 39B:
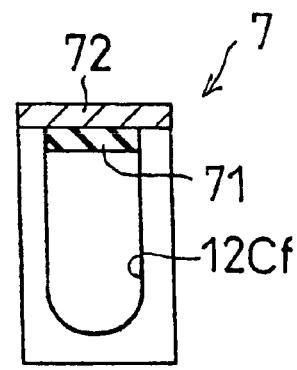

It is to be noted that as shown in FIGS. 39(a) and 39(b), the pressure contact portion 71 may be planar as long as it can come into pressure contact with the cut surface 12Cf of the opening 12C. The rigid portion 72 has only to present a rigidity enough to keep the pressure contacting state of the pressure contact portion 71.

Figure 39C:
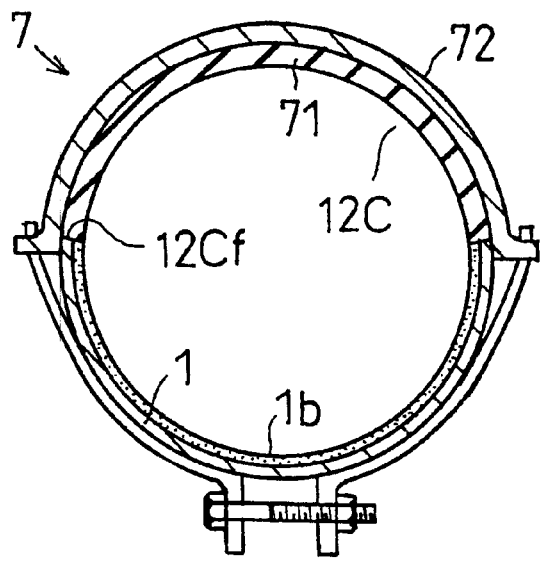

The anticorrosive member 7 need not be pressed and fixed by the fixing screws 61, and may be secured to the existing pipe 1 by another method such as fastening it to the existing pipe 1 by means of a band as shown in FIG. 39(c).

Description will then be made of the rotary drive unit suited to rotate the seal-up housing 102.

Rotary Drive Unit 80

Figure 40:
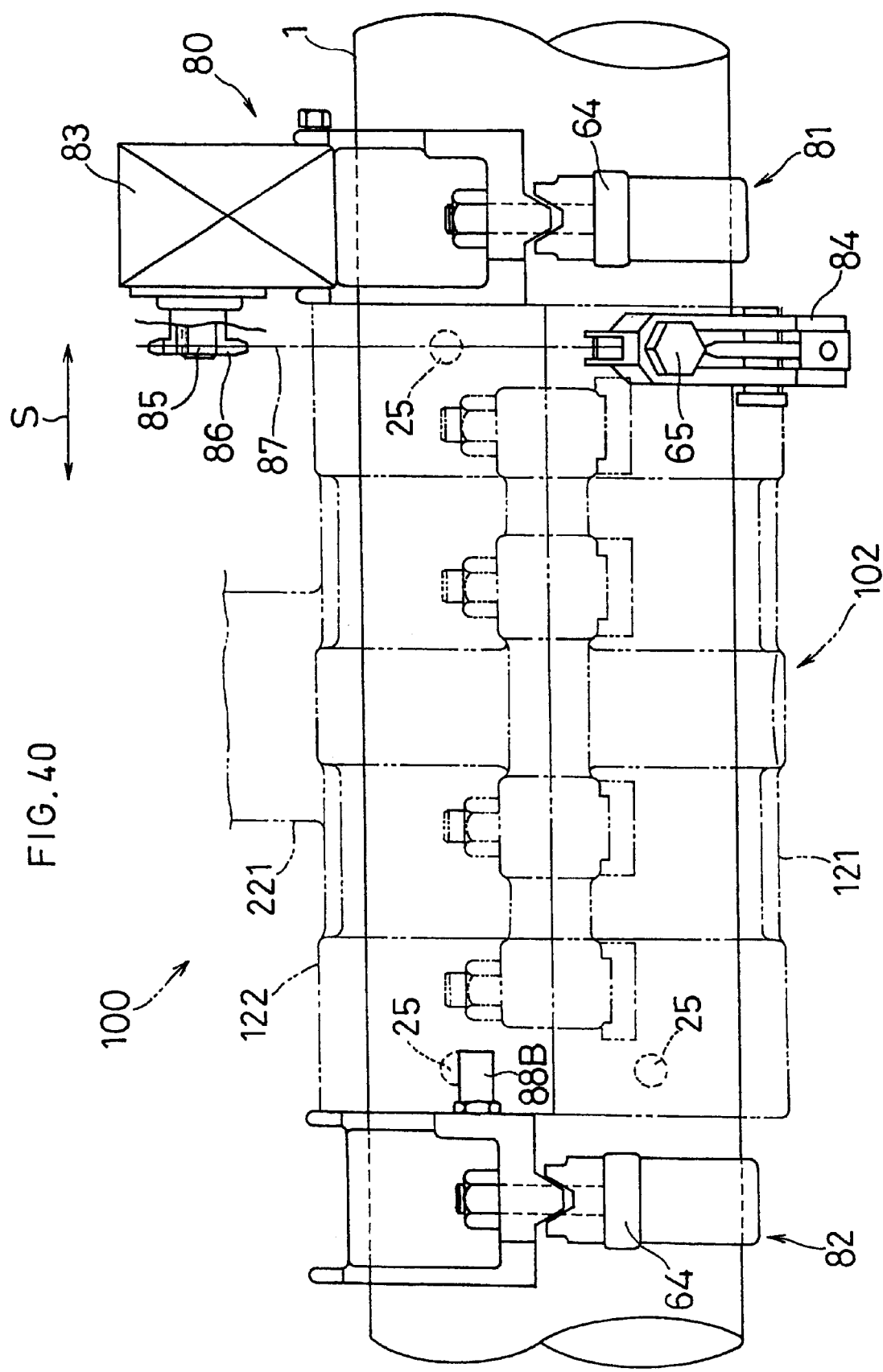
FIG. 40 is a front elevational view of a rotary drive unit.
Figure 41:
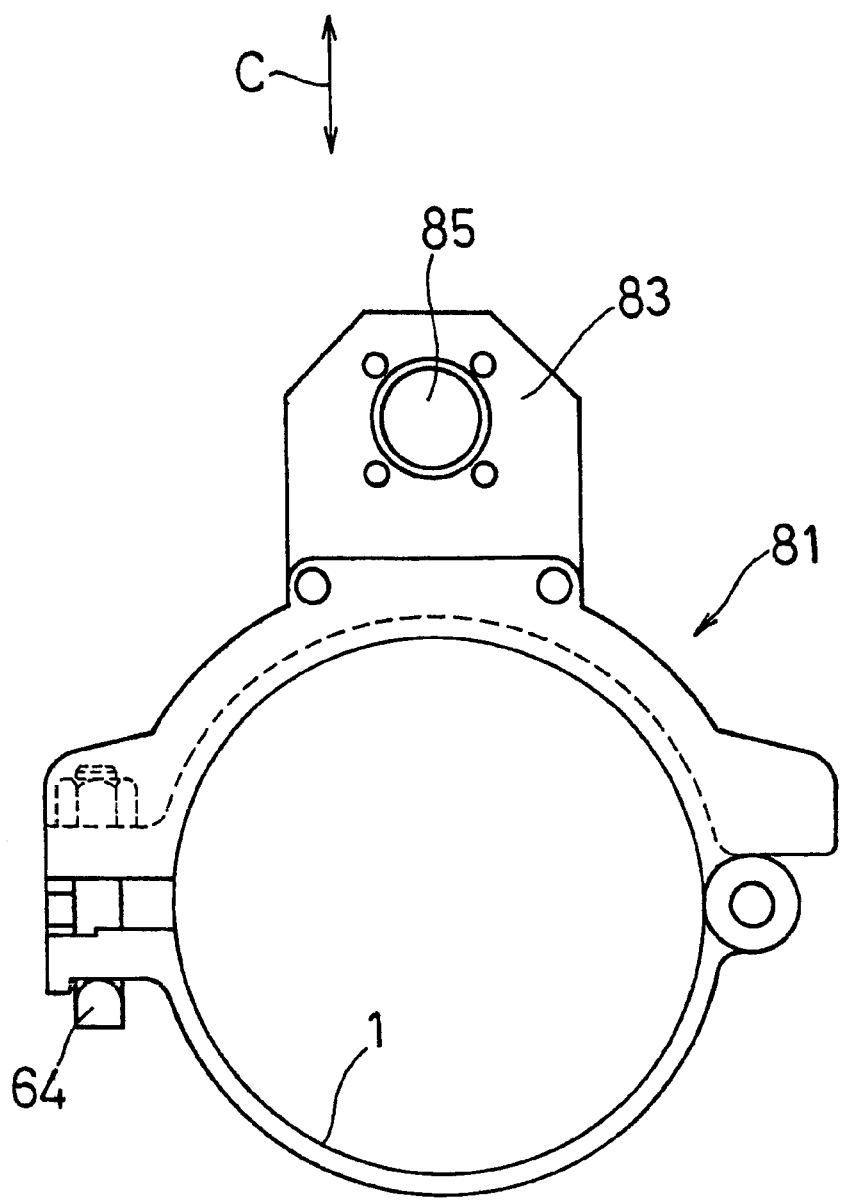
FIG. 41 is a side elevational view of a first pipe holder.

The rotary drive unit of FIG. 40 is generally designated at 80 and serves to rotate the seal-up housing 102 through a predetermined angle in the circumferential direction R of the existing pipe 1. The rotary drive unit 80 comprises first 81 and second 82 pipe holders. The pipe holders 81 and 82 are of substantially the same shape and are arranged at opposite ends of the seal-up housing 102. As shown in FIG. 41, the first pipe holder 81 is of a shape suitable to hold the existing pipe 1 and is secured at its one end to the existing pipe 1 by tightening the assembling bolt 64.

Figure 42:
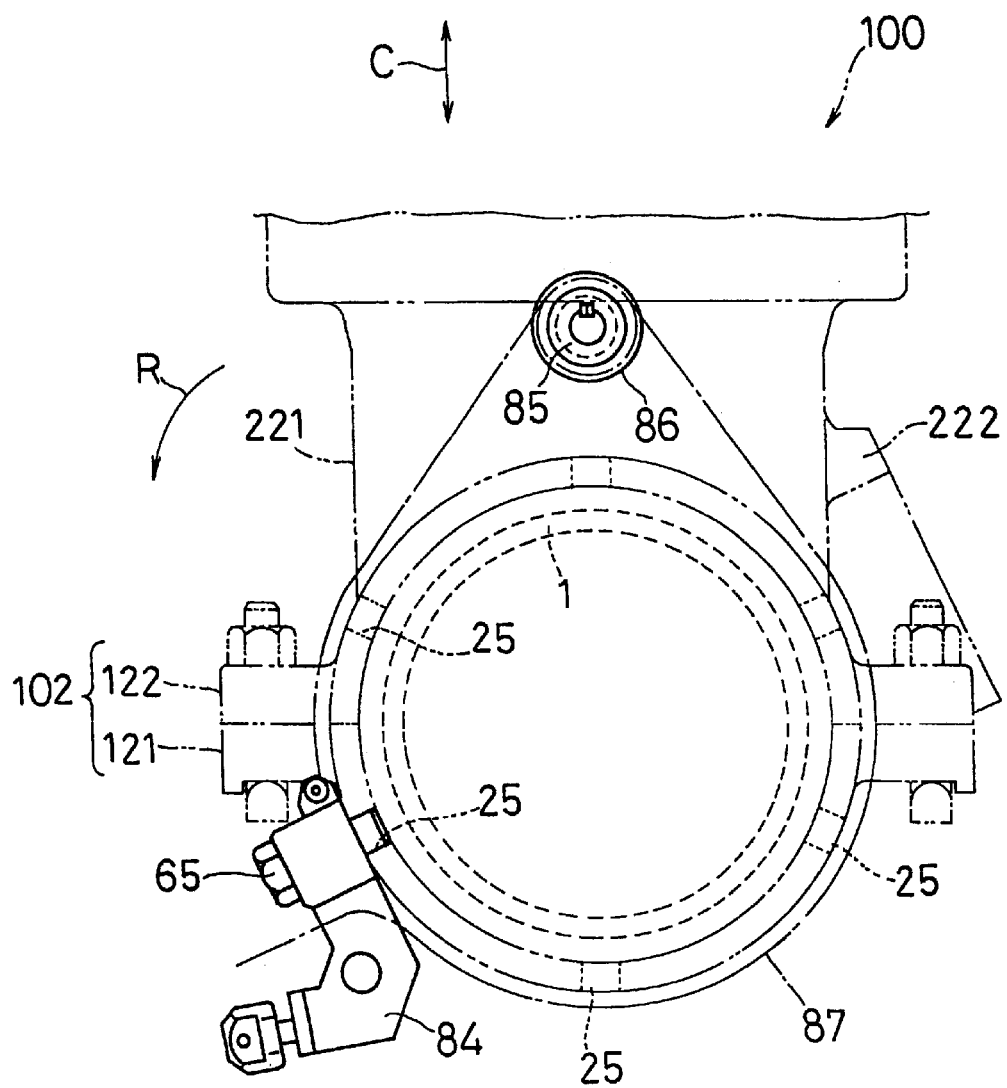
FIG. 42 is a side elevational view of an engagement member.

As shown in FIG. 40, a rotary drive 83 is mounted on the first pipe holder 81. A sprocket 86 is fastened to an output shaft 85 of the rotary drive 83 and turns around the output shaft 85 by a motive power from the rotary drive 83. As shown in FIG. 42, an engagement member 84 is secured to the seal-up housing 102 by means of fixing bolts 65 screwed into the internally threaded portions 25 formed in the seal-up housing 102. A chain 86 (indicated by a chain dotted line) is engaged with the sprocket 86 and is passed around the engagement member 84.

Figure 43:
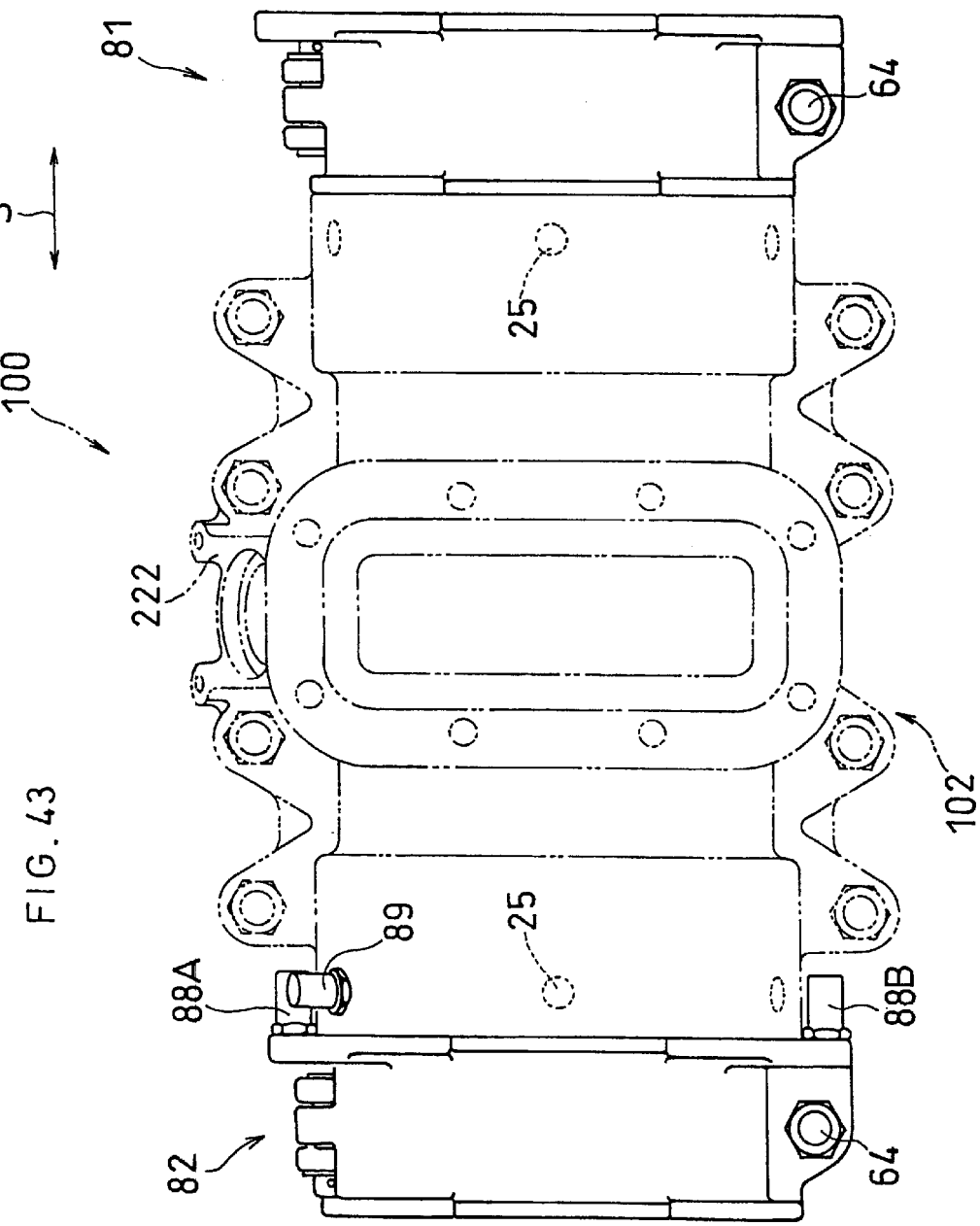
FIG. 43 is a top plan view of the rotary drive unit.
Figure 44:
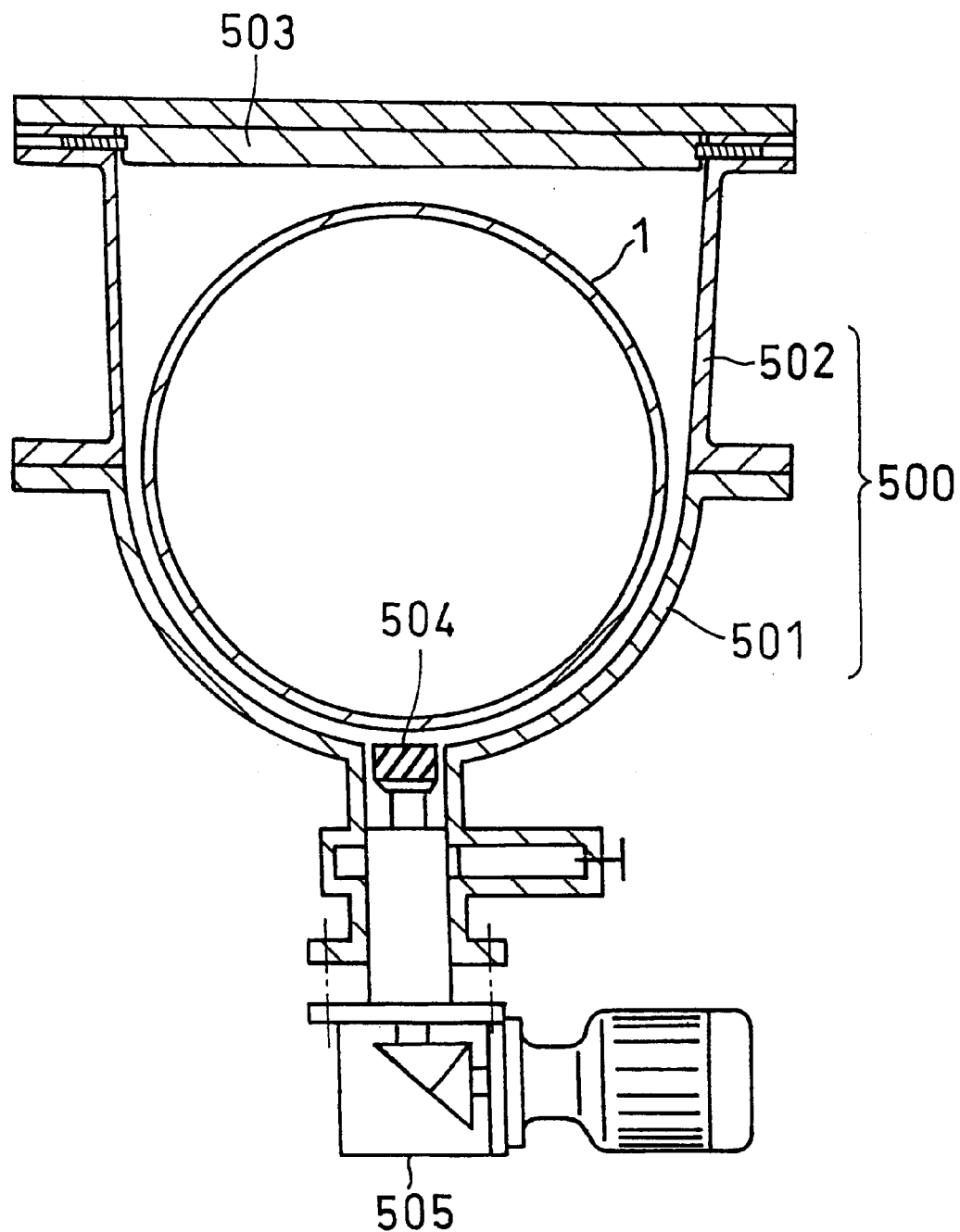
FIG. 44 is a cross-sectional view showing a conventional fluid supply interruption free valve insertion method.
Figure 45:
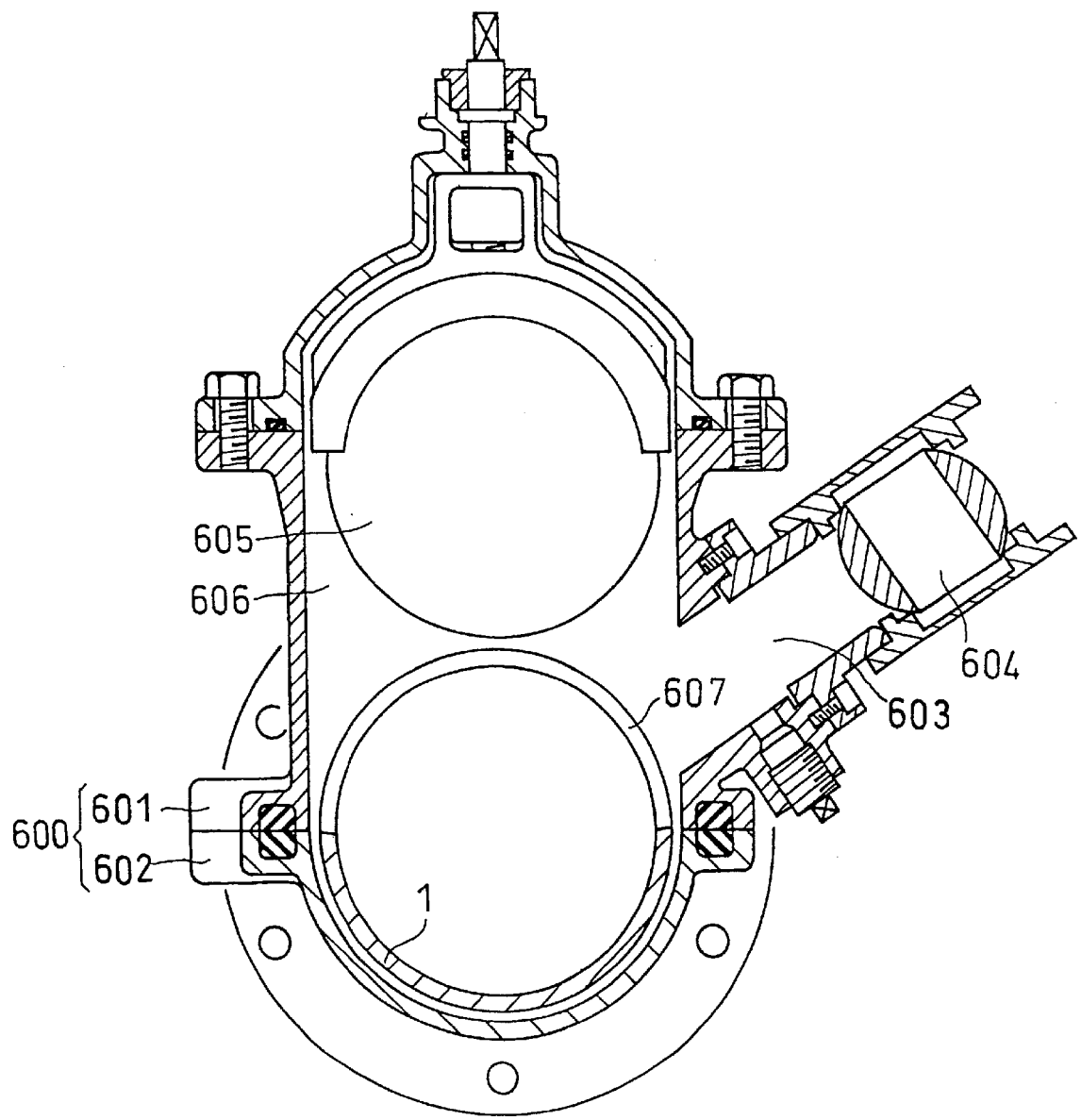
FIG. 45 is a cross-sectional view showing another conventional fluid supply interruption free valve insertion method.

As shown in FIG. 43, first 88A and second 88B stopper bolts are threaded into the second holder 82. The stopper bolts 88A and 88B are spaced approx. 180 degrees apart from each other in the circumferential direction R of the existing pipe 1. An abutment bolt 98 is threadedly secured to the internally threaded portion 25 of the seal-up housing 2 closer to the second holder 82. The first stopper bolt 88A and the abutment bolts 89 abut against each other at the rotational ends of the seal-up housing 102.

A way of rotation will then be described.

First, as shown in FIG. 40 the operator firmly secures the pipe holders 81 and 82 to the existing pipe 1 and then activates the rotary drive 83. Rotations of the output shaft 85 cause turns of the seal-up housing 102 in the circumferential direction R of the existing pipe 1 by way of the sprocket 86, the chain 87 and the engagement member 84. In this manner, the seal-up housing 102 can turn through a predetermined angle by the rotary drive unit 80.

Although the presently preferred embodiments have been described in light of the drawings, it would be easy for those skilled in the art to conceive various variations and modifications within the obvious scope by reading this specification.

By way of example, the motor for imparting a cutting motion to the cutting tool maybe an engine in lieu of the electric motor. The cutting unit may be mounted on the seal-up housing before the existing pipe is enclosed by the seal-up housing.

The seal-up housing may be composed of three or four housing parts segmented in the circumferential direction.

Figure 46A:
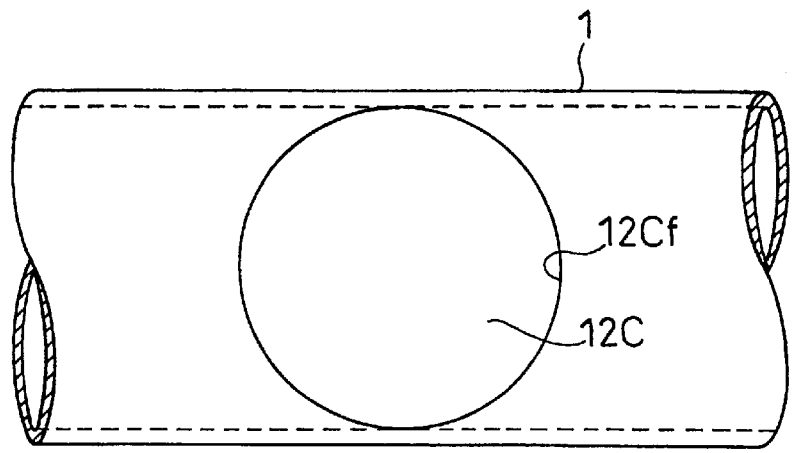
FIG. 46(a) is a top plan view showing a circular opening.
Figure 46B:
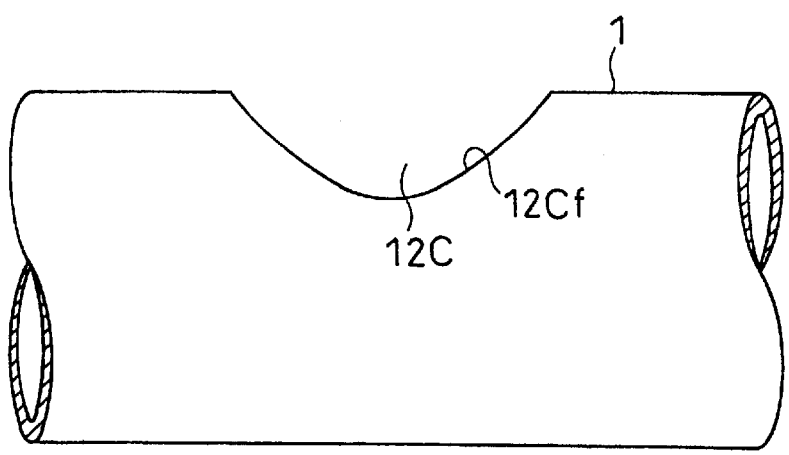
FIG. 46(b) is a side elevational view showing the circular opening.
Figure 46C:
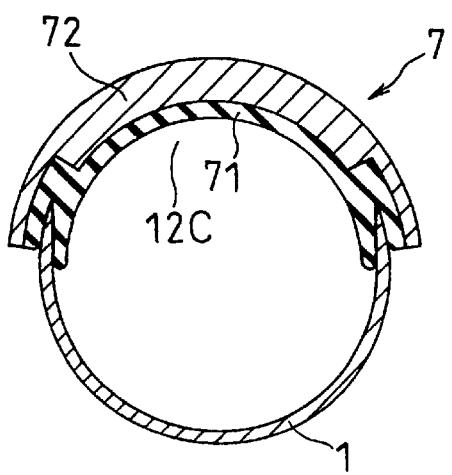
FIG. 46(c) is a cross-sectional view showing the anticorrosive structure.

The present invention is applicable equally to the case hermetically closing the circular opening formed in the existing pipe by use of a known hole saw (U.S. Pat. No. 3,948,282). In this case, the circular opening 12C is formed in the existing pipe 1 as shown in FIGS. 46(a) to 46(c). The anticorrosive member 7 having a shape conforming to the circular opening 12C is formed into the circular opening 12C.

Therefore, such variants and modifications are to be construed as falling into the scope of the present invention.

What is claimed is:

1. A fluid supply interruption free method comprising:

an enclosing step for hermetically enclosing a part of an existing pipe by a seal-up housing, said seal-up housing comprising a plurality of housing parts segmented in the circumferential direction of said existing pipe;

an opening formation step for forming a circular or grooved opening in said existing pipe within said seal-up housing, said opening extending through about 180 degrees or through the angular range slightly smaller than 180 degrees;

a water stop step for stopping the flow of water through the interior of said existing pipe by allowing a gate for stopping the flow of water through the interior of said existing pipe to enter the interior of said existing pipe through said opening;

a removal step for removing said gate from said opening; and a hermetically closing step for fitting an anticorrosive member into said opening, said anticorrosive member including a pressure contact portion made of elastomer coming into pressure contact with a cut surface of said opening over substantially the entire periphery, and a rigid portion integrally formed with said pressure contact portion and having a rigidity enough to resist the water pressure acting on said opening.

* * * * *